United States Patent [19]

Evan et al.

[11] Patent Number: 5,113,498

[45] Date of Patent: May 12, 1992

[54] INPUT/OUTPUT SECTION FOR AN INTELLIGENT CELL WHICH PROVIDES SENSING, BIDIRECTIONAL COMMUNICATIONS AND CONTROL

[75] Inventors: Shabtai Evan, Saratoga; Wendell B. Sander, Los Gatos, both of Calif.

[73] Assignee: Echelon Corporation, Palo Alto, Calif.

[21] Appl. No.: 533,200

[22] Filed: Jun. 4, 1990

Related U.S. Application Data

[63] Continuation of Ser. No. 119,383, Nov. 10, 1987, abandoned.

[51] Int. Cl.$^5$ .................. G06F 15/16; G06F 3/00
[52] U.S. Cl. .................. 395/275; 364/DIG. 1; 364/221.1; 364/221; 364/238.3; 364/228.1; 364/237.2; 364/259.3; 364/259; 395/200
[58] Field of Search ............. 364/200 MS, 900 MS

[56] References Cited

U.S. PATENT DOCUMENTS

| | | | |
|---|---|---|---|
| 3,328,772 | 6/1967 | Oeters | 364/200 |
| 3,723,974 | 3/1973 | Holtz | 364/200 |
| 3,775,751 | 11/1973 | Anderson | 364/200 |
| 4,005,387 | 1/1977 | Herring et al. | 364/200 |
| 4,016,548 | 4/1977 | Law et al. | 364/200 |
| 4,017,839 | 4/1977 | Calle et al. | 364/200 |
| 4,124,889 | 11/1978 | Kaufman et al. | 364/200 |
| 4,143,418 | 3/1979 | Hodge et al. | 364/200 |
| 4,161,027 | 7/1979 | Russell | 364/200 |
| 4,219,875 | 8/1980 | Templeton | 364/200 |
| 4,296,464 | 10/1981 | Woods et al. | 364/200 |
| 4,495,574 | 1/1985 | Hofstetter | 364/200 |
| 4,539,652 | 9/1985 | Rubin | 364/900 |
| 4,675,803 | 6/1987 | Kendall et al. | 364/200 |
| 5,010,477 | 4/1991 | Onoda et al. | 364/200 |

OTHER PUBLICATIONS

"Bipolar and MOS Analog Integrated Circuit Design", by Alan B. Grebene, published by John Wiley & Sons, pp. 754–757, and 835 and 836.
1987 National Semiconductor Corporation Catalog Sheets 1–133 and 1–134.
"An Engineering Approach to Digital Design", by William I. Fletcher, published by Prentice-Hall, Inc. (1980), Chapter 5, pp. 275–334.

Primary Examiner—Kevin A. Kriess
Attorney, Agent, or Firm—Blakely, Sokoloff, Taylor & Zafman

[57] ABSTRACT

A network for providing sensing, communications and control is described. A plurality of intelligent cells each of which comprises an integrated circuit having a processor and input/output section are coupled to the network. Each of the programmable cells receives when manufactured a unique identification number (48 bits) which remains permanently within the cell. The cells can be coupled to different media such as power lines, twisted, pair, radio frequency, infrared ultrasonic, optical coaxial, etc., to form a network. The preferred embodiment of the cell includes a multiprocessor and multiple I/O subsections where any of the processors can communicate with any of the I/O subsections. This permits the continual execution of a program without potential interruptions caused by interfacing with the I/O section. The I/O section includes programmable A-to-D and programmable D-to-A converters as well as other circuits for other modes of operation.

21 Claims, 18 Drawing Sheets

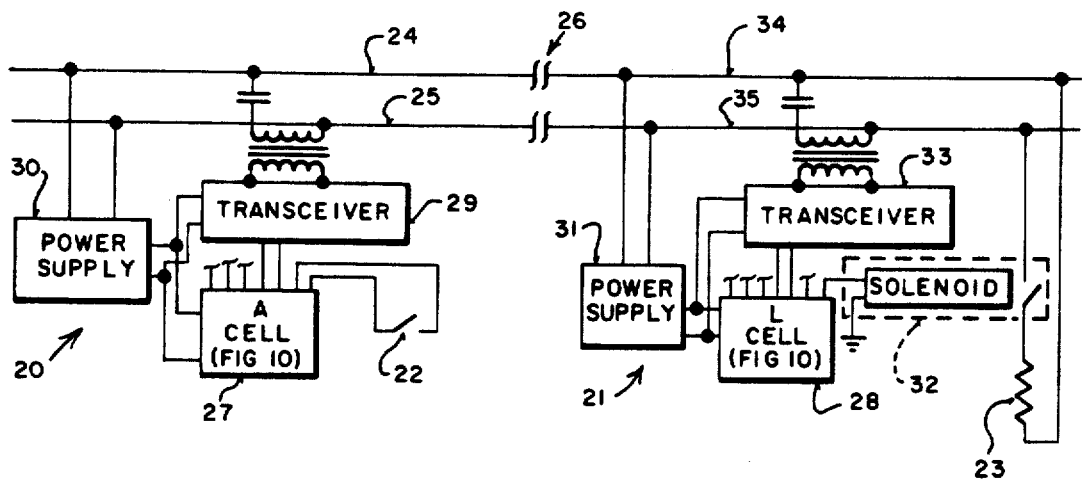
FIG_1
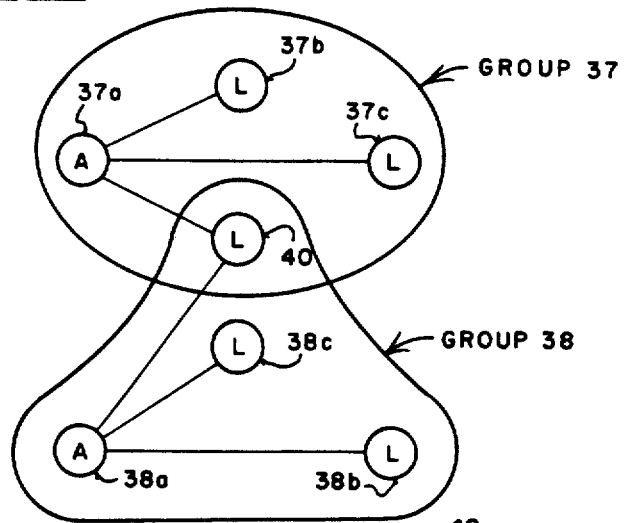
FIG_2
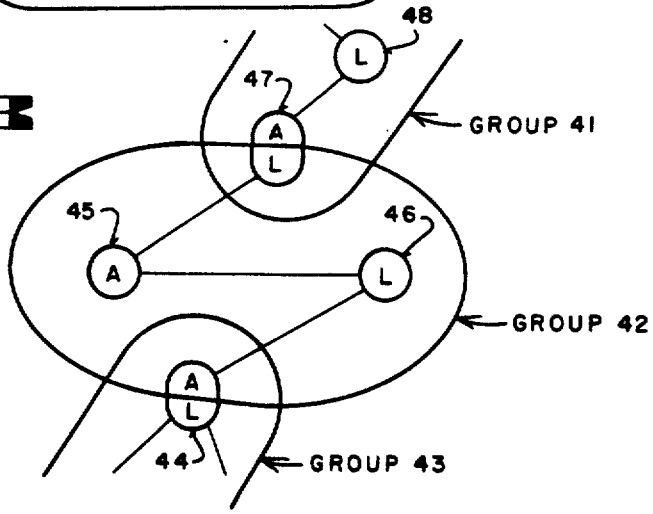
FIG_3

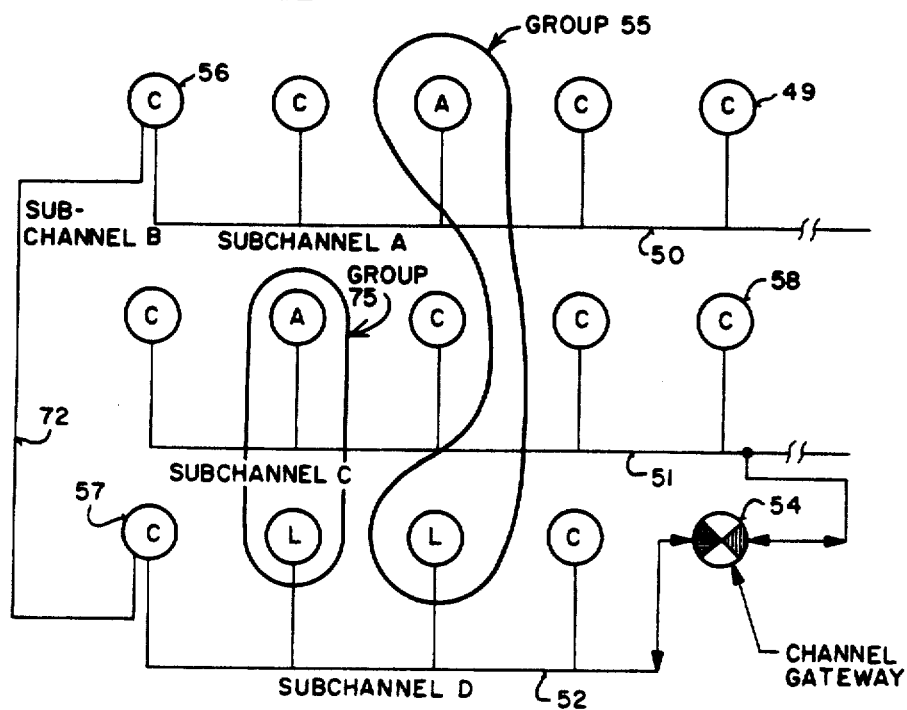
FIG_4
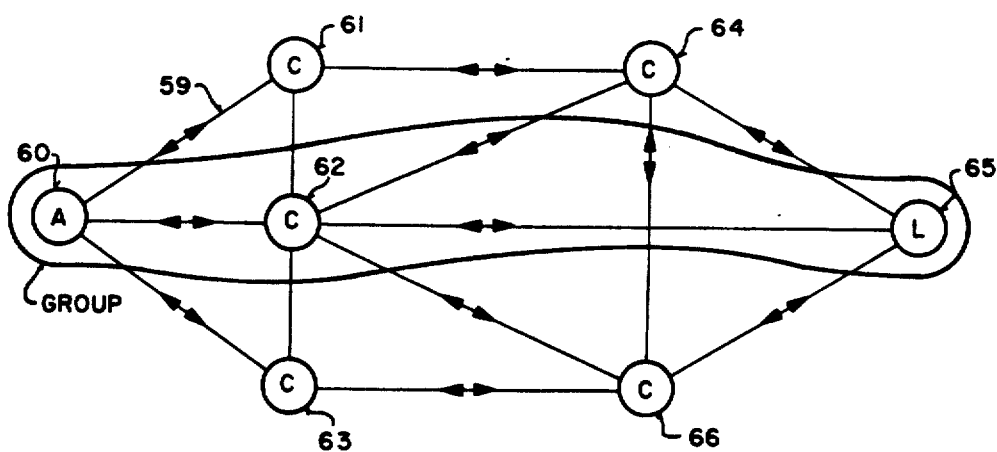
FIG_5

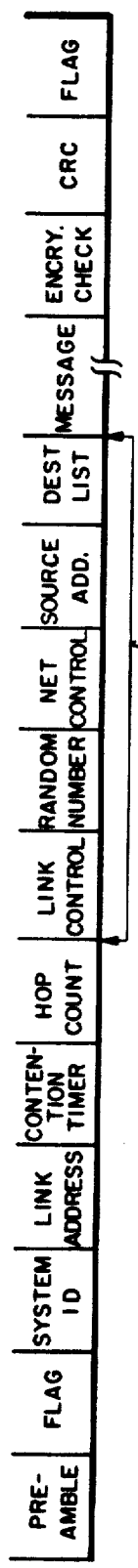
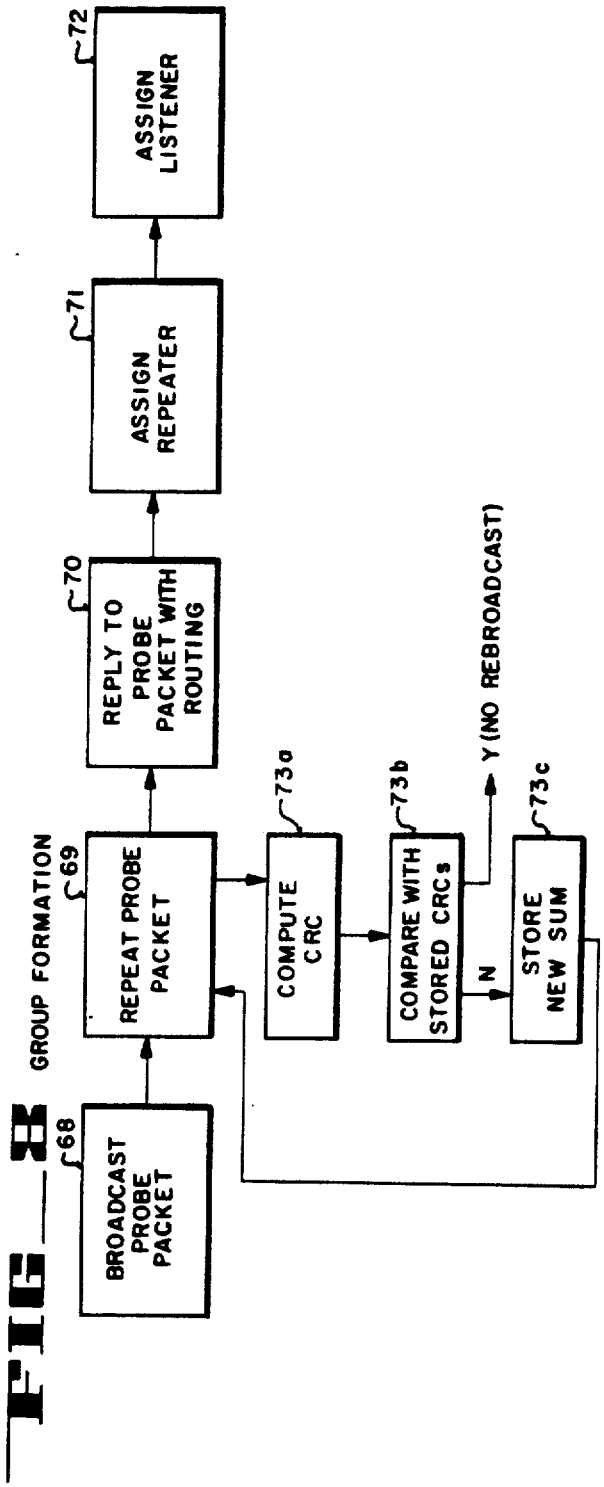

FIG_9

| 4-BIT PATTERN ASSIGNMENT | ASSIGNED 3-OF-6 PATTERN | FUNCTION |
|---|---|---|
| 0 0 0 0 | 0 1 1 0 1 0 | DATA |
| 0 0 0 1 | 0 0 1 1 0 1 | DATA |
| 0 0 1 0 | 0 0 1 1 1 0 | DATA |
| 0 0 1 1 | 0 0 1 0 1 1 | DATA |
| 0 1 0 0 | 0 1 1 1 0 0 | DATA |
| 0 1 0 1 | 0 1 1 0 0 1 | DATA |
| 0 1 1 0 | 0 1 0 1 1 0 | DATA |
| 0 1 1 1 | 0 1 0 0 1 1 | DATA |
| 1 0 0 0 | 1 0 1 1 0 0 | DATA |
| 1 0 0 1 | 1 0 0 1 0 1 | DATA |
| 1 0 1 0 | 1 0 0 1 1 0 | DATA |
| 1 0 1 1 | 1 0 0 0 1 1 | DATA |
| 1 1 0 0 | 1 1 0 1 0 0 | DATA |
| 1 1 0 1 | 1 1 0 0 0 1 | DATA |
| 1 1 1 0 | 1 1 0 0 1 0 | DATA |
| 1 1 1 1 | 1 0 1 0 0 1 | DATA |
| | 1 0 1 0 1 0 | NIBBLE SYNC/END |
| | 0 1 0 1 0 1 | BIT SYNC |
| | 1 1 1 0 0 0 | UNUSED |
| | 0 0 0 1 1 1 | UNUSED |

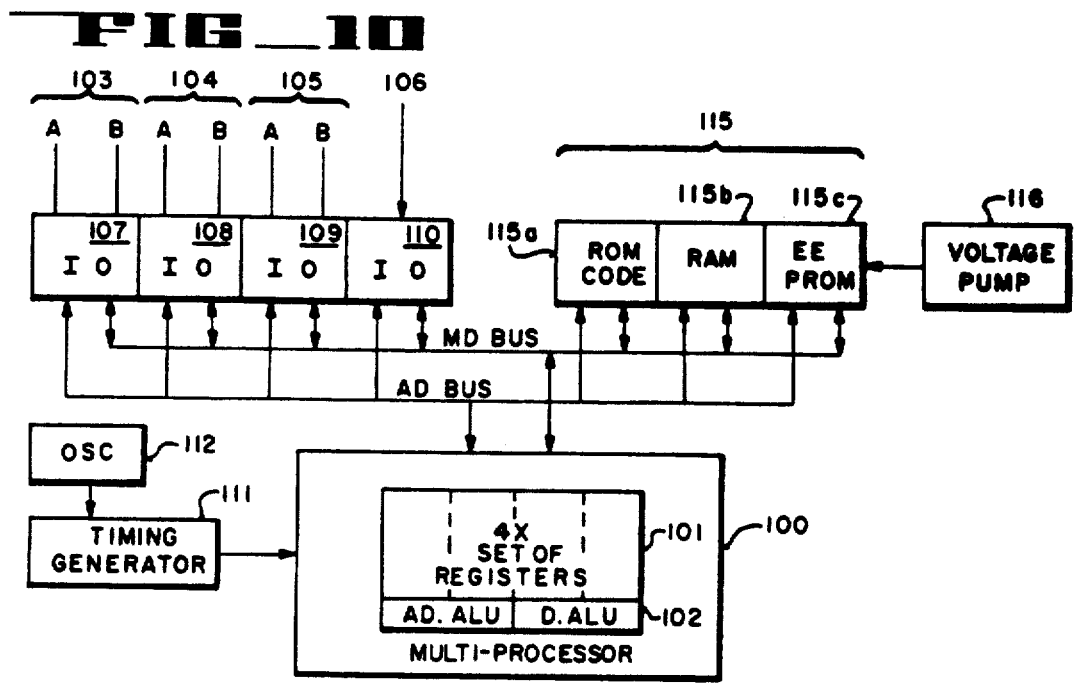
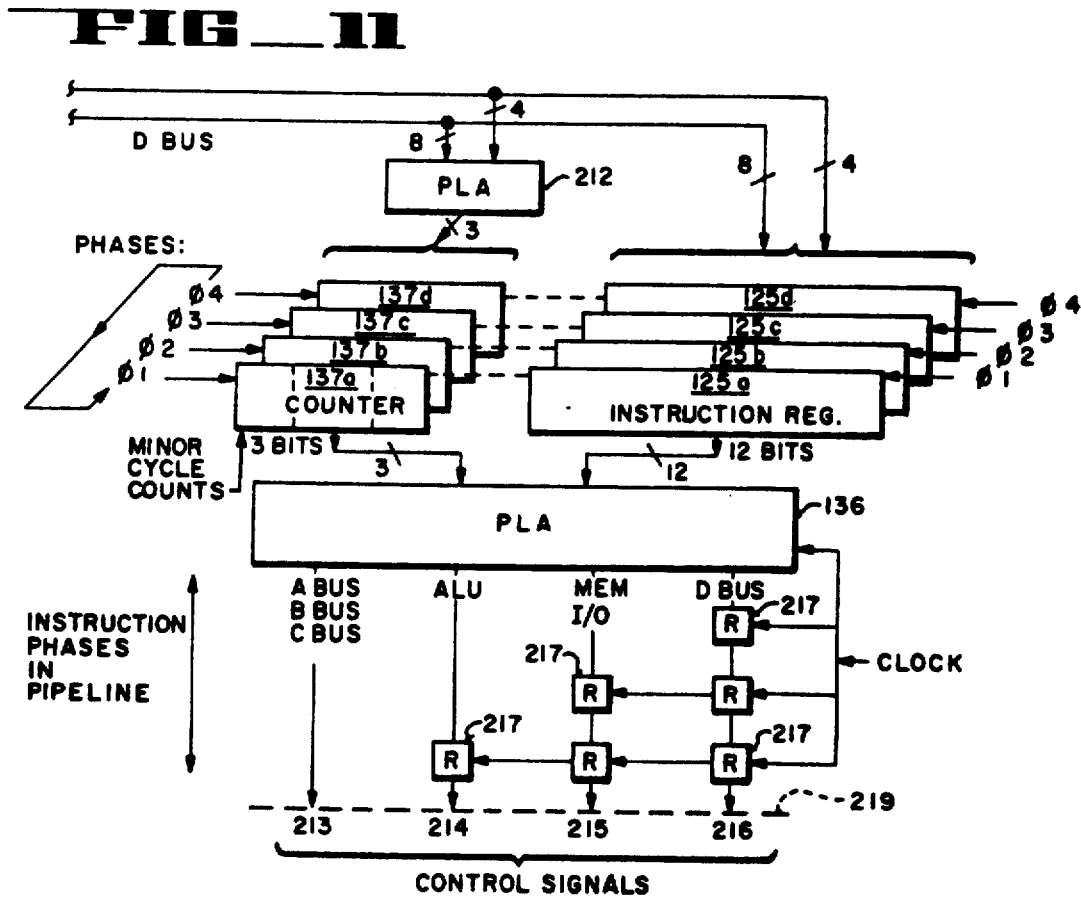

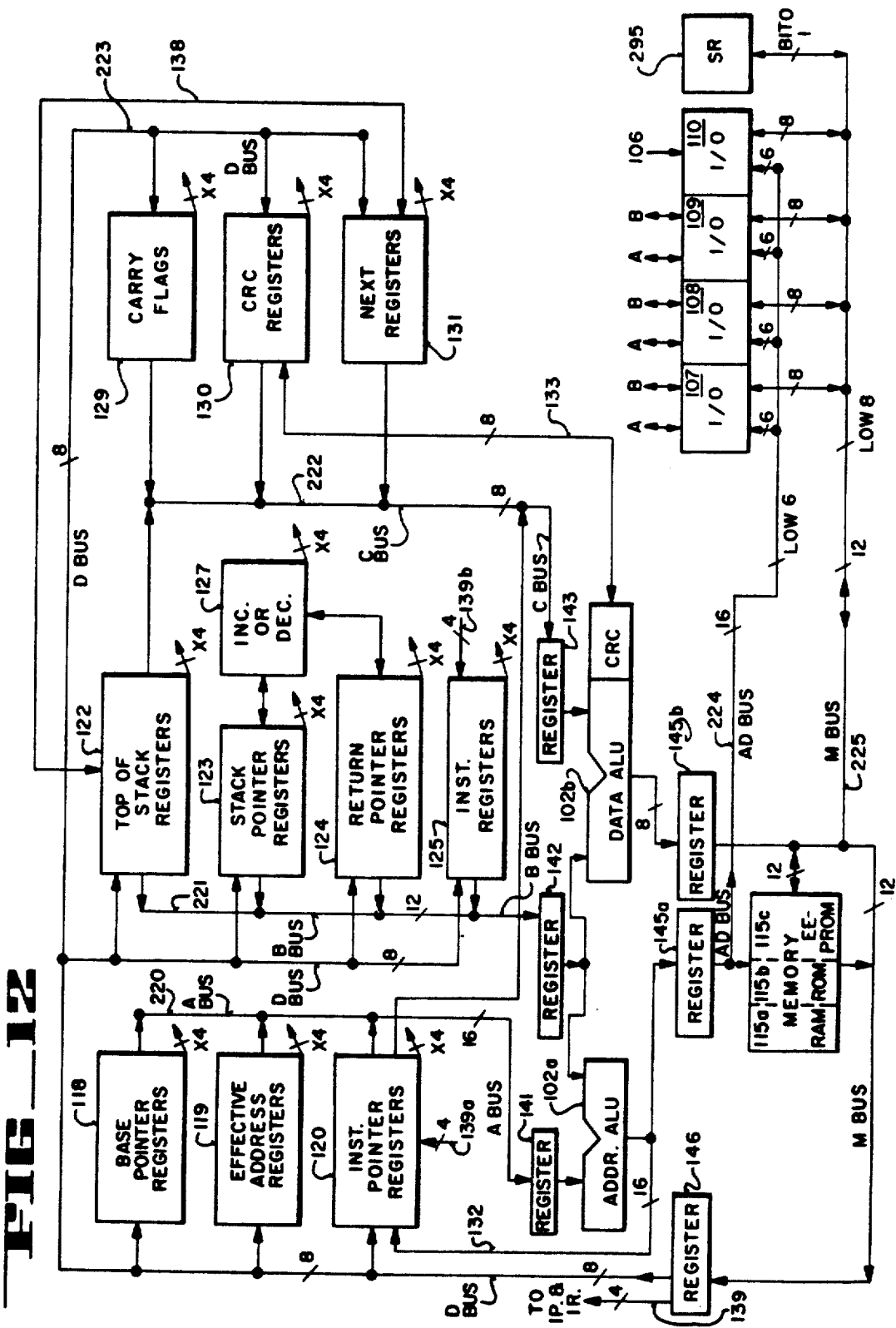

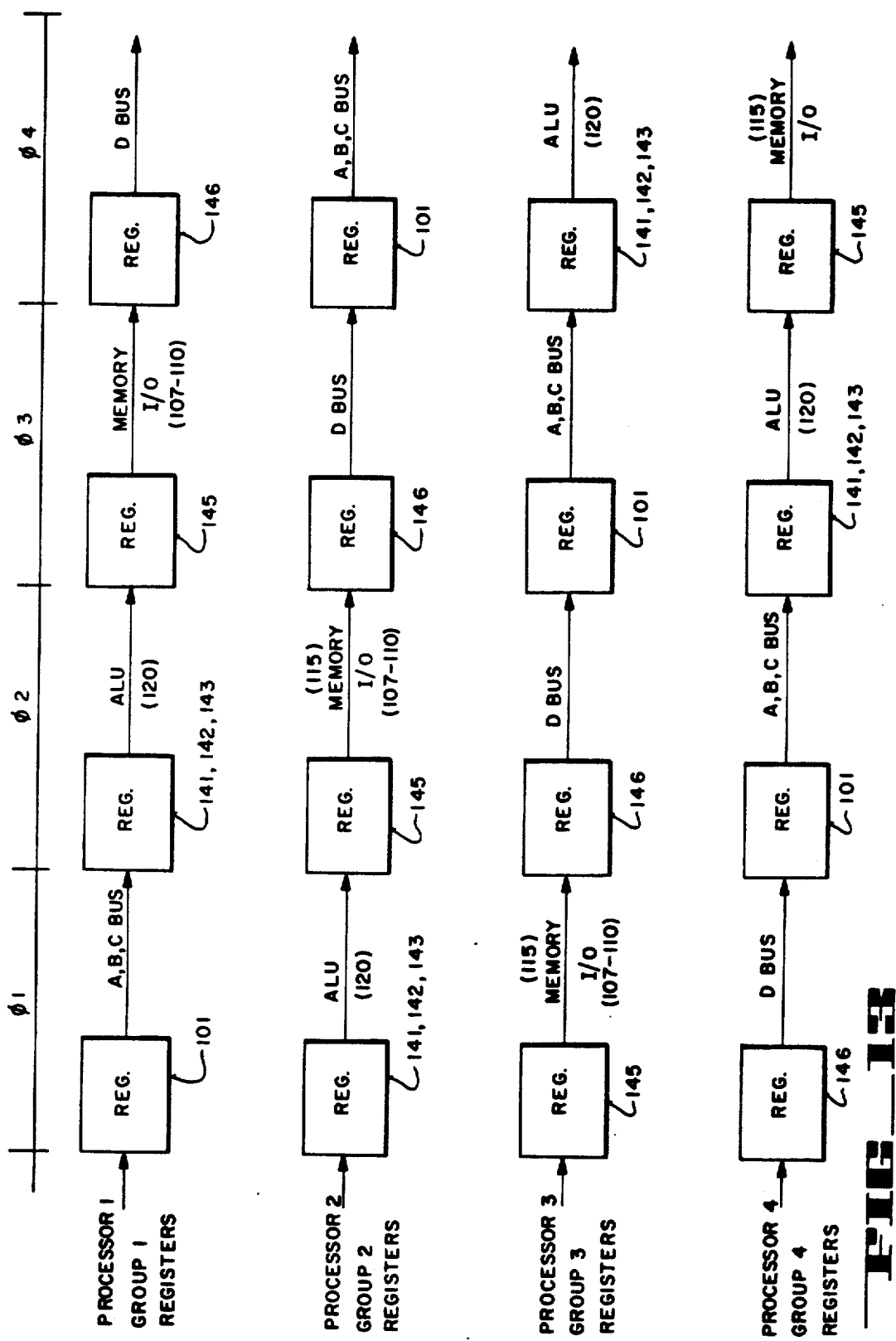
FIG_13

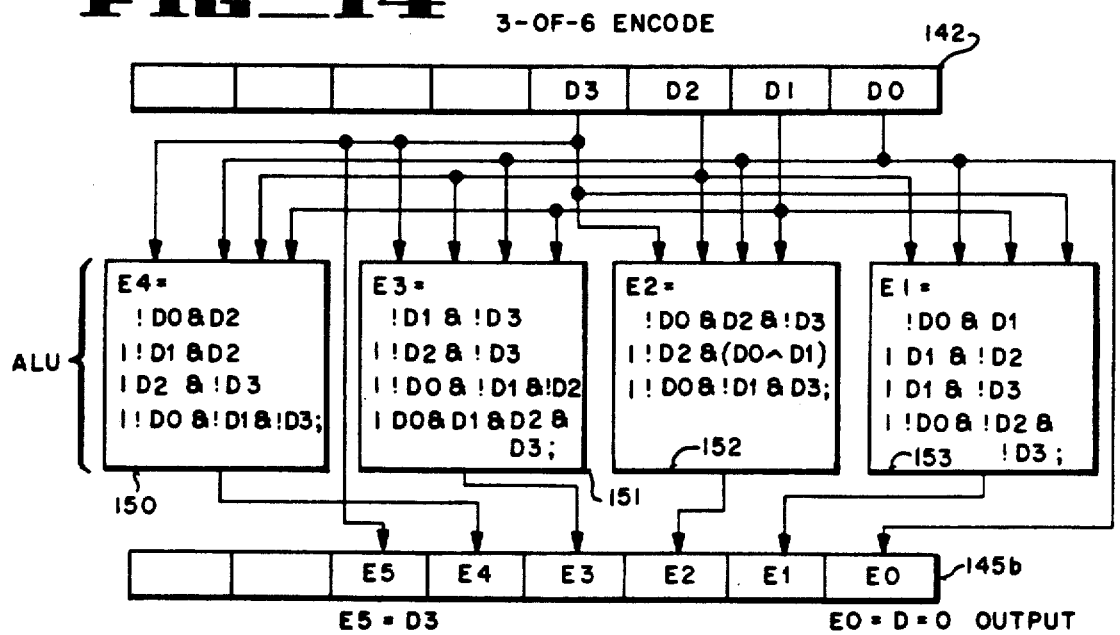
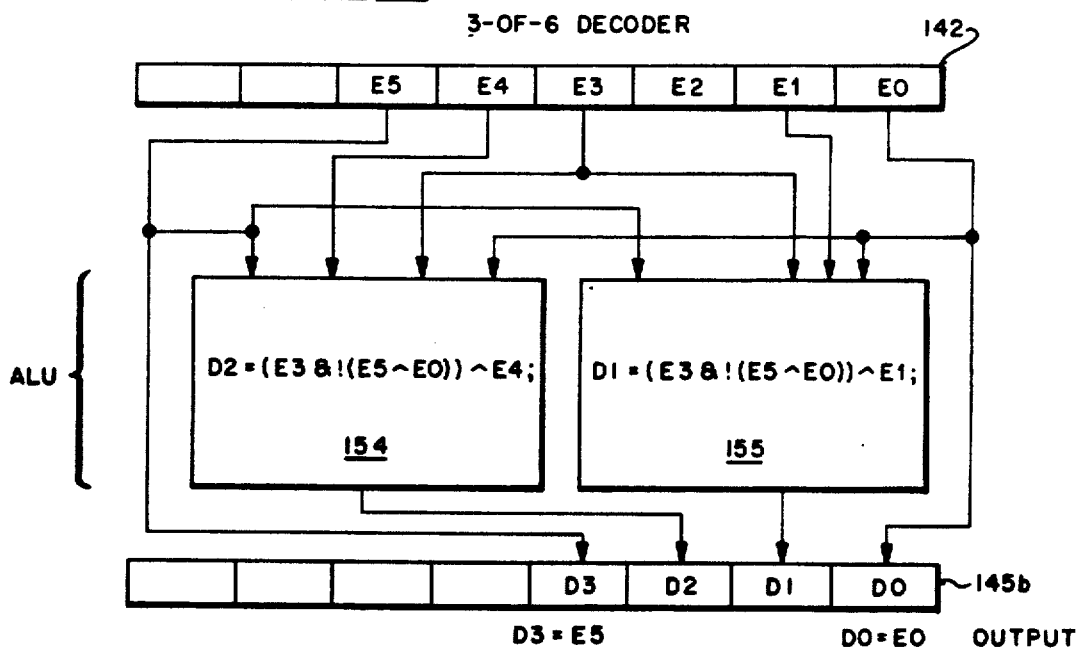

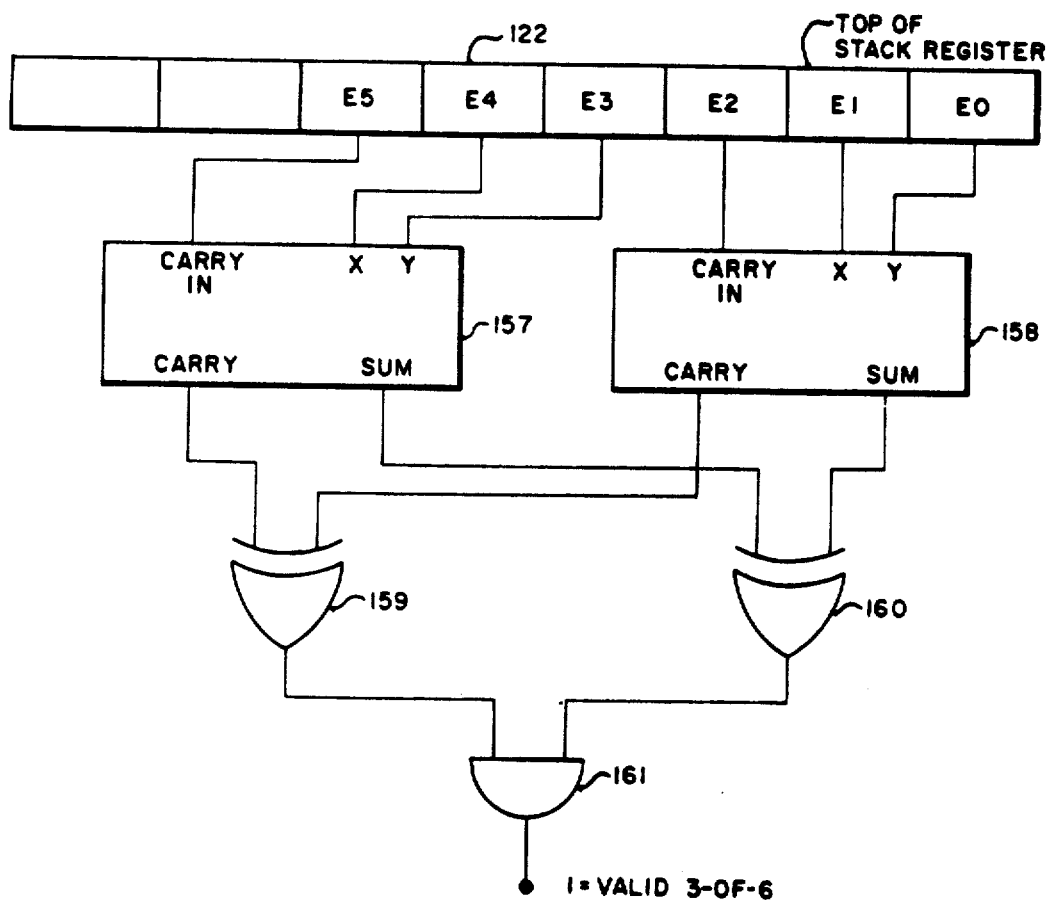

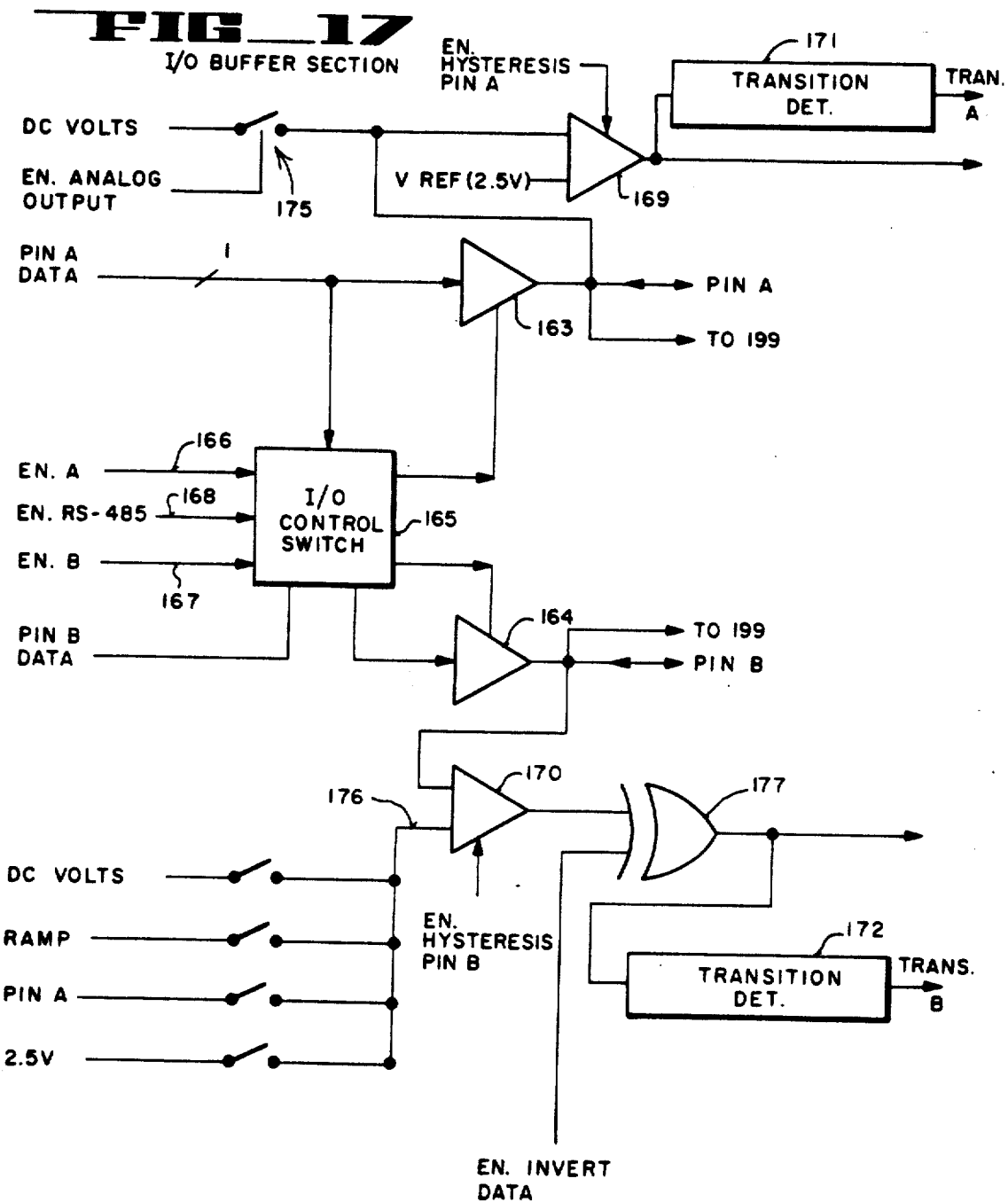

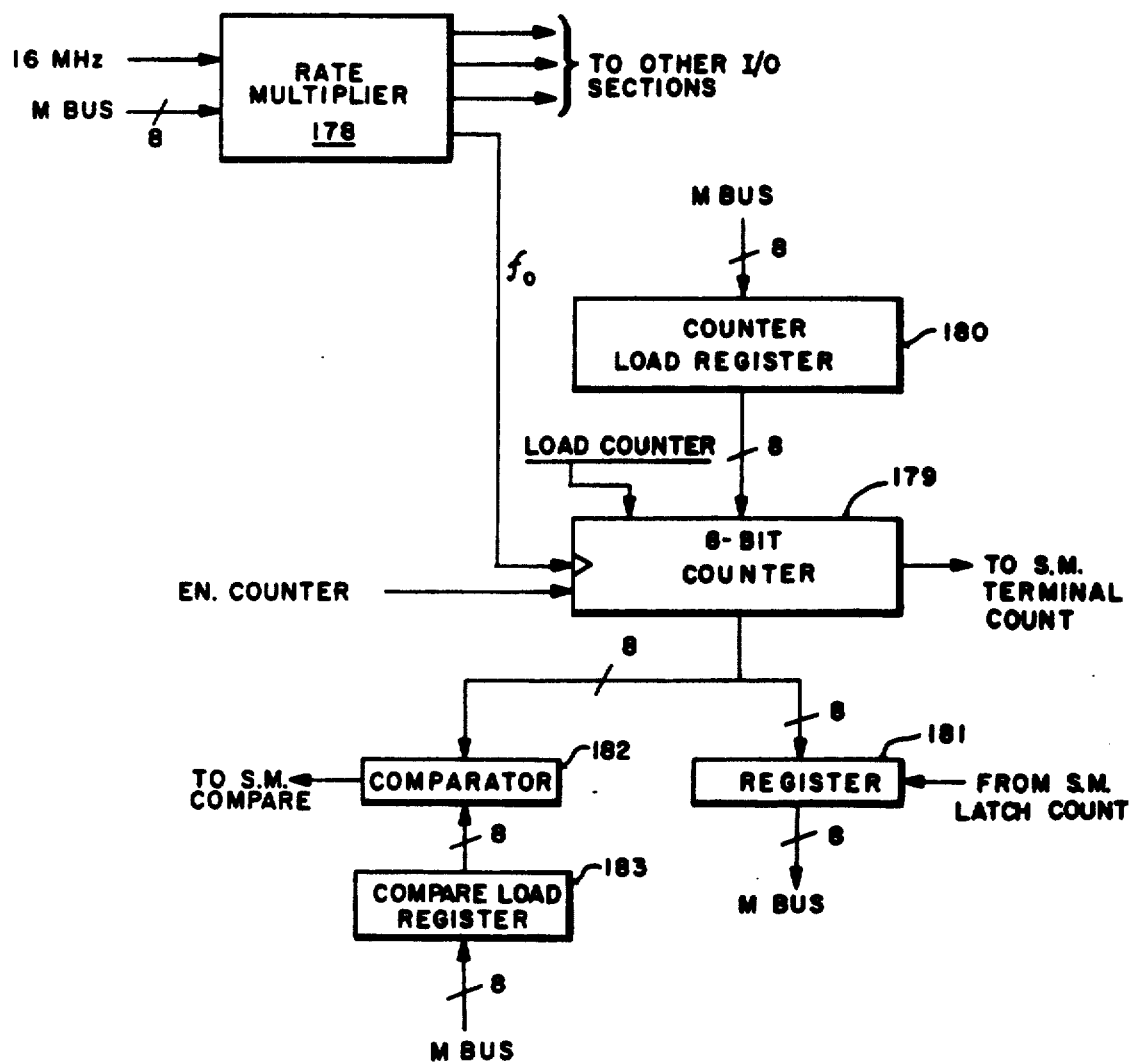
FIG_18
I/O COUNTING TIMING

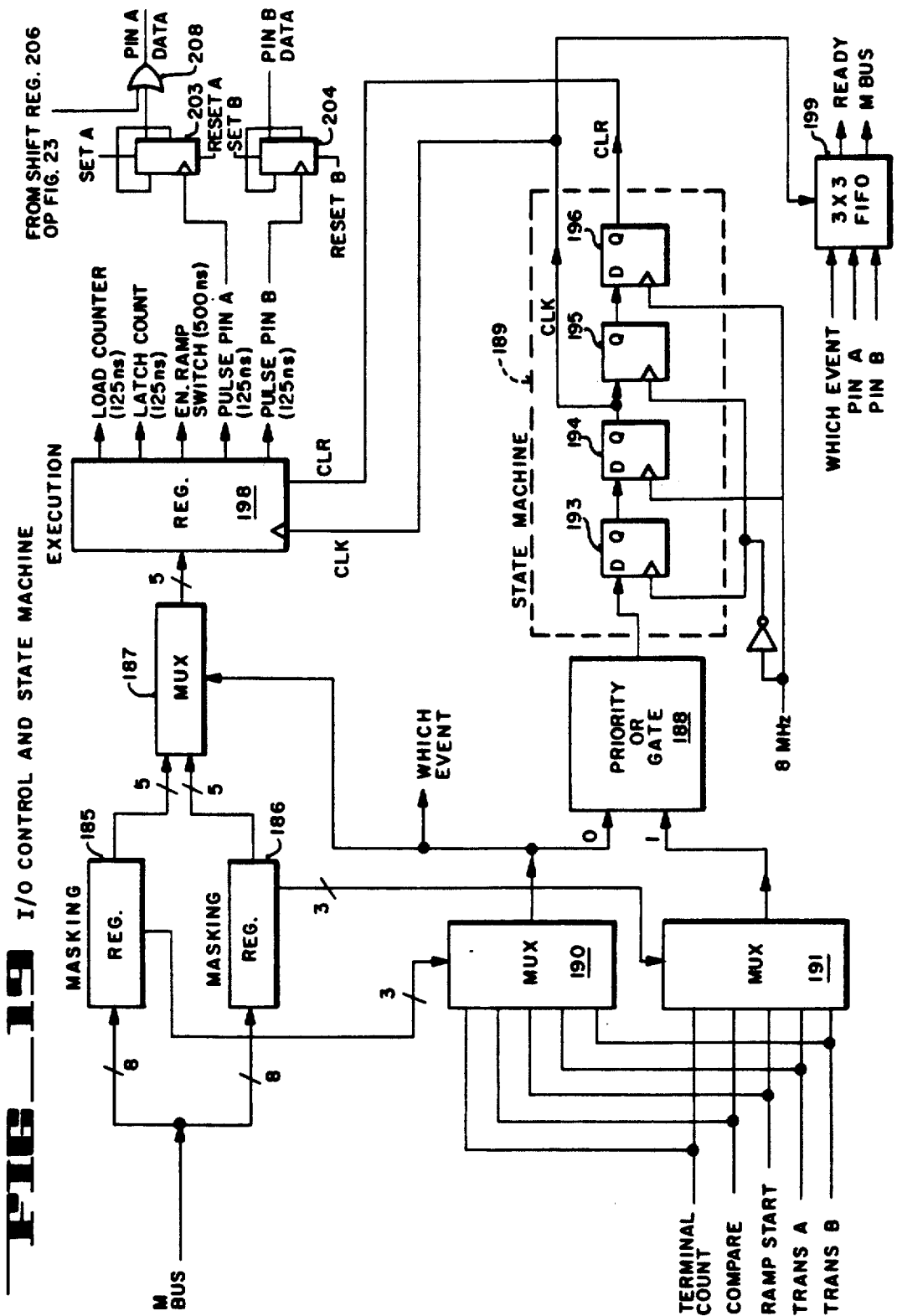

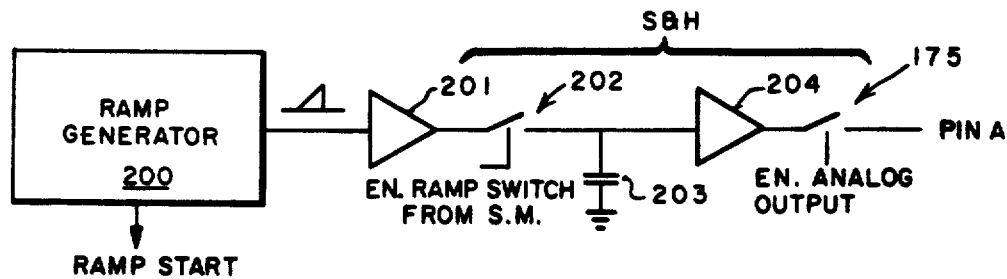
FIG_20
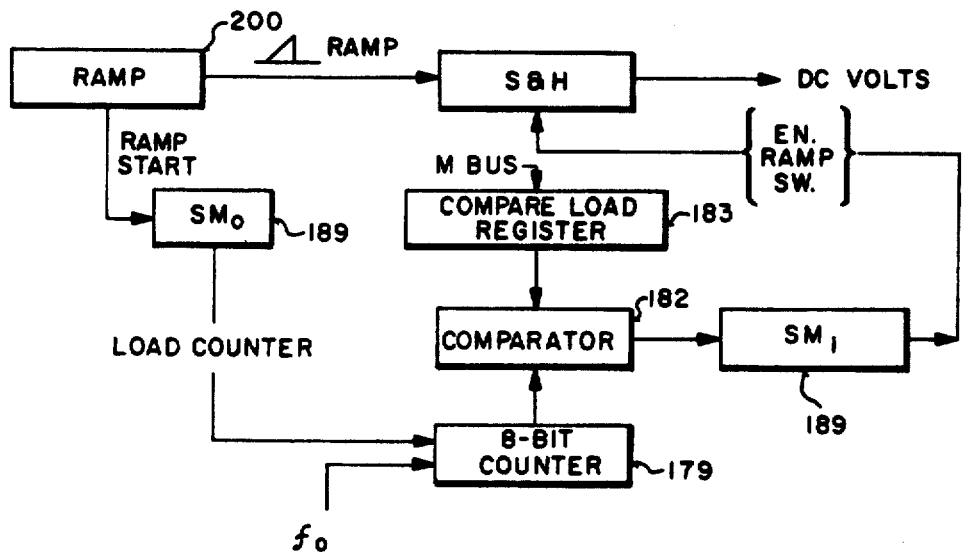
FIG_21
(D TO A)
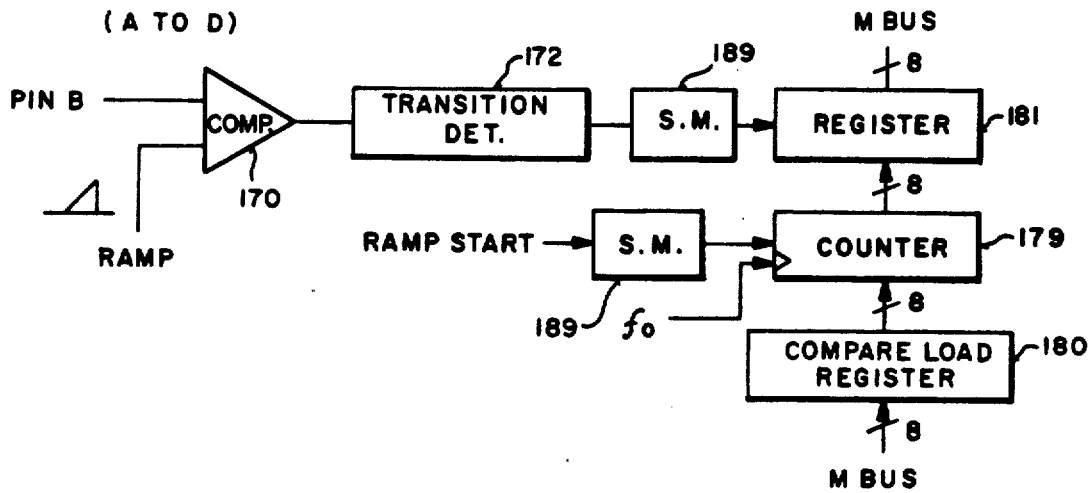
FIG_22
(A TO D)

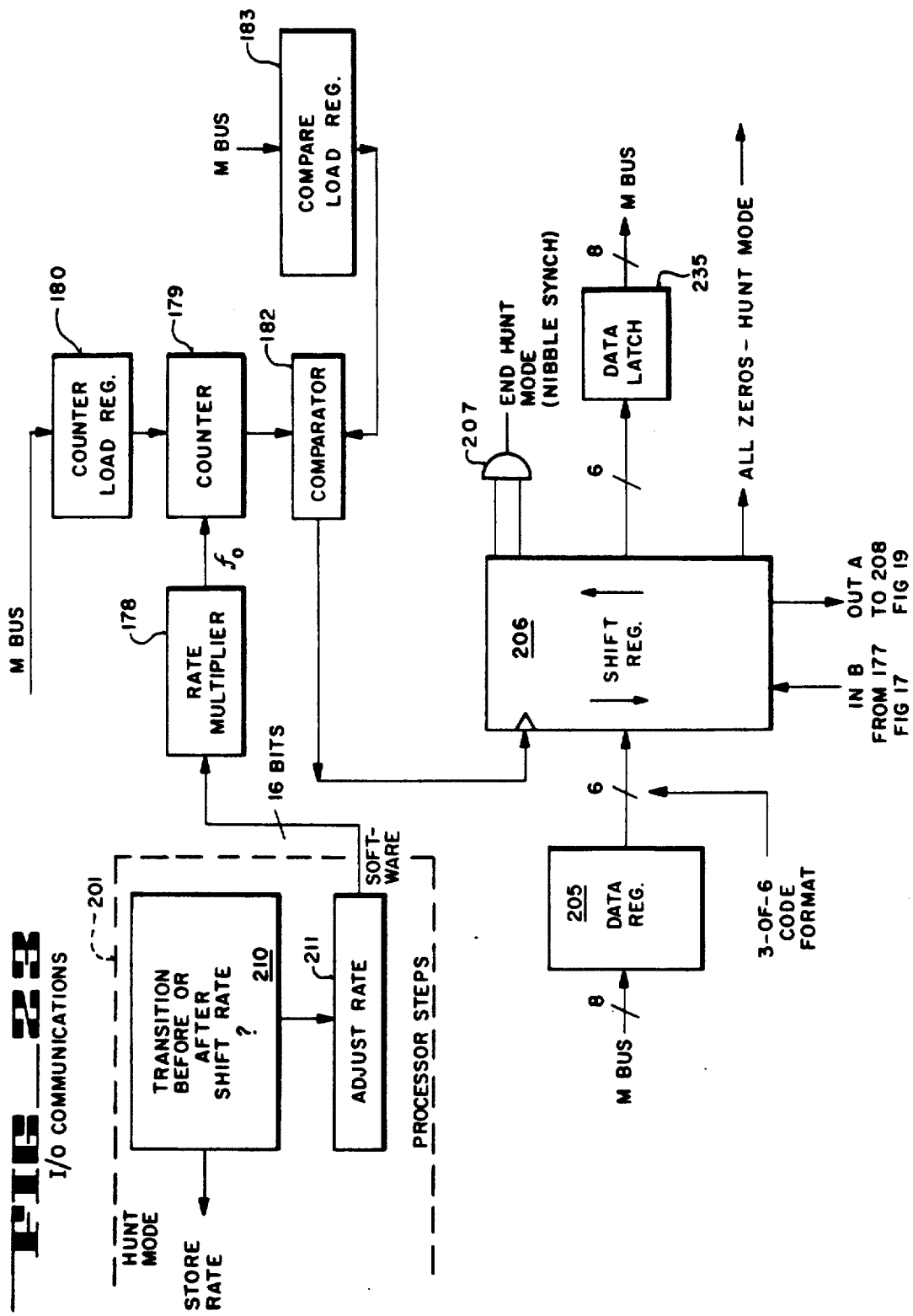

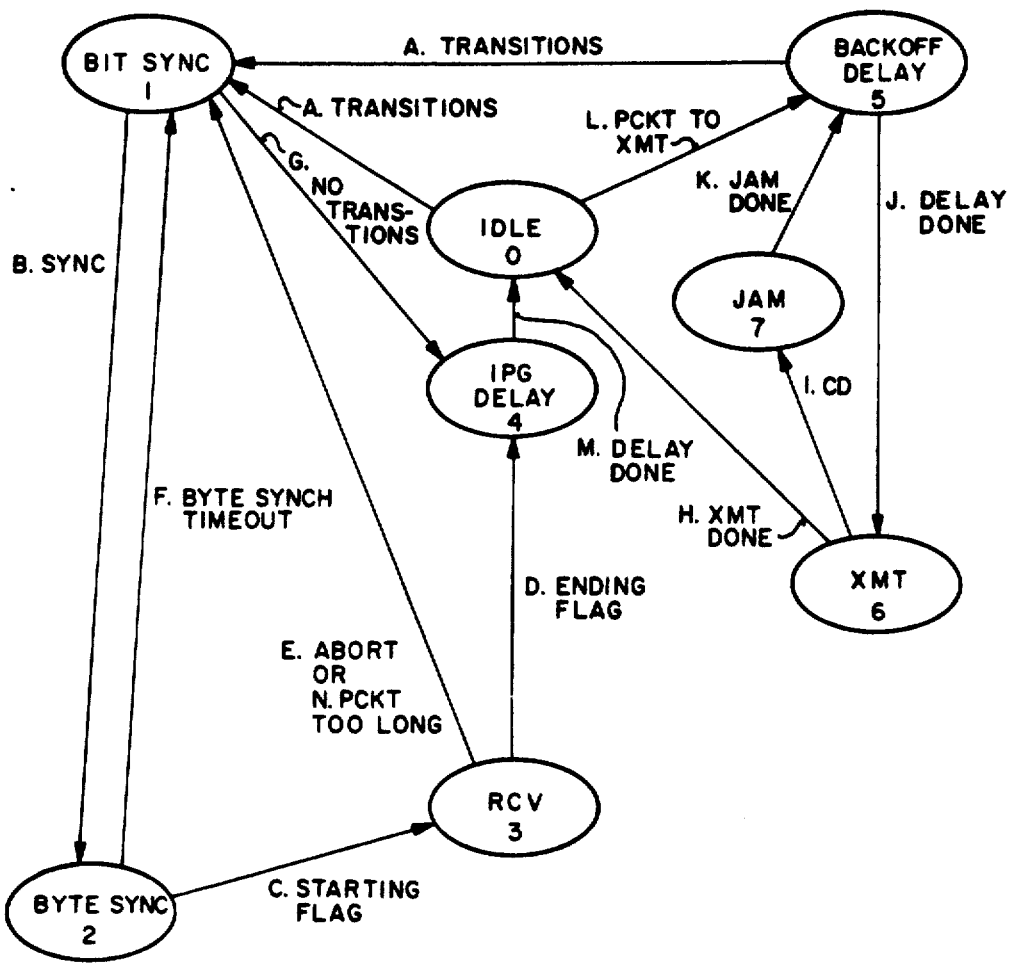
FIG_24
CONTENTION & I/O STATE DIAGRAM
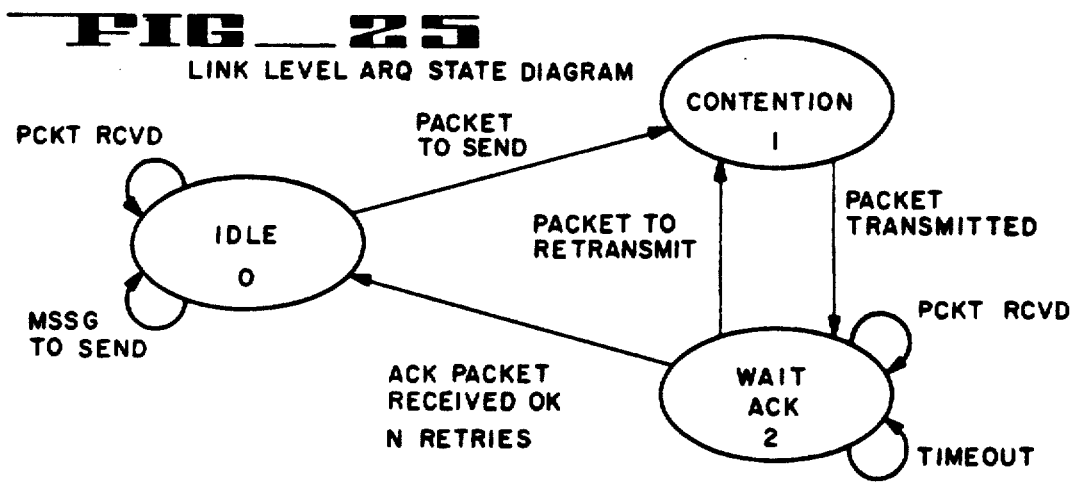
FIG_25
LINK LEVEL ARQ STATE DIAGRAM

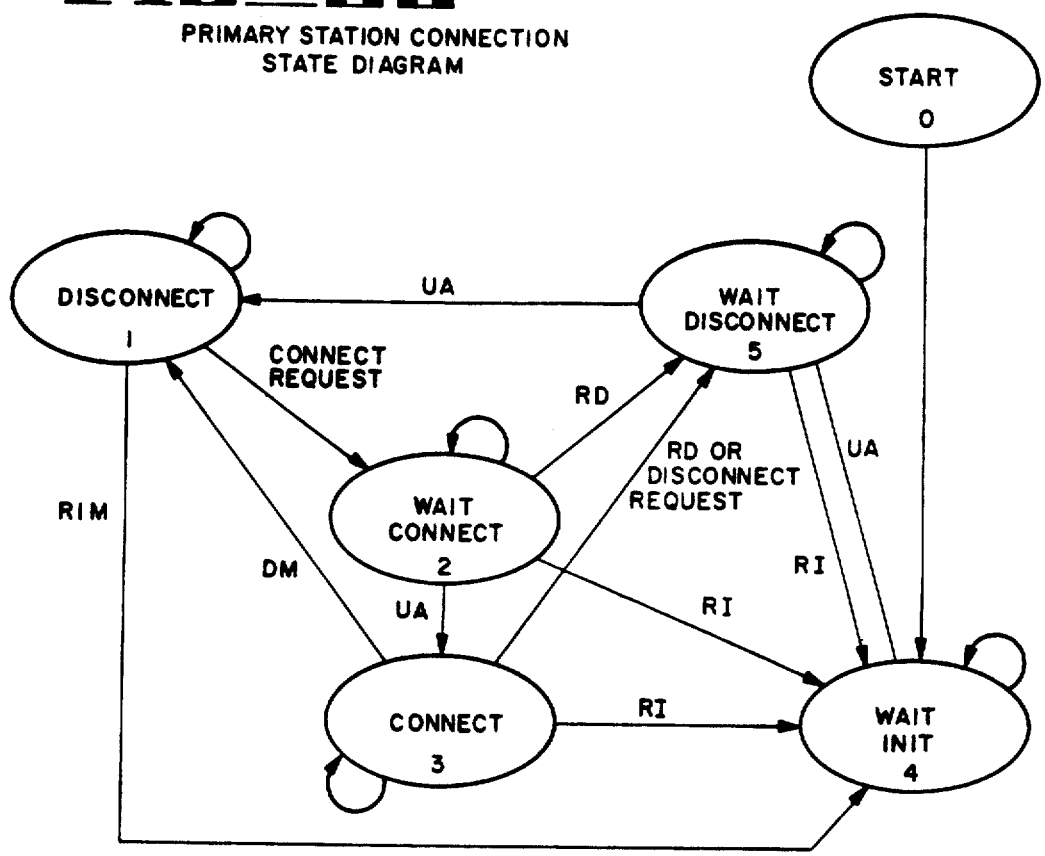
FIG_26
PRIMARY STATION CONNECTION STATE DIAGRAM
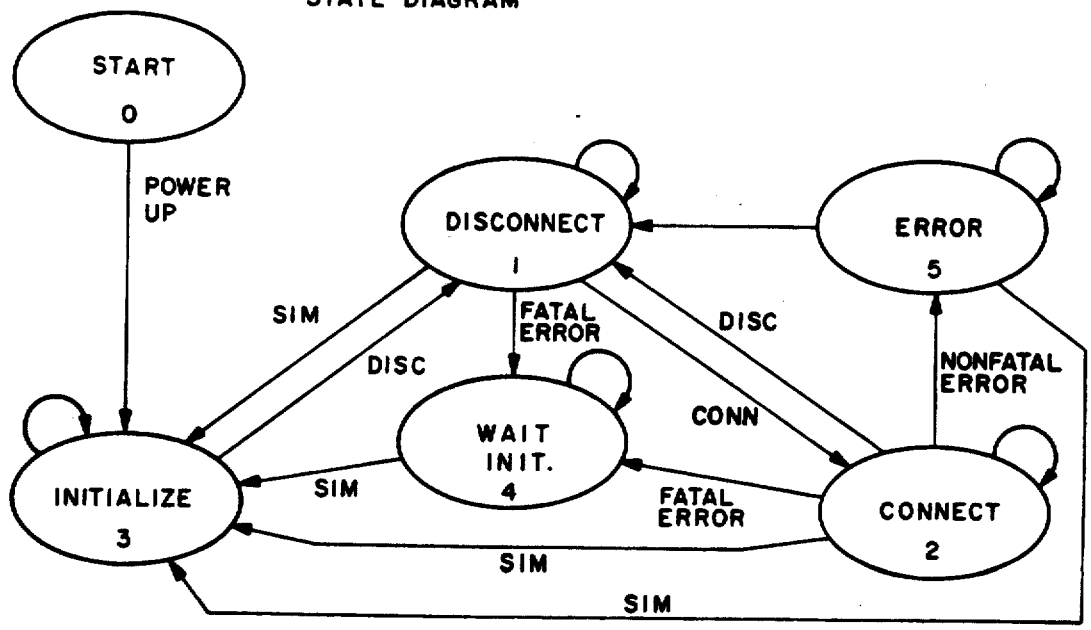
FIG_27
SECONDARY STATION CONNECTION STATE DIAGRAM

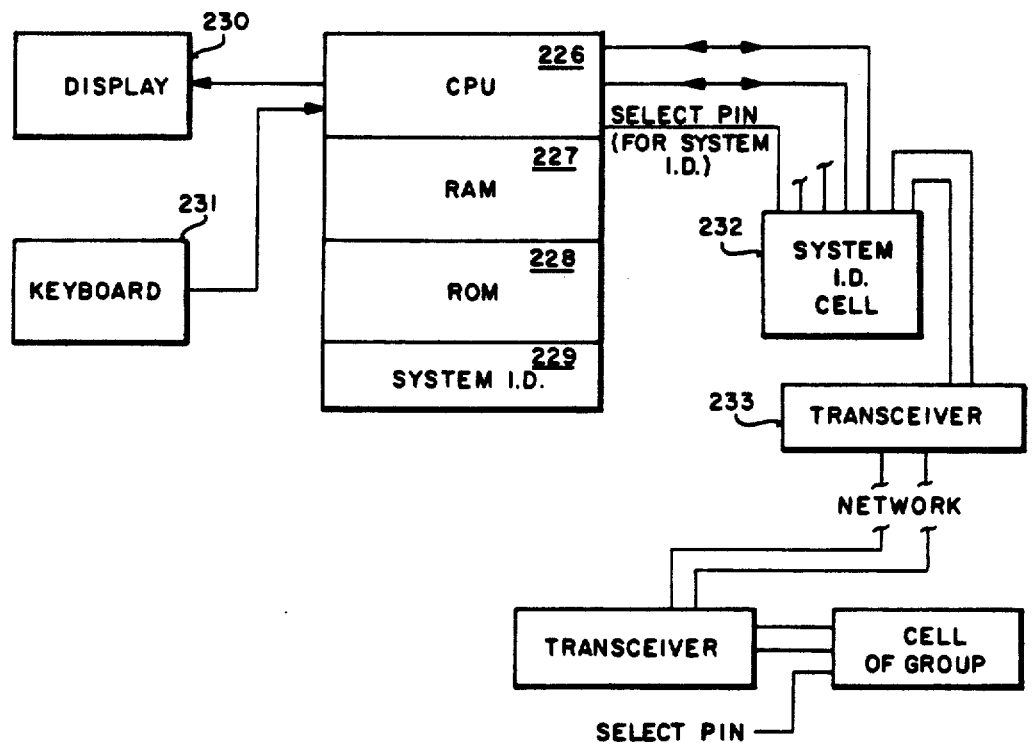
FIG_28 GROUPING DEVICE
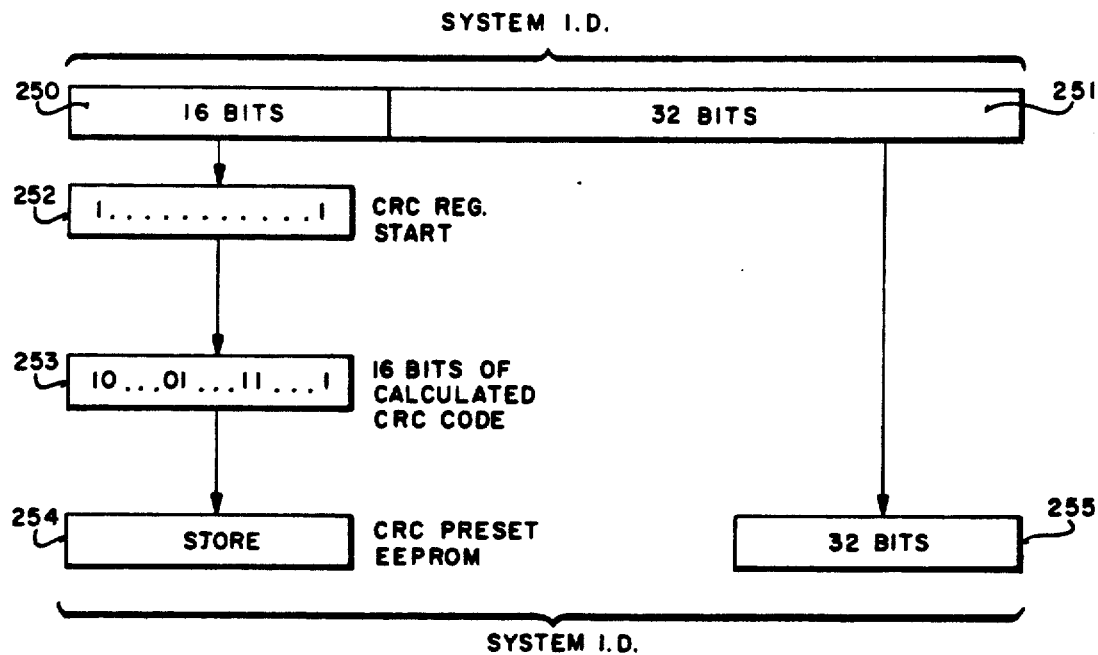
FIG_29

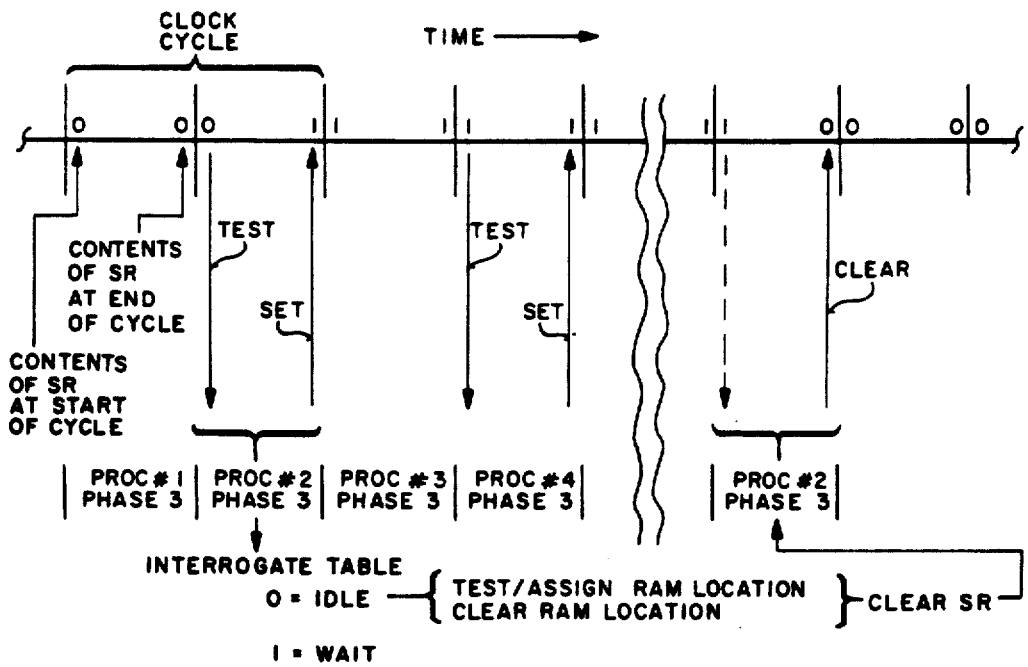

INPUT/OUTPUT SECTION FOR AN INTELLIGENT CELL WHICH PROVIDES SENSING, BIDIRECTIONAL COMMUNICATIONS AND CONTROL

This is a continuation of application Ser. No. 119,383 filed Nov. 10, 1987, now abandoned.

BACKGROUND OF THE INVENTION

1. Field of the Invention

The invention relates to the field of networks with distributed intelligence, configuration and control and intelligent cells used in networks, primarily where the networks are used for sensing, communicating and controlling.

2. Prior Art.

There are many commercially available products which provide sensing, control and communications in a network environment. These products range from very expensive, elaborate systems, to simple systems having little intelligence. As will be seen, the present invention is directed towards providing a system having a relatively large amount of intelligence and computational power but at a low cost.

One commercially available system "X-10" provides control, by way of example, between a light switch and a light. When the light switch is operated, a code pattern is transmitted over the power lines to a receiver at the light. The code pattern is transmitted twice, once in its true form and once in its complementary form. When the code is received by the receiver, it is interpreted, and thereby used to control the light. Mechanical addressing means are employed to allow the transmitter at the switch to communicate with the specific desired receiver at the light.

As will be seen, the present invention provides substantially more capability and flexibility than current systems.

Applicant will submit prior art references on X-10 and other known prior art systems.

SUMMARY OF THE INVENTION

A network for providing sensing, communications and control is described. A plurality of intelligent cells each of which comprises an integrated circuit having a processor and input/output section are coupled to the network. Each of the programmable cells receives when manufactured a unique identification number (48 bits) which remains permanently within the cell. The cells can be coupled to different media such as power lines, twisted pair, radio frequency, infrared ultrasonic, optical coaxial, etc., to form a network.

Networks are distinguished from one another by system identification numbers (IDs). Groups of cells within each network are formed to perform particular functions and are identified by group IDs. Communications occur within the network through use of the system, group and cell IDs. Some cells (announcers) are assigned the task of sensing, for example, the condition of a switch, and others (listeners) the task of controlling, such as controlling a light. Cells can perform multiple tasks and be members of multiple groups, and, for example, can act as a repeater for one group and a listener in a another group. When manufactured, the cells are identical except for the cell ID; they are programmed to perform specific tasks for a particular group or groups.

The preferred embodiment of the cell includes a multiprocessor and multiple I/O subsections where any of the processors can communicate with any of the I/O subsections. This permits the continual execution of a program without potential interruptions caused by interfacing with the I/O section. The I/O section includes programmable A-to-D and programmable D-to-A converters as well as other circuits for other modes of operation.

The network protocol provides great flexibility, and for instance, allows groups to be formed and/or changed after the cells are in place. As will be seen, the intelligence for the network is distributed among the cells. In general, the network is lightly loaded, although provisions are made for contention and other conditions which may arise. The communication between the cells in general is optimized for carrying out the functions assigned to groups, rather than for transmission of data unrelated to the control function of the network. For this reason, normally the packets carrying messages are relatively short compared to Ethernet, Arpa, AppleTalk, X-25 and many other broadband and data communication systems.

Other aspects of the invented network and cell will be apparent from the detailed description of the invention.

BRIEF DESCRIPTION OF THE DRAWINGS

FIG. 1 is a block diagram illustrating typical application for the present invention.

FIG. 2 is a diagram used to illustrate the grouping of cells.

FIG. 3 is another block diagram similar to FIG. 2 used to illustrate the grouping of cells.

FIG. 4 is a diagram used to describe subchannels.

FIG. 5 is a diagram illustrating a plurality of cells; this diagram is used to describe cell group formation employing the present invention.

FIG. 6 is a chart illustrating the packet format used with the present invention.

FIG. 7 is a chart illustrating the designation list portion of the packet format of FIG. 6.

FIG. 8 illustrates a series of steps used in forming a group of cell with the present invention.

FIG. 9 is a chart illustrating the code assignments for the three-of-six encoding used with the present invention.

- FIG. 10 is a block diagram of the communication and control cell.

FIG. 11 is a block diagram of a portion of the instruction decoding logic used within the processor of the cell of FIG. 10.

FIG. 12 is a detailed block diagram of the process of FIG. 10.

FIG. 13 is a timing diagram for the processor of FIG. 10; this diagram also shows latches and registers used to provide the pipelining employed by the cell.

FIG. 14 is a block diagram illustrating the presently preferred embodiment of the three-of-six encoder.

FIG. 15 is a block diagram showing the presently preferred embodiment of the three-of-six decoder.

FIG. 16 is a block diagram showing the presently preferred embodiment of the three-of-six code verifier.

FIG. 17 is an electrical schematic of the buffer section of one of the I/O sections.

FIG. 18 is an electrical schematic of the counting and timing functions for an I/O subsection.

FIG. 19 is an electrical schematic of the control and state machine for an I/O section.

FIG. 20 is an electrical schematic for the sample and hold means associated with the I/O subsections.

FIG. 21 illustrates the network formed within an I/O subsection to do digital-to-analog conversion.

FIG. 22 illustrates the network formed within an I/O section for analog-to-digital conversion.

FIG. 23 is an electrical schematic showing the communications portion of an I/O subsection.

FIG. 24 is a state diagram used for the I/O subsections and for transmission contentions.

FIG. 25 is a state diagram for the link level ARQ.

FIG. 26 is a state diagram for primary station connections.

FIG. 27 is a state diagram for secondary station connections.

FIG. 28 is a block diagram for a grouping device.

FIG. 29 is a diagram showing the form in which the system ID is encoded for transmission by the packet and encoded within a cell.

FIG. 30 is a diagram used to described the operation of the input/output section and semaphore register.

DETAILED DESCRIPTION OF THE PRESENT INVENTION

An apparatus and method for providing a communications, sensing and control in a network is described. Where the network contains a plurality of intelligent cells, the cells in general are programmable single chip remote control, sensing and communication devices that, when interconnected (via various media) with other cells, have distributed sensing, communication, control and network configuration intelligence, configuration and control. The system comprises a network of cells organized in a hierarchy based on communications needs. Cells are organized into working "groups" independent of the network hierarchy. Groups of cells generally are used to perform a group function. This function is carried out by the assignment of tasks to cells within the groups. Cells communicate, control and sense information. In general, each cell has a unique identification number and perform information processing tasks such as: bidirectional communications protocol, input/output, packet processing and analog and digital sensing and control. In general, the system comprised of the cells has the characteristic of storing network configuring information that is distributed throughout the system; and communicates automatically routed messages among cells. Each system also has a unique identification (ID) which in the presently preferred embodiment is 48 bits. Moreover, it contains versatile programmable input/output I/O circuits with digital versatile programming to configure cells to specific sensing, communication, control and I/O, analog I/O, communication I/O and communications bit rate sensing.

In the following description, numerous specific details are set forth such as specific frequencies, etc., in order to provide a thorough understanding of the present invention. It will be obvious, however, to one skilled in the art that these details are not required to practice the invention. In other instances, well-known circuits, methods and the like are not set forth in detail in order not to unnecessarily obscure the present invention.

OVERVIEW OF AN APPLICATION OF THE PRESENT INVENTION

Before describing the present invention in detail, an understanding of a typical application will aid in appreciation of the details to follow. In FIG. 1, a simple, typical application is shown based on the use of the present invention in a home. In FIG. 1, the switch 22 is used through the present invention to control the light 23.

The arrangement 20 comprises a cell 27 which is connected to the switch 22. The cell is also connected to a transceiver 29 which couples data onto the lines 24 and 25. Power for the transceiver and cell are provided from the power supply 30 which receives power from the lines 24 and 25. For this example, the lines 24 and 25 are ordinary household wiring (e.g., 110VAC) and the power supply 30, a five volt DC supply. The cell 27 is preferably an integrated circuit which is described in more detail beginning with FIG. 10. The transceiver 29 may be any one of many well-known devices for receiving and transmitting digital data and as presently contemplated does not perform any processing on transmitted data. The entire arrangement 20 may be small enough to fit within an ordinary wallmounted electrical box which normally contains an electrical switch.

The arrangement 21 again may be small enough to fit within a typical electrical outlet box and includes a power supply 31 and transceiver 33 which may be identical in construction to the power supply 30 and transceiver 29, respectively. This cell 28 is coupled to the transceiver 30 and power supply 29 as well as the solenoid operated power switch 32. Cell 28 may be identical to cell 27 except for programming and an identification number which shall be discussed later. An output from the cell 28 controls the solenoid 32 to operate a power switch which in turn connects the light 23 to the power lines 34 and 35. The cell 28, as will be seen, can provide a digital or analog output, which can control a rheostat (not shown) or the like, thus enabling the dimming of the light 23.

The break 26 in the power lines 24 and 25 is used to indicate that the power lines 24 and 25 may not necessarily be on the same circuit as power lines 34 or 35. As will be seen, the transceiver 29 may not necessarily communicate directly with transceiver 33, but rather communication between the transceivers may require linkage through another cell and transceiver which repeats packets sent between the arrangements 20 and 21.

In FIG. 1, the transceivers 29 and 33 communicate over power lines. The transceivers may communicate with one another in numerous different ways over countless media and at any baud rate. They may, for example, each transmit and receive radio frequency or microwave frequency signals through antennas. The transceivers could be connected to a communications lines, such as an ordinary twisted pair or fiberoptic cable and thus communicate with one another independent of the power lines. Other known communications medium may be employed between the transceivers such as infrared or ultrasonic transmissions. Typical transmission rates are 10K bits per second (KBPS) for power lines. Much higher transmission rates are possible for radio frequency, infrared, twisted pairs, fiberoptic links and other media.

Cell 27 senses the opening or closing of the switch 22, then prepares a packet which includes a message initiating the state of the switch 22; the packet is communicated to the cell 28 through transceiver 29, lines 24 and 25, lines 34 and 35, and transceiver 33. The cell 28 acknowledges the message by returning a packet to the cell 27 and also acts upon the message it received by turning on or off the light 23 by operating the solenoid controlled power switch 32.

Each cell has a unique 48 bit identification number (ID number), sometimes referred to as the cell address. In the currently preferred embodiment, each cell as part of the manufacturing process, receives this permanent and unique ID number. (It cannot be changed following manufacturing.) As will be appreciated, with approximately $2^{48}$ possible ID numbers, each cell will have a unique ID number no matter how large a network becomes for practical purposes, or no matter how many networks are interconnected. The grouping device then accesses the individual cell IDs and assigns a system ID to each cell. In addition, the grouping device configures the cells into groups to perform group related functions.

For the illustration of FIG. 1, cell 27 is designated as "A" to indicate that its primary function is to "announce" that is, transmit the state of switch 22 on the network communications lines 24 and 25, and 34 and 35. On the other hand, cell 28 is designated with the letter "L" since its primary function in FIG. 1 is to "listen" to the network and in particular to listen to messages from cell 27. In subsequent figures, the "A" and "L" designations are used, particularly in connection with a group formation of multiple cells to indicate an announcer arrangement, such as arrangement 20 and a listener arrangement, such as arrangement 21. For purposes of discussion the cells themselves are sometimes referred to as transmitting or receiving data without reference to transceivers. (In some cases, the transceivers may be a simple passive network or simple wires, which couple the input/output of a cell onto a line. As will be seen the I/O section of the cells can provide output signals that can drive a twisted pair or the like. Thus the cells themselves can function as a transceiver for some media.)

The cells 27 and 28 as will be described subsequently are processors having multiprocessor attributes. They may be programmed prior to or after installing to perform their required function, such as an announcer or listener and for grouping combinations.

II. NETWORK ORGANIZATION AND DEFINITIONS

A. Definitions

Cell: A cell is an intelligent, programmable element or elements providing remote control, sensing and/or communications, that when interconnected with other like elements form a communications, control and sensing network or system with distributed intelligence.

Announcer: An announcer is a source of group messages.

Listener: A listener is a sink of group messages.

(An announcer in some cases may request state information from a listener.)

Repeater: A repeater is a cell which in addition to other functions reads packets from a medium and rebroadcasts them.

Group: A set of cells which work together for a common function (for example, a switch controlling a set of lights) is referred to as a "group".

In FIG. 2, the group 37 has an announcer 37a, listeners 37b, and 37c, and a listener 40. A group 38 includes an announcer 38a, listeners 38b and 38c and the listener 40. FIG. 2 illustrates that a single cell (cell 40) may be a listener in two groups. If announcer 37a has a light switch function, it can control lights through cells 37b, 37c and 40. Similarly, a switch associated with announcer 38a can control lights through cells 37c, 37b, and 40.

In FIG. 3, a group 42 includes announcers 44, 45 and listeners 46 and 47. The group 43 shares cell 44 with group 42; however, cell 44 is a listener for group 43. The group 41 shares cell 47 with group 42; cell 47 is an announcer for group 41 and for example, can announce to the listener 48 of group 41. Cell 47 also operates as a listener for group 42. A single cell as shown may be an announcer for one group and a listener for another group (cells are programmed to perform these functions, as will be discussed). However, as presently contemplated, a single cell cannot announce for more than one group.

(In the currently preferred embodiment each cell has three input/output pairs of lines and a select line. Each pair shares a common set of resources. The lines may be used independently for some functions where the required shared resources do not conflict. In other functions, the lines are used as pairs. In this example, a pair of leads from cell 27 are coupled to a light switch and another pair are used for communications from the announcer, cell 27.)

Subchannel: In FIG. 4, a first plurality of cells are shown communicating through a common medium such as a twisted pair 50 (cells are shown as "C", announcers as "A" and listeners as "L"). This (e.g., twisted pair 50) is defined as a subchannel, that is, a set of cells all of which communicate directly with one another over the same medium. A broadcast by any member of the subchannel, such as the cell 49, will be heard by all members of that subchannel over the twisted pair 50.

Channel: A channel comprises two or more subchannels where all the cells communicate using the same medium. In FIG. 4, another plurality of cells are shown coupled to twisted pair 52 forming another subchannel. Assume cells 56 and 57 communicate between one another through a twisted pair 72. They form yet another subchannel. The cells associated with the twisted pairs 50, 52 and 72 comprise a single channel. It is possible that the twisted pairs 50, 52 and 72 are one continuous twisted pair with one subchannel 50 so far apart from the second subchannel 52 that the only communications between subchannels is over the portion of the twisted pair 72 running between cells 56 and 57. In this case the cells 56 and 57 are assigned to be "repeaters" in addition to whatever other function they may serve (e.g., announcer or listener).

A group 55 is illustrated in FIG. 4 which comprises an announcer and listener in the two different subchannels. Another group 75 is illustrated comprising an announcer on one subchannel 51 and subchannel 52, where the subchannels are not part of the same channels since they use different media.

Gateway: A gateway reads packets from two different media and rebroadcasts them. A cell may be a gateway. Communications between channels is through gateway 54.

In FIG. 4, an additional subchannel which includes the cell 58 is coupled to another medium 51, for example, a common power line. The cell 58 is shown connected to channel gateway 54 which in turn communicates with the twisted pair 52. The gateway 54 does not necessarily perform either an announcer or listener function, but rather for the illustrated embodiment, performs only a channel gateway function by providing communication between two different media.

Subnetwork: A subnetwork comprises all the cells having the same system identification (system ID). For example, all the cells in a single family home may have the same system ID. Therefore, the channels of FIG. 4 may be part of the same subnetwork in that they share the same system ID.

Full Network: A full network may comprise a plurality of subnetworks each of which has a different system ID; a communications processor is used for exchanging packets between subnetworks. The communications processor translates packets changing their system ID, addressing and other information. Two factory buildings may each have their own system ID, but control between the two is used by changing system IDs. (The word "network" is used in this application in its more general sense and therefore refers to other than a "full network" as defined in this paragraph.)

Other terms used later are:

Probe Packet: A packet routed by flooding which accumulates routing information as it travels through the network.

Grouping Device: A device that controls determination of routes among cells, assigns cells to groups, and assigns function to group members.

Contention: The state which exists when two or more cells attempt to transmit a broadcast of the same subchannel at the same time and their signal interfere.

B. GROUP FORMATION

1. Cells Assigned to a Group by a Postinstallation Grouping Device.

Assume that the plurality of cells shown in FIG. 5 are all connected to communicate over the power lines in a home and are part of the same channel. Further assume that one cell, announcer 60, is to be grouped with the listener 65. The lines between the cells such as line 59 is used to indicate which of the cells can communicate directly with one another, for instance, announcer 60 and cell 61 can communicate with one another. (Cells 61, 62, 63, 64 and 66 of course may be announcers or listeners in other groups, but for purposes of explanation are shown as "C" in FIG. 5.) Since announcer 60 and cells 61, 62, and 63 all communicate with one another, they are on the same subchannel. Similarly, cells 62, 64, 65, and 66 are another subchannel. (There are other subchannels in FIG. 5). Importantly, however, announcer 60 and listener 65 are in different subchannels of the channel of FIG. 5 and there are numerous routes by which a message can be passed from announcer 60 to listener 65, for example, through cells 61 and 64 or through cells 62 and 64, etc.

Note that even though all the cells are on the same power system of a house, they may not communicate directly with one another. For instance, the announcer 60 may be on one circuit which is only coupled to to the listener 65 through long lengths of wire running the length of a home and a low impedance bus bar of a circuit breaker panel. The high frequency communication meassages may be sufficiently attenuated through this path to prevent direct communications between cells even though they are physically close to one another.

For the following description, it is assumed that each of the cells can broadcast without interfering with the broadcast of other cells. That is, messages do not interfere with one another. The case where some contention occurs is dealt with under the protocol section of this application.

In one embodiment, the group of announcer 60 and listener 65 is formed by using the grouping device shown in FIG. 28. Note that before this group is formed the announcer 60 and listener 65 are ordinary cells, not designated to be an announcer and listener. Each grouping device may be assigned a unique 48 bit system ID at time of manufacture (in the presently preferred embodiment a 48 bit number is used). In the presently preferred embodiment, a cell is included with each grouping device. The cell's ID becomes the system ID. This assures that each system has a unique system ID. By way of example, each home has its own "grouping" device and hence, its own system ID for the subnetworks used in the home. This system ID is used in cell packets for the subnetwork. In this example, the grouping device has available the cell IDs of cells 60 and 65. (Various methods of obtaining cell IDs will be described later.)

The grouping device is connected to cell 60 by communicating through one of its three pairs of input/output (I/O) lines of the cell (or the select pin) and the grouping device reads the 48 bit ID number of the cell 60. (Different methods of determining the cell's IDs are described in the next section.) The grouping device next generates a random bit binary number which in the presently preferred embodiment is 10 bits. This number functions as a group identification number (also referred to as the group address) for the group comprising the announcer 60 and listener 65. The grouping device checks this number against other group IDs which it has previously assigned to determine if the group ID has previously been used. If it has been already used it generates another number. (A single grouping device, for instance keeps track of all the group IDs assigned in a single home.) The grouping device programs the cell 60 designating it as an announcer.

The grouping device may cause the announcer 60 to broadcast the group number in a special packet which asks all cells in the network to acknowledge the message if they have been designated as a member of this group. This is another way to verify that the group ID has not been used.

The grouping device now determines the ID number of the cell 65. This may be done by connecting the grouping device directly to the cell 65 even before the cell is installed or by other methods discussed in the next section. (A cell and a group can be assigned ASCII names, for example, "porchlight" (cell name) and "exterior lights" (group name). This is used to allow selection of cell IDs or group IDs by accessing the ASCII name.

Now the grouping device causes the announcer 60 to transmit a probe packet. The packet contains the ID of cell 65. The packet directs all cells receiving the packet to repeat it and directs cell 65 to acknowledge the packet. Each cell receiving the probe packet repeats it and adds to the repeated packet its own ID number. Each cell only repeats the packet once (the mechanism for preventing a probe packet from being repeated more that once is described later.)

The cell 65 receives the probe packet through numerous routes, including those which in the diagram appear to be most direct (via cell 62) and those which are longer, for example, via cells 61 and 64. It is assumed that the first probe packet to arrive at cell 65 took the most direct route and is therefore the preferred routing. (Assume that this is via cell 62.) Cell 65 receives a packet which indicates that the probe packet was transmitted by cell 60, repeated by cell 62 and intended for cell 65. The other probe packets received by cell 65 after this first packet are discarded by cell 65.

Cell 65 now transmits an acknowledgement back to announcer 60. This packet includes the routing of the probe packet (e.g. repeated by cell 62.) The packet directs cell 62 to repeat the packet to confirm its receipt.

After announcer 60 receives the acknowledgement packet for cell 65 it determines that cell 62 must be a repeater. The grouping devices causes announcer 60 to send a repeater assignment packet which includes the unique ID number of cell 62, the group number and a message which informs cell 62 that it is assigned to a repeater function for the group. This causes cell 62 to repeat all those packets for the group comprising announcer cell 60 and 65. Another message is sent from announcer 60 under control of the grouping device repeated by cell 62, designating cell 65 as a listener, causing it to act upon messages for the group (cell 65 becomes a group member.) The grouping device assigns members a member number which is stored by member cells.

The group formation described above is shown in FIG. 8 by steps or blocks 68 through 72. Block 68 illustrates the broadcasting of the probe packet (e.g., cell 60 transmits the inital probe packet to all cells). The packet inculdes the address of a destination cell. As the packet proceeds through the network, the packet and accumulates the ID numbers of those cells repeating the packet (block 69). Block 70 shows the acknowledgement (reply) to the probe packet from the destination cell (e.g. cell 65). This packet returns the ID numbers of the repeaters contained in the first received probe packet. Reporter assignment packets are sent out by the announcer causing each repeater to rebroadcast packets for the group; this is shown by block 71. Finally, as shown by block 72, the destination cell such as cell 65 is designated as a listener.

2. Cells Assigned to a Group by a Preinstallation Grouping Device.

There may be several types of preinstallation grouping devices, for example, see FIG. 28 for a device which may be used. One type is a device that a nuanufacture uses to preassign cells to groups. Another type of preinstallation grouping device is one that a retailer or other cell vendor may use to assign cells to groups before installation.

A grouping device assigns a cell to a group and assigns the cells function(s) for that group. The grouping device may also assign a system ID to the cell. The system ID assigned by a preinstallation grouping device is not necessarily a unique system ID (Postinstallation grouping devices assign a unique system ID to each system.)

One method that may be used by preinstallation grouping devices to generate a system ID is to choose a system ID from a range of the 48 bit address and system ID numbers that have been set aside for use as preinstallation system IDs. Just as the cell IDs in the range 1-1023 have been set aside for use as group IDs and group addresses, the cell IDs in the range 1024-2047 can be set aside for use as preinstallation system IDs.

It is desirable that grouping devices and other network control devices be able to identify preinstallation system IDs as opposed to postinstallation system IDs. Since postinstallation system IDs are generated by copying a cell ID, cell IDs should not be assigned in the range set aside for preinstallation system IDs. Therefore, ID numbers in that range whoud not be assigned to cells as cell IDs.

Cells may be sold in sets that have been preassigned to a group by the manufacture. The type of preinstallation grouping device used by the manufacturer assigns cells to groups by writing the appropriate codes into cells' nonvolatile memory. The user may install such a set of cells and it will operate without assignment by postinstallation grouping device provide that the set of cells may communicate via a single subchannel.

A user may assign cells to a group at the time cells are purchased or at any other time before installation. Such cells, unlike the case previously discussed, are not assigned to groups by the manufacture and are called unassigned cells. Unassigned cells all have the same system ID, a system ID number that has been set aside for use by unassigned cells.

The users assigns a set of cells to a group by using a preinstallation grouping device that may be different from the preinstallation grouping device used by a manufacturer.

Typically, such a grouping device will operate on one cell at a time. The operator commands the grouping device to generate a new group ID and system ID and then each cell is connected to the device in turn. The operator commands the grouping device to assign a cell to the group while the cell is connected to the grouping device. The grouping device assigns cells the same group ID and system ID until it is commanded by the operator to generate a new group ID and system ID.

The user may install such a set of cells and it will operate without use of a postinstallation grouping device provided that the set of cells can communicate via a single subchannel.

3. Unassigned Cells Grouping and Self-Assignment After Installation.

Unassigned cells may create a group and assign themselves to the group after installation in the following manner.

The first announcer cell that is stimulated via its sensor input (e.g., light switch) controls the group formation process. It chooses a system ID number at random from the range of system ID numbers that have been set aside for preinstallation grouping devices. It chooses a group ID number at random. It then broadcasts the group ID number in a packet that requests a reply from any cells that are members of that group. If the transmitting cell receives any such replies. it chooses another group ID at random. The cell continues this process of selecting a random group ID and testing to see if it is already in use until it finds a group ID that is unused in the system in which it is operating.

An unassigned cell's default configuration information programmed at the factory identifies its function as either a listener or an announcer. If the unassigned cell is an announcer, it waits for its sensing input to be stimulated, and when it is stimulated, the cell transmits a packet addressed to a group.

If an unassigned cell is a listener, it listens after power-up for a packet. The cell takes the group ID from the first packet it receives and assigns itself to that group.

The cell then sends a reply to the announcer cell. This reply is not an acknowledgement only packet; it is a packet that identifies the cell as a listener in the group and the packet must be acknowledged by the announcer. This assures that all of the listener identification packets will arrive at the announcer even though there will be contention and collisions in the process.

The cell that transmitted the group announcement builds a list of group members as each reply comes in. It then sends a packet to each listener assigning that listener a group member number.

4. Unassigned Cells Joining Preexisting Group After Installation

Unassigned cells may be added to existing systems and assigned to a group in a manner similar to the above method discussed in Section 3 above. A listener joins the system and a group by the same method as in Section 3 above.

In the above example, the announcer waits to be stimulated via its sensor input. An unassigned announcer waits for its first sensor input stimulation or its first received packet. Of those two events, the event that occurs first determines the subsequent actions of the announcer cell.

If the cell is stimulated first, it controls a group formation process just as in the above example. If the announcer cell receives a group packet first, it joins that group as an announcer. It then sends a packet to the group announcer requesting configuration information about the group (group size, number of announcers, etc.) and the assignment of a group member number.

C. METHODS OF IDENTIFYING A CELL FOR GROUPING

In order for a grouping device to go through the steps necessary to form a group or add a cell to a group, it must know the IDs of the cells to be added to the group. The grouping device then uses those cell IDs to address commands to the cells during the grouping process. The methods that a user with a grouping device may use to obtain the cell IDs are listed below. Note that a grouping device or other control device's ability to communicate with a cell in the following example may be limited by security procedures if used. The security procedures, limitations on communications and levels of security are not critical to the present invention. The following example assumes that no security procedures are in place. In particular, it may be impossible for a grouping device to communicate with installed cells unless the grouping device has the system key (system ID and encryption keys.)

1. Direct Connection to the Cell

The grouping device may be connected to an I/O line of the cell package and then send a message to the cell requesting its ID. Physical connection can be used to find a cell's ID either before or after the cell is installed. Known means can be used (e.g., a fuse or a programmed disable command) to allow a user to disable this function in an installed cell to protect the security of the system.

2. Selection of the Cell Through Use of Special Pin

The user may use the grouping device or some other selection device to physically select the cell by stimulating a cell input pin that has been designated to serve the selection function. The grouping device communicates with the cell through the normal communications channels and sends a broadcast message requesting that all selected cells reply with their ID. Only one cell is selected so only that cell will reply to the request. Physical selection can be used to find a cell's ID either before or after the cell is installed. Again, a means can be provided to allow a user to disable this feature to protect the security of the system.

3. Query All Names of Previously Grouped Cells

It is assumed in this example that ASCII "groups" and "cell" names have been previously assigned to the cells. For this method, the grouping device queries all of the cells in a system to report their group and cell names (ASCII name). The user scrolls through the list of group names by using the grouping device. The user selects the name of the group that is believed to contain the target cell. The grouping device displays the names of all of the cells that are in the group and their assigned tasks (announcer, listener, repeater). The user selects the name of the cell that is believed to be the target cell.

If the selected cell is an announcer, the grouping device prompts the user to activate the announcer by stimulating its input. For example; if the cell is attached to a light switch, the user turns the switch on and off. the cell sends announcement packets to the group. The grouping device listens to the communications channel and discovers the group and member numbers or other codes of the activated announcer.

If the selected cell is a listener cell, the grouping device sends packets to the cell (using the group and member numbers for addressing) commanding it to toggle its output. For example, if the cell controls a light, the light will flash on and off. This allows the user to verify that he has selected the correct cell.

The grouping device sends a packet (using group and member numbers for addressing) to the target cell with a command for the target cell to return its cell ID. The grouping device now knows the target ID and can proceed with the group assignment process.

Querying names is used to find a cell's ID before or after the cell is installed.

4. Stimulate Group

This method is used in a network in which group and cell ASCII names have been assigned. The user commands the grouping device to wait for the next group announcement. Then the user stimulates the announcer in the group of interest. For example, if the announcer is a light switch, the user throws the switch. The grouping device hears the announcement packet and extracts the group ID from it.

The user may verify that this group ID is for the desired group by causing the grouping device to send packets to all of the group listeners commanding them to toggle their outputs. The user verifies that it is the desired group by observing the actions of the listener cells (for example, if the group consists of lighting controls, the light flashes).

Now using that group ID, the grouping device broadcasts a packet to the group requesting that each cell reply with its cell name until the cell of interest is found. The user selects that name and the grouping device, knowing that cell's ID, can proceed with the group assignment process.

If a user elects, the ID of the cell may be verified before proceeding with the grouping procedure. The following procedure is used to verify that the ID is for the target cell.

If the selected cell is an announcer, the grouping device prompts the user to activate the announcer by stimulating its input. For example: if the cell is attached to a light switch, the user turns the switch on and off. The grouping device is then able to discover the group address and member number of the cell.

If the selected cell is a listener, the grouping device sends packets to the cell (using the group and member numbers, for addressing) commanding it to toggle its output. For example, if the cell controls a light, the light will flash on and off. This allows the user to verify that he has selected the correct cell.

5. Stimulate Announcer

This method is used in a network in which no group or cell ASCII names have been assigned but announcers and listeners have been assigned. The grouping device sends a packet to all cells in the network commanding each announcer to broadcast a packet containing its ID the next time it is stimulated. The grouping device then prompts the user to stimulate the announcer by activating its sensed device; for instance, turn on a light switch for a light switch announcer. Since the user will stimulate only one announcer, the grouping device will receive only one packet with a cell ID.

There is a chance that another announcer cell will be stimulated at the same time. Perhaps someone else throws a light switch or a temperature sensor detects a temperature change. The user may want to verify that the ID received is for the correct cell. To verify that the cell ID is the correct one, the user goes through the announcer stimulation process a second time and verifies that the same results occur.

6. Toggle Listener

This method is used in a network in which no group or cell names have been assigned. The grouping device broadcasts a packet that queries cells that are listeners to reply with their ID. The grouping device needs to limit the number of cells replying so the packet contains an ID bit mask to limit replies to a subset of the possible cell IDs. When the grouping device has developed a list of listener IDs, it allows the user to toggle each listener, causing the listener cell to turn its output on and off. The user continues through the list of listener cells until he observes the target cell toggling its output. The user has then identified the cell to the grouping device and it can proceed with the grouping operation.

D. PACKET FORMAT

Each packet transmitted by a cell contains numerous fields. For example, a format used for group announcements is shown in FIG. 6. Other packet formats are set forth in Table A. Each packet begins with a preamble used for synchronizing the receiving cell's input circuitry (bit synch). The particular preamble code used in the currently preferred embodiment is described as part of the three-of-six combinatorial codes (FIG. 9). A flag field of 6 bits begins and ends each of the packets. The flag field code is also described in FIG. 9.

As currently preferred, each of the cells reads-in the entire packet, does a cyclic redundancy code (CRC) calculation on the packet except for the contention timer field and compares that result with the CRC field of the received packet. The ALU 102 of FIG. 12 has hardware for calculating the packet CRC and CRC registers 130 for storing intermediate results. If the packet CRC cannot be verified for an incoming packet, the packet is discarded. The packet CRC field is 16 bits as calculated, then converted into 24 bit fields for transmission in a 3-of-6 code using the encoding of FIG. 9. (For the remainder of discussion of packet fields in this section, the field length is described prior to encoding with the 3-of-6 combinatorial codes of FIG. 9.) In the currently preferred embodiment the CRC is a CCITT standard algorithm $$(X^{16}+X^{12}+X^5+1).$$

The system ID is a 32 bit field as currently preferred. The other 16 bits of the 48 bit system ID are included in the CRC calculation but not transmitted as part f the packet (FIG. 29).

The link address field is a 48 bit field. When this field is all zeroes the packet is interpreted as a system wide broadcast which is acted upon by all the cells. For instance, a probe packet has an all zero field for the link address. Group addresses are contained within the link address. For group addresses the first 38 bits are zero and the remaining 10 bits contain the group address. (The cell ID numbers assigned at the factory mentioned earlier range from 1024 to $2^{48}$ since $2^{10}$ addresses are reserved for groups.) The link address, in some cases, is an individual's cell's address. (For example, when a cell is being assigned the task of repeater or listener.)

The contention timer is a 10 bit field with an additional 6 bits for a CRC field (or other check sum) used to verify the 10 bits of the timer field. Each cell which repeats a packet operates upon this field if the cell must wait to transmit the packet. If packets are being transmitted by other cells a cell must wait to transmit its packet, the time it waits is indicated by counting down the contention timer field. The rate at which this field is counted down can be programmed in a cell and this rate is a function of the type of network. The field starts with a constant which may be selected by the type of network. Each cell repeating the packet counts down from the number in the field at the time the packet is received. Therefore, if a packet is repeated four times and if each of the four cells involved wait for transmitting, the number in the contention field reflects the sum of the times waited subtracted from a constant (e.g., all ones). When the contention timer field reaches all zeroes, the cell waiting to transmit the packet discards the packet rather than transmit it. This prevents older packets from arriving and being interpreted as being a new packet.

As mentioned, the contention timer has its own 6 bit CRC field. If the contention timer field were included in the packet CRC, the packet CRC could not be computed until a packet could actually be transmitted. This would require many calculations in the last few microseconds before a transmission. To avoid this problem a separate CRC field is used for the contention timer field. If the contention timer field cannot be verified by its 6 bit CRC, the packet is discarded.

The hop count field records the number of hops or retransmissions that a packet takes before arriving at its destination. This 4 bit field starts with a number which is the maximum number of retransmissions allowed for a particular packet and is decremented by each cell repeating a packet. For example, in a packet originated by a group announcer the starting "hop" count is the maximum number of retransmissions that the packet must undergo to reach all of the cells in a group. When this field becomes all zeroes, the packet is discarded by the cell, rather than being retransmitted Therefore, 16 hops or retransmissions is the limit as currently implemented.

The link control field provides the link protocol and consists of 8 bits. This field is discussed in a subsequent section covering other layers of the protocol.

The random/pseudo random number field contains an 8 bit random number which is generated for each packet by the cell originally transmitting the packet. This number is not regenerated when a packet is repeated. This number is used as will be explained in conjunction with FIG. 8 to limit rebroadcasting of probe packets; it also may be used in conjunction with encryption where the entire packet is to be encrypted.

The network control field (4 bits) indicates routing type or packet type, for instance, network control, group message, probe message, etc.

The source address field (variable size) contains, by way of example, the 48 bit ID number of the cell originating a packet. For a probe packet this field contains the ID number of the announcer. For an acknowledgement the field contains the ID of the listener. For a packet addressed to a group, this field contains the source cell's group member number.

The destination list is described in conjunction with FIG. 7.

The message field is variable in length and contains the particular message being transmitted by the packet. Typical messages are contained in Appendix B. In the case of a probe packet the field includes the routing; that is, each cell repeating includes its ID number to this field. The messages, once a group is formed, will, for instance, is used by announcer 60 to tell listener 65 to turn-on a light, etc.

The encryption field, when used, contains 16 bits used to verify the authenticity of an encrypted packet typically this portion of a packet is not changed when a packet is repeated. Well-known encryption techniques may be used.

The bracket 99 of FIG. 6 represents the portion of a packet which remains unaltered when a packet is repeated. These fields are used to limit repeating as will be described in conjunction with FIG. 8.

The destination list field of the packet of FIG. 6 is shown in FIG. 7. The destination list begins with a 4 bit field which indicates the number of members in a group designated to receive a message in the packet. Therefore the packet can be directed to up to 16 members of a group. The number of each of the members within the group is then transmitted in subsequent 8 bit fields. The group number contained in the link address and member number contained in the destination list forms an address used to convey messages once the group is formed. If the destination number is zero, the packet is addressed to all members of the group. For some packet types this field contains the ID of the receiving cell (see Table A).

E. MECHANISM FOR PREVENTING REBROADCASTING OF CERTAIN PACKETS

As previously mentioned, the probe packets are repeated only once by each of the cells after the packet is initially broadcast. A special mechanism programmed into each of the cells allows the cells to recognize packets which it has recently repeated.

First, it should be recalled that as each cell transmits, or retransmits a packet, it calculates a packet CRC field which precedes the end flag. For packets that are repeated, a new CRC is needed since at least the hop count will change, requiring a new packet CRC field for the packet. This CRC field is different from the CRC field discussed in the next paragraph.

As each packet requiring repeating is received, a repeater CRC number is calculated for the fields extending from the beginning of the link control to the end of the destination list as indicated by bracket 99 of FIG. 6. As a cell rebroadcasts a packet it stores the 16 bit repeater CRC results in a circular list of such numbers if the same number is not already stored. However, the packet is repeated only if the circular list does not contain the repeater CRC results calculated for the field 99.

Therefore, as each packet is received which requires repeating, the CRC is computed for the field 99. This is shown by block 73a of FIG. 8. This number is compared with a list of 8 numbers stored within the RAM contained within the cell indicated by block 73b. If the number is not found within the stored numbers, the new repeater CRC results are stored as indicated by block 73c and the packet is repeated. On the other hand, if the number is found then the packet is not repeated. As presently implemented, 8 numbers are stored in a circular list, that is, the oldest numbers are discarded as new ones are computed.

The use of the repeater CRC calculation associated with the field 99 and the use of the circular list will prevent repeating of a previously rebroadcasted packet. Note that even if an announcer continually rebroadcasts the same sequence of messages, for example, as would occur with the continuous turning on and turning off of a light, a cell designated as a repeater will rebroadcast the same message since the packet containing messages appears to be different. This is true because the random number sent with each of the identical messages will presumably be different. However, in the instance where a cell receives the same message included within the same field 99 (same random number), the packet with its message will not be rebroadcast. This is particularly true for probe packets. Thus, for the establishment of groups discussed above, the broadcast probe packets quickly "die out" in the network, otherwise they may echo for some period of time, causing unnecessary traffic in the network.

F. THREE-OF-SIX-COMBINATORIAL CODING

In many networks using the synchronous transmission of digital data, encoding is employed to embed timing information within the data stream. One widely used encoding method is Manchester coding. Manchester or other coding may be used to encode the packets described above, however, the coding described below is presently preferred.

A three-of-six combinatorial coding is used to encode data for transmission in the presently preferred embodiment. All data is grouped into 4 bit nibbles and for each such nibble, six bits are transmitted. These six bits always have three ones and three zeroes. The transmission of three ones and three zeroes in some combination in every six bits allows the input circuitry of the cells to quickly become synchronized (bit synch) and to become byte synchronized as will be discussed in connection with the I/O section. Also once synchronized (out of hunt mode) the transitions in the incoming bit stream are used to maintain synch.

The righthand column of FIG. 9 lists the 20 possible combinations of 6 bit patterns where 3 of the bits are ones and 3 are zeroes. In the lefthand column, the corresponding 4 bit pattern assigned to the three-of-six pattern is shown. For example, if the cell is to transmit the nibble 0111, it is converted to the bit segment 010011 before being transmitted. Similarly, 0000 is converted to 011010 before being transmitted. When a cell receives the 6 bit patterns, it converts them back to the corresponding 4 bit patterns.

There are 20 three-of-six patterns and only 16 possible 4 bit combinations. Therefore, four three-of-six patterns do not have corresponding 4 bit pattern assignments. The three-of-six pattern 010101 is used as a preamble for all packets. The flags for all packets are 101010. The preamble and flag patterns are particularly good for use by the input circuitry to establish data synchronization since they have repeated transitions at the basic data rate. The two three-of-six patterns not assigned can be used for special conditions and instructions.

Accordingly, a cell prepares a packet generally in integral number of bytes and each nibble is assigned a 6 bit pattern before transmission. The preamble and flags are then added. The circuitry for converting from the 4 bit pattern to the 6 bit patterns and conversely, for converting from the 6 bit patterns to the 4 bit patterns is shown in FIGS. 14 and 15.

III. COMMUNICATION AND CONTROL CELL

A. Overview of the Cell

Referring to FIG. 10, each cell includes a multiprocessor 100, input/output section 107-110, memory 115 and associated timing circuits shown specifically as oscillator 112, and timing generator 111. Also shown is a voltage pump 116 used with the memory 115. This cell is realized with ordinary integrated circuits. By way of example, the multiprocessor 100 may be fabricated using gate array technology, such as described in U.S. Pat. No. 4,642,487. The preferred embodiment of the cell comprises the use of CMOS technology where the entire cell of FIG. 10 is fabricated on a single silicon substrate as an integrated circuit. (The multiprocessor 100 is sometimes referred to in the singular, even though, as will be described, it is a multiprocessor, specifically four processors.)

The multiprocessor 100 is a stack oriented processor having four sets of registers 101, providing inputs to an arithmetic logic unit (ALU) 102. The ALU 102 comprises two separate ALU's in the presently preferred embodiment.

The memory 115 provides storage for a total of 64 KB in the currently preferred embodiment, although this particular size is not critical. One portion of the memory is used for storing instructions (ROM code 115a). The next portion of the memory is a random-access memory 115b which comprises a plurality of ordinary static memory cells (dynamic cells can be used). The third portion of the memory comprises an electrically erasable and electrically programmable read-only memory (EEPROM) 115c. In the currently preferred embodiment, the EEPROM 115c employs memory devices having floating gates. These devices require a higher voltage (higher than the normal operating voltage) for programming and erasing. This higher potential is provided from an "on-chip" voltage pump 116.

The entire address space for memory 115 addressed through the ALU 102a which is one part of the ALU 102.

The ROM 115a stores the routines used to implement the various layers of the protocol discussed in this application. This ROM also stores routines needed for programming the EPROM 115c. The application program for the cell is stored in ROM 115a and, in general, is a routine which acts as a "state machine" driven by variables in the EEPROM 115c and RAM 115b. RAM 115b stores communications variables and messages, applications variables and "state machine" descriptors. The cell ID, system ID and communications and application parameters (e.g., group number, member number, announcer/repeater/listener assignments) are stored in the EEPROM 115c. The portion of the EEPROM 115c storing the cell ID is "write-protected" that is, once programmed with the cell ID, it cannot be reprogrammed.

The input/output section of the cell comprises four subsections 107, 108, 109 and 110. Three of these subsections 107, 108 and 109 have leads 103, 104, and 105 respectively for communicating with a network and/or controlling and sensing devices connected to the cell. The remaining subsection 110 has a single select pin 106 which can be used to read in commands such as used to determine the cell's ID. As presently implemented, the subsection 110 is primarily used for timing and counting. The input/output section is addressed by the processor through a dedicated address space, and hence, in effect appears to the processor as memory space. Each I/O subsection can be coupled to each of the subprocessors. This feature, along with the multiprocessor architecture of processor 100, provides for the continuous (non-interrupted) operation of the processor. The I/O section may be fabricated from well-known circuitry; the presently preferred embodiment is shown in FIG. 17 through 23.

The cell of FIG. 10 also includes an oscillator 112 and timing generator III, the latter provides the timing signals particularly needed for the pipelining shown is FIG. 13. Operation at a 16 mHz rate for the phases 1-4 of FIG. 13 is currently preferred, thus providing a 4 mHz minor instruction cycle rate. Other well-known lines associated with the cell of FIG. 10 are not shown (e.g., power).

All of the cell elements associated with FIG. 10 are, in the preferred embodiment, incorporated on a single semiconductor chip, as mentioned.

B. PROCESSOR

The currently preferred embodiment of the processor 100 is shown in FIG. 12 and includes a plurality of registers which communicate with two ALU's 102a and 102b. (Other processor architectures may be used such as one having a "register" based system, as well as other ALU and memory arrangements.) The address ALU 102a provides addresses for the memory 115 and for accessing the I/O subsections. The data ALU 102b provides data for the memory and I/O section. The memory output in general is coupled to the processor registers through registers 146 to DBUS 223.

The 16-bit ABUS 220 provides one input to the address ALU 102a. The base pointer registers 118, effective address registers 119 and the insruction pointer registers 120 are coupled to this bus. (In the lower righthand corner of the symbols used to designate these registers, there is shown an arrow with a designation "×4". This is used to indicate that, for example, the base pointer register in 4 deep, more specifically, the base pointer register comprises 4 16-bit registers, one for each processor. This is also true for the effective address registers and the instruction pointer registers.) The BBUS 221 provides up to a 12 bit input to the ALU 102a or an 8 bit input to the data ALU 102b through register 142. The 4 deep top of stack registers 122, stack pointer registers 123, return pointer registers 124 and instruction registers 125 are coupled to the BBUS.

The CBUS 222 provides the other 8-bit input to the ALU 102 through register 143. The CBUS is coupled to the instruction pointer registers 120, the 4 deep top of stack registers 122, the four carry flags 129, and the 4 deep CRC registers 130 and the 4 deep next registers 131.

The MBUS, coupled to the output of the memory, can receive data from the output of the ALU 102b through register 145b, or from the memory or I/O sections (107-110). This bus through register 146 and the DBUS 223 provides inputs to registers 118, 119, 120, 122, 123, 124, 125, 130, 131 and to the carry flags 129.

There is a 16-bit path 132 from the output of the address ALU 102a to the registers 120. The ALU 102b includes circuitry for performing CRC calculations. This circuitry driectly connects with the CRC registers 130 over the bidirectional lines 133. The top of stack registers 122 are connected to the next registers 131 over lines 138. These lines allow the contents of register 122 to be moved into registers 131 or the contents of register 131 to be moved into registers 122. As currently implemented, a bidirectional, (simultaneous) swap of data between these registers is not implemented. Four bits of data from the output of the memory may be returned directly either to the instruction pointer registers 120 or the instruction registers 125 through lines 139.

The pipelining (registers 141, 142, 143, 145 and 146) of data and addresses between the registers, ALU, memory and their respective buses is described in conjunction with FIG. 13.

The data in any one of the stack pointer registers 123 or any one of the return pointer registers 124 may be directly incremented or decremented through circuit 127.

Both ALU's 102a and 102b can pass either of their inputs to their output terminals, can increment and can add their inputs. ALU 102b in addition to adding, provides subtracting, shifting, sets carry flags 124 (when appropriate), ANDing, ORing, exclusive ORing and ones complement arithmetic. The ALU 102b in a single step also can combine the contents of next registers 131 and CRC registers 130 (through paths 222 and 133) and combine it with the contents of one of the top stack registers 122 to provide the next number used in the CRC calculations. Additionally, ALU 102b performs standard shifting and provides a special nibble feature allowing the lower or higher four bits to be shifted to a higher or lower four bits, respectively. Also, ALU 102b performs a 3-of-6 encoding or decoding described in Section F.

In the preferred embodiment with a single semiconductor chip for a cell there are basic contact pads on the die for power and ground and all the I/O pins A and B and the "read only" pin 106 (subsections 107, 108, 109 and 110, FIG. 12). These contact pads are used for attachment to package pins for a basic inexpensive package.

In addition to the basic contact pads additional pads in the presently preferred embodiment will be provided with connections to the ADBUS 224 and the MBUS 225 of FIG. 12. One control contact pad may be provided to disable internal memory. By activating the control contact the internal memory is disabled and the data over ADBUS and MBUS is used by the processors. This allows the use of a memory that is external to the cell. It is assumed that the additional contact pads may not be available for use when the cell is in an inexpensive package. These additional contacts may be accessed by wafer probe contacts or from pins in packages that have more than the minimum number of pins.

The cell as manufactured requires an initialization program. At wafer probe time the external memory is used for several purpose, one which is to test the cell. Another use is to provide a program to write the cell ID into the EEPROM during the manufacturing process. Any necessary EEPROM instructions to allow power up boot when the cell is later put in use may be added at this time. Initialization programs and test programs are well-known in the art.

C. PROCESSOR OPERATION

In general, memory fetches occur when the ALU 102a provides a memory address. The memory address is typically a base address or the like on the ABUS from one of the base points in registers 118, effective address registers 119 or instruction pointer register 120 combined with an offset on the BBUS from the stack pointer register 123, returned pointer register 124, top of stack registers 122 or the instruction registers 125.

Calculations in the ALU 102b most typically involve one of the top of stack registers 122 (BBUS) and the next registers 131 (CBUS) or data which may be part of an instruction from one of the instruction registers 125.

While in the presently preferred embodiment, the processor operates with the output of the memory being coupled to the DBUS 223 through register 146, the processor could also be implemented with data being coupled directly to the input of ALU 102b. Also, the function performed by some of the other registers, such as the effective address registers 119 can be performed by other registers, although the use of the effective address registers, and for example, the CRC registers, improve the operation of the processor.

· In general, for memory addressing, a base pointer is provided by one of the registers 118, 119 or 120 with an offset from one of registers 122, 123, 124 or 125. The address ALU 120a provides these addresses. Also, in general, the ALU 120b operates on the contents of the top of stack and next register; there are exceptions, for example, the instruction register may provide an immediate input to the ALU 102b. Specific addressing and other instructions are described below.

D. MULTIPROCESSOR OPERATION

The processor is effectively a multiprocessor (four processors) because of the multiple registers and the pipelining which will be described in conjunction with FIG. 13. As mentioned, one advantage to this multiprocessor operation is that interrupts are not needed, particularly for dealing with input and output signals. The multiprocessor operation is achieved without the use of separate ALUs for each processor. In the currently preferred embodiment, economies of layout are obtained by using two ALUs (102a and 102b) however, only one of the ALUs operates at any given time. (Note the BBUS provides an input to both ALUs.) Therefore, the multiprocessor operation of the present invention may be obtained using a single ALU.

The processing system has four processors sharing an address ALU, a data ALU and memory. A basic minor cycle takes four clock cycles for each processor. The ALUs take one clock cycyle and the memory takes one clock cycle. The minor cycles for each processor are offset by one clock cycle so that each processor can access memory and ALUs once each basic minor cycle. Since each processor has its own register set it can run independently at its normal speed. The system thus pipelines four processors in parallel.

Each register of FIG. 12 is associated with one of four groups of registers and each group facilitates the multiprocessor operation and is associated with a processor (1-4) of FIG. 13. Each of the four groups includes one base pointer register, effective address register, instruction pointer register, top of stack register, stack pointer register, return pointer register, instruction register, CRC register, next register, and a carry flag. Each related group of register corresponds to one of the four processors. Each processor executes instructions in minor cycles, each minor cycle consisting of four clock cycles. During the first clock cycle a processor will gate the appropriate registers onto the ABUS, BBUS and CBUS. In the next clock cycle the ALUs will be active generating data from their inputs of the ABUS, BBUS and CBUS. Memory or I/O will be active during the third clock cycle, with the address coming from the ALU 102a and data either being sourced by memory or the ALU 102b. The fourth and final clock cycle will gate the results from memory or the ALU 102b into the appropriate register via the DBUS.

A processor can be viewed as a wave of data propagating through the sequence described above. At each step the intermediate results are clocked into a set of pipeline registers. By using these pipeline registers it is possible to separate the individual steps in the sequence and therefore have four steps executing simultaneously. The four processors can operate without interfereing with one another even though they share the ALUs, memory, I/O and many control circuits.

The control of a processor including the pipelining is best understood from FIG. 11. For each processor there is a 3 bit counter and an instruction register. These are shown in FIG. 11 as counters 137a through 137d, each of which is associated with one of the instruction registers 125a through 125d, respectively. Each of the instruction registers is loaded through the DBUS. As an instruction register is loaded, the instruction is coupled to a PLA 212. The PLA determines from the instruction how many minor cycles are required to execute the instruction and a 3 bit binary number is then loaded into the counter 113a or 113b or 113c or 113d, associated with the instruction register 125a, or 125b, or 125c or 125d being loaded. For instance, for a CALL instruction loaded into instruction register 125c, the binary number 010 (indicating three minor cycles) is loaded into counter 137c. (Up to 8 minor cycles can be used for a given instruction, however, only up to 6 minor cycles are used for any of the instructions in the currently preferred embodiment.) The count value "000" is used to cause a new instruction to be fetched.

The count (e.g., 3 bits) in a counter and the instruction (e.g., 12 bits) in its associated instruction register from a 15 bit input to the PLA 136. These 15 bit inputs from each of the respective four sets of count registers and four sets of instruction registers are sequentially coupled to the PLA 136 as will be described. The output of the PLA controls the operation of the processors. More specifically: lines 213 control data flow on the ABUS, BBUS and CBUS; lines 214 control the ALU 102; lines 215 control the memory; (and, as will be described later I/O operation of subsections 107, 108, 109 and 220) and lines 216 control data flow on the DBUS. The specific outputs provided by the PLA 136 for a given instruction is best understood from the instructions set, set forth later in this application. The action taken by the processors to execute each of the instructions is described with the instruction set.

The outputs from the PLA on lines 213 are coupled directly to the devices controlling data flow on the ABUS, BBUS, and CBUS. The signals controlling the ALU are coupled through a one clock phase delay register 217 before being coupled to the ALU via the lines 214. Since all the registers 217 are clocked at the same rate, the register 217 performs delay functions as will be described. Those signals from the PLA 136 used for memory control are coupled through two stages of delay registers 217 before being coupled to the memory, thus the signals on lines 215 are delayed for two clock phases related to the signals on lines 213. The control signals for the DBUS after leaving the PLA 136 are coupled through 3 sets of delay registers 217 before being coupled to the lines 216 and therefore are delayed three clock phases related to those on lines 213. The registers 217 are clocked at a 6 mHz rate, thus when the PLA 136 provides output control signals for a given instruction (e.g., contents of instruction registor 125a) the control signals during a first clock phase are coupled to lines 213, during a second clock phase, lines 214; during a third clock phase, 215; and during a fourth clock phase to lines 216. During the first clock phase of each instruction cycle, the contents of the counter 137a and the instruction register 125a are coupled to the PLA 136. During the second clock phase, the contents of the counter 137b and instruction register 125b are coupled to the PLA 136 and so on for the third and fourth clock phases.

Assume now that instructions have been loaded into the instruction registers 125a and the counters 137a through 137d have been loaded with the corresponding binary counts for the minor cycles needed to perform each of the instructions. For example, assume that register 125a is loaded with a CALL instruction and the 010 has been loaded into counter 137a. During a first instruction minor cycle, 010 and the 12 bit instruction for CALL are coupled to the PLA 136. From this 15 bit input PLA 136 provides at its output all the control signals needed to complete the first minor cycle of the CALL instruction (e.g., four clock phases) for the ABUS, BBUS CBUS, the ALU, the memory and the DBUS. Since the system uses pipelining multiprocessing, the control signals on lines 213 used to carry out the first clock phase of the CALL instruction which is the inputs to the ALUs. (During this first clock phase the other control lines are controlling the ALU, the memory and the DBUS of other processors, for different instructions in the pipelines.) During phase 2, the count in counter for 137b and the instruction in register 125b are coupled to the PLA 136. During phase 2, the signals on lines 213 now control the ABUS, BBUS and CBUS inputs to the ALUs for the second processor to carry out the instruction contained in register 125b. During this second clock phase, the signals on lines 214 control the first processor and the ALU to perform the functions needed to carry out the second clock phase of the CALL instruction contained in register 125a. (Note a delay equal to one phase was provided by register 217.) Similarly, during the third phase, the signals on lines 213 control the ABUS, BBUS, and CBUS for the third processor to carry out the instruction contained in register 125c; the signals on lines 214 control the ALU to carry out the instruction contained in register 125b, and the signals on lines 215 control the memory to carry out the instructions in register 125a for the first processor. And, finally, during the fourth clock phase, the instruction from registor 125d, along with the count in counter 137d and coupled to the PLA 136. The signals on lines 213 control the ABUS, BBUS and CBUS to carry out the instruction contained within register 125d fourth processor; the signals on lines 214 control the ALU to carry out the instruction in register 125c for the third processor; the signals on lines 215 control the memory to carry out the instruction in register 125b for the second processor; and the signals on lines 216 control the DBUS to carry out the instruction in register 125a for the first processor.

After four cycles of the 16 mHz clock the count in register 137a decrements to 001. Each register is decremented on the clock cycle following the use of the contents of the counters contained by the PLA 136. The input to the PLA 136 thus changes even though the instruction within register 125a is the same. This allows the PLA 136 to provide new output signals needed for the second minor cycle of the CALL instruction. These control signals are rippled through the control through the control lines 213, 214, 215 and 216 as described above. When the count in a counter reaches 000, this is interpreted as an instruction fetch for its associated processor.

Therefore, each of the four processors may simultaneously execute an instruction where each of the instructions has a different number of cycles. The control signals reaching the imaginary line 219 for any given clock cycle represent control signals for four different instructions and for four different processors. For example, the control signals associated with the first processor during a first cycle appear on lines 213; during a second cycle on lines 214; during a third cycle on lines 215; and during a fourth cycle on lines 216. The control signals needed by the second processor follow behind; those needed by the third and fourth processors following behind those used by the second processor.

The pipelining of the signals is illustrated in FIG. 13. The multiprocessor operation of the processor 100 of FIG. 10 is shown in FIG. 13 as four processors, processors 1, 2, 3 and 4. Each one of the groups of registers is associated with one of the processors. The four phases of a single instruction cycle are shown at the top of FIG. 13. In FIG. 13, registers 101 are used to indicate that the contents from the specific registers called for in an instruction are placed on the ABUS, BBUS and CBUS. The registers are 118, 119 and 120 on the ABUS; 122, 123 124 and 125 on the BBUS; 120, 122, 129, 130 and 131 on the CBUS.

During a first phase, signals previously stored in the group 1 registers (e.g., two of them) are gated from the registers onto the ABUS, BBUS and CBUS. While this is occurring, signals associated with the group 2 registers are gated from the registers 141, 142, 143 into the ALU 102a and 102b. This is shown in FIG. 13 as processor 2 under the first phase column. Simultaneous signals are gated from registers 145a and 145b into the memory for group 3 registers for processor 3. And, finally, during this first phase, signals associated with the group 4 registers are gated from registers 146 onto the DBUS. During the second phase, signals associated with a group 1 registors are coupled from the ALU to registers 145. The data associated with group 2 registers are coupled to memory. The data associated with the group 3 registers is coupled from the register 146 onto the DBUS. Those associated with the group 4 registers are gated onto the ABUS, BBUS and CBUS. And, similarly, during the third and fourth phase of each instruction cycle, this pipelining continues as shown in FIG. 13, thus effectively providing four processors.

E. PROCESSOR INSTRUCTIONS

In this section each instruction of the processor is set forth, along with the specific registers and memory operations. Lower case letters are used below to indicate the contents of a registor. For example, the contents of the insruction register are shown as "ip". The registers and flags are set forth below with their correlation to FIG. 12.

FIGURE 12

IDENTIFICATION ip    instruction pointer (14 bits)      120

(fixed range of 0000 - 3FFF)

(not accessible to ROM based programs)

ir    instruction register (12 bits)      125

(not accessible to ROM based programs)

| | | |
|---|---|---|
| bp | base page pointer (14 bits) (fixed range of 8000 -FFFF) (write only) | 118 |
| ea | effective address pointer (16 bits) (not accessible to ROM based programs) | 119 |
| sp | data stack pointer (8 bits) (positive offset from bp, grows down) | 123 |
| rp | return stack pointer (8 bits) (positive offset from bp, grows up) | 124 |
| tos | top of data stack (8 bits) | 122 |
| next | item below top of data stack (8 bits) | 131 |
| crc | used as scratch or in CRC calculations (8 bits) | 130 |
| flags | carry flags, (1 bit) processor ID (2 bits) | 129 |

The top element of the return stack is also addressable as a register, even though it is physically located in RAM.

Instruction Table

| | | |
|---|---|---|
| CALL | 1aaa aaaa aaaa | Subroutine call |

| | | |
|---|---|---|
| CALL lib | 0000 aaaa aaaa | Library call |
| BR | 0010 1aaa aaaa | Branch |
| BRZ | 0010 00aa aaaa | Branch on TOS==0 |
| BRC | 0010 11aa aaaa | Branch on Carry set |
| CALL  interseg | 0011 LLLL LLLL<br>0000 hhhh hhhh | (Subroutine)<br>Two word instructions |
| LIT | 0101 1ffh bbbb | Constant op TOS |
| LDC | 0101 111h bbbb | Load Constant |
| ALU | 0101 00ef ffff | Top of Stack and NEXT |
| RET | 0101 0011 1101 | Return or Bit set<br>in other instruction |
| IN,OUT | 0100 0wrr rrrr | Read/Write I/O Register |
| LD,ST  bp+a | 0100 1waa aaaa | Load, Store |
| LD,ST  (bp+p)+a | 011p pwaa aaaa | Load, Store |
| LDR,STR  r | 0101 010w rrrr | Load, Store CPU reg |

For each instruction, the operation, encoding and timing are set forth below in standard C language notation.

CALL    Call Procedure

Operation:

*rp++ = lowbyte (ip);

*rp++ = hibyte (ip);

ip = dest;

Encoding:

intra-segment:

1aaa aaaa aaaa dest = ip + a + 1; /* displacement a is always negative */ inter-segment:

0011 LLLL LLLL

0000 HHHH HHHH dest = H:L;     /* 16 bit absolute address */ library:

0000 aaaa aaaa dest = 0x8000+*(0x8001 + a);    /* table lookup call */

Timing:

| CALL type | #clocks | | specific memory operation |
|---|---|---|---|
| intra-seg | 3 | | |
| | | 2 | *rp++ = lobyte (ip) |
| | | 1 | *rp++ = hibyte (ip) |
| | | 0 | ir = *(ip = *dest) |

| | | | |
|---|---|---|---|
| interseg | 5 | | |
| | | 4 | lobyte (ea) = *ip++ |
| | | 3 | hibyte (ea) = *ip |
| | | 2 | *rp++ = lobyte (ip) |
| | | 1 | *rp++ = hibyte (ip) |
| | | 0 | ir = *(ip = *dest) |
| library | 4 | | |
| | | 3 | *rp++ = lobyte (ip) |
| | | 2 | *rp++ = hibyte (ip) |
| | | 1 | ip = dest |
| | | 0 | ir = *ip |

BR  Branch always

Operation:

ip = dest;

Encoding:

0 0 1 0  1 a a a  a a a a dest = ip + a + 1; /* displacement a is sign extended */

Timing:

| #clocks | | specific memory operation |
|---|---|---|
| 1 | | |
| | 0 | ir = *(ip = dest) |

BRC      Branch on carry

Operation:

> if ( CF ) ip = dest;
> else    ip++;

Encoding:

> 0010 01aa aaaa
> dest = ip + a + 1; /* a is sign extended */

Timing:

| #clocks | specific memory operation |
|---|---|
| 1 | |
| | 0    ir = *(ip = dest) |
| | or |
| | 0    ir = *(++ip); |

BRZ      Branch on TOS==0

Operation:

> if (tos==0, tos=next, next= *(++sp) ) ip = dest;
> else ++ip;

Encoding:

> 0010 00aa aaaa
>
> dest = ip + a + 1; /* displacement a is sign extended */

Timing:

| | #clocks | specific memory operation |
|---|---|---|
| | 2 | 1 tos = next; |
| | | next = *(++sp); |
| | 0 | ir = *(ip = dest) |
| | | or |
| | 0 | ir = *(++ip) |

LDR  Move register to TOS (includes certain indirect, indexed memory reference)

Operation:

*(sp--) = next;

if (reg) { next = tos; tos = reg } else    { next = bp+TOS or next = (bp+2p)+TOS }

Encoding:

0 1 0 1   0 1 0 0   r r r r reg = r    /* see table */

Timing:

| | #clocks | specific memory operation |
|---|---|---|
| (if (bp+p)+TOS) | 5 | |
| | 4 | lobyte(ea) = *(bp+2p) |
| | 3 | hibyte(ea) =*(bp+2p+1) |
| (if reg, bp+TOS) | 3 | |
| | 2 | *sp-- = next |
| | | if (reg) next = tos; |
| | 1 | if (reg) tos = reg |
| | | else next=bp+TOS, ea+TOS |

0    ir = *(++ip)

STR Store TOS to register (includes certain indirect, indexed memory reference)

Operation:

if (reg) { reg = tos; tos = next; } else    { bp+TOS = next or (bp+2p)+TOS = next } next = *(++sp);

Encoding:

0 1 0 1   0 1 0 1   r r r r reg = r    /* see table */

Timing:

| | #clocks | | specific memory operation |
|---|---|---|---|
| (if (bp+p)+TOS) | 5 | | |
| | | 4 | lobyte(ea) = *(bp+2p) |
| | | 3 | hibyte(ea) = *(bp+2p+1) |
| if (reg, bp+TOS) | 3 | | |
| | | 2 | if (reg) reg = tos; else bp+TOS,ea+TOS=next |
| | | 1 | if (reg) tos = next; next = *(++sp); |
| | | 0 | ir = *(++ip); |

Register assignments

| | | |
|---|---|---|
| 0 0 0 0 | Flags | CF x ID1 ID0 |
| 0 0 0 1 | CRC low byte | (high byte in TOS) |
| 0 0 1 0 | lowbyte (bp) | /* write */ |
| | next ("OVER" instruction) | /* read */ |
| 0 0 1 1 | highbyte (bp) | /* write */ |
| | tos ("DUP" instruction) | /* read */ |

| | | |
|---|---|---|
| 0 1 0 0 | sp | |
| 0 1 0 1 | rp | |
| 0 1 1 0 | see RPOP, RPUSH | |
| 0 1 1 1 | *(bp+TOS) | /* indexed fetch,store */ |
| 1 0 0 0 | *(*(bp+0)+TOS) | /* indexed indirect */ |
| 1 0 0 1 | *(*(bp+2)+TOS) | /* indexed indirect */ |
| 1 0 1 0 | *(*(bp+4)+TOS) | /* indexed indirect */ |
| 1 0 1 1 | *(*(bp+6)+TOS) | /* indexed indirect */ |

RPOP    pop return stack

Operation:

*(sp--) = next;

next = tos;

tos = *rp--;

Encoding:

0 1 0 1    0 1 0 0    1 1 1 0

Timing:

| #clocks | specific memory operation |
|---|---|
| 3 | |
| 2 | *sp-- = next |
|   | next = tos; |
| 1 | tos = *rp--;; |
| 0 | ir = *(++ip) |

RPUSH push tos onto return stack

Operation:

*(++rp)=tos;
tos = next;
next = *(++sp);

Encoding:

0 1 0 1  0 1 0 1  1 1 1 0

Timing:

| #clocks | specific memory operation |
|---|---|
| 3 | |

| | |
|---|---|
| 2 | `*(++rp) = tos;` |
| 1 | `tos = next;` |
| | `next = *(++sp);` |
| 0 | `ir = *(++ip)` |

IN      Move I/O register to TOS

Operation:

```
*(sp--) = next;
next = tos;
tos = reg;
```

Encoding:

```
0 1 0 0   0 0 r r   r r r r
```

Timing:

| #clocks | specific memory operation |
|---|---|
| 3 | |
| 2 | `*sp-- = next` |
| | `next = tos;` |
| 1 | `tos = reg ;` |
| 0 | `ir = *(++ip);` |

OUT     Store TOS to I/O register

Operation:

reg = tos;

tos = next;

next = *(++sp);

Encoding:

0 1 0 0   0 1 r r   r r r r

Timing:

| #clocks | specific memory operation |
|---|---|
| 3 | |
| 2 | reg = tos; |
| 1 | tos = next; |
|   | next = *(++sp); |
| 0 | ir = *(++ip); |

LDC     load constant (into TOS)

Operation:

*sp-- = next;

next = tos;

tos = constant;

Encoding:

0 1 0 1  1 1 1 H  b b b b if (H==0)  constant = 0000:bbbb;

else  constant = bbbb:0000

Timing:

| #clocks | specific memory operation |
|---|---|
| 3 | |
| 2 | *(sp--) = next; |
|   | next = tos; |
| 1 | tos = constant; |
| 0 | ir = *(++ip) |

LD (bp+a)    load from base page

Operation:

*sp-- = next next = tos tos = *(bp+source);

Encoding:

0 1 0 0  1 0 a a  a a a a source = aa aaaa

Timing:

| #clocks | | specific memory operation |
|---|---|---|
| 3 | | |
| | 2 | *sp-- = next; |
| | | next = tos; |
| | 1 | tos = *(bp+source); |
| | 0 | ir = *(++ip) |

LD (bp+p)+a   load indirect ( TOS with byte addressed by pointer at bp+offset then indexed by TOS)

Operation:

*sp-- = next;
next = tos
tos = *(*(bp+2p)+offset);

Encoding:

011p p0aa aaaa
offset = aa aaaa

Timing:

| #clocks | | specific memory operation |
|---|---|---|
| 5 | | |
| | 4 | lobyte(ea) = *(bp+2p) |
| | 3 | hibyte(ea) =*(bp+2p+1) |
| | 2 | *sp-- = next; |
| | | next = tos; |
| | 1 | tos=*(ea+offset) |
| | 0 | ir = *(++ip) |

ST (bp+a)        store into base page

Operation:

*(bp+dest) = tos tos = next;

next = *(++sp)

Encoding:

0 1 0 0  1 1 a a  a a a a dest = aa aaaa

Timing:

|#clocks|specific memory operation|
|---|---|
|3| |
|2|*(bp+dest) = tos;|
|1|tos = next;|
| |next = *(++sp);|
|0|ir = *(++ip)|

ST (bp+p)+a    store indirect
    ( TOS into byte addressed by pointer at bp+2p offset by a)

Operation:

*(*(bp+2p)+offset)=tos;

tos = next;

next = *(++sp)

Encoding:

```
0 1 1 p   p 1 a a   a a a a
offset = aa aaaa
```

Timing:

| #clocks | specific memory operation |
|---|---|
| 5 | |
| 4 | lobyte(ea) = *(bp+2p) |
| 3 | hibyte(ea) =*(bp+2p+1) |
| 2 | *(ea+off)=tos |
| 1 | tos = next;<br>next = *(++sp) |
| 0 | ir = *(++ip) |

[ ALU Group ]

Operation:

```
if (r==1) {
    hibyte(ip) = *rp--;
    lobyte(ip) = *rp--;
}
pipe = tos;            /* internal processor pipeline */
tos = tos op next;
switch (s) {
    case 0: next = next;        /* typical unary op */
    case 1: next = *(++sp);     /* typical binary op */
}
```

Encoding:

```
0 1 0 1   0 0 r f   f f f f
op = fffff  /* s equal to high order f bit */
s = (1==unary op), (0==binary op)
```

Op Table:

| code | operation | carry state |
|---|---|---|
| 00000 | tos + next | arith carry |
| 00001 | tos + next + carry | arith carry |
| 00010 | next - tos | arith borrow |
| 00011 | next - tos - carry | arith borrow |
| 00100 | tos - next | arith borrow |
| 00101 | | |
| 00110 | | |
| 00111 | | |
| 01000 | tos AND next | unchanged |
| 01001 | tos OR next | unchanged |
| 01010 | tos XOR next | unchanged |
| 01011 | | |
| 01100 | drop | unchanged 01101 |
| | swap-drop | unchanged |
| 01110 | | |
| 01111 | CRC step | unchanged |
| 10000 | asl (TOS) | tos7 |
| 10001 | asr (TOS) | 0 |
| 10010 | rotate left(tos) | tos7 |
| 10011 | rotate right (tos) | tos0 |

| | | |
|---|---|---|
| 10100 | tos | parity(TOS) |
| 10101 | | |
| 10110 | | |
| 10111 | 3of6 encode | set if not valid |
| 11000 | lsl (TOS) | |
| 11001 | lsr (TOS) | |
| 11010 | shift left by 4 | |
| 11011 | shift left by 4 | |
| 11100 | swap | |
| 11101 | tos (NOP) | |
| 11110 | NOT(TOS) | |
| 11111 | 3of6 decode | |

Timing:

| s | #clocks | | specific memory operation |
|---|---|---|---|
| 1 | 2 (4) | | |
| | (if r==1) | 3 | hibyte(ip) = *rp--; ) |
| | (if r==1) | 2 | lobyte(ip) = *rp--; ) |
| | | 1 | tos = alu output |
| | | 0 | ir = *(++ip) |
| 0 | 3 (5) | | |
| | (if r==1) | 4 | hibyte(ip) = *rp--; ) |
| | (if r==1) | 3 | lobyte(ip) = *rp--; ) |
| | | 2 | tos = alu output |
| | | 1 | *(++sp) = next |
| | | 0 | ir = *(++ip) |

SWAP special case

The exchange of TOS with NEXT is a special case of the ALU ops using the direct data path between TOS and NEXT. The NEXT register receives a cc of the TOS via a pipeline register, prior to TOS being loaded with the conter of NEXT (non-simultaneous transfer).

NOP

Operation:

++ip;

Encoding:

| short | 0010 1000 0000 |
|---|---|
| long | 0101 0001 1101 |

Timing:

| | #clocks | | - specific memory operation |
|---|---|---|---|
| short | 1 | | |
| (BR +1) | | 0 | ir = *(++ip) |
| long | 2 | | |
| | | 1 | tos = tos |
| | | 0 | ir = *(++ip) |

RET   return from subroutine

Operation:

hibyte(ip) = *rp--
    lobyte(ip) = *rp--
    ++ip;

Encoding:

0 1 0 1  0 0 1 1  1 1 0 1

Timing:

| #clocks | specific memory operation |
|---|---|
| 4 | |
| 3 | hibyte(ip) = *rp-- |
| 2 | lobyte(ip) = *rp-- |
| 1 | tos = tos |
| 0 | ir = *(++ip) |

[ LITERAL Group ]

Operation:

tos = tos op constant;

Encoding:

0 1 0 1  1 f f H  c c c c op = ff if (H==0) constant = 0000:cccc else constant = cccc:0000

Op Table:

| code | operation | carry state |
|---|---|---|
| 0 0 | tos + constant | arith carry |
| 0 1 | tos - constant | arith borrow |
| 0 0 | tos AND constant | |
| 1 1 | constant (see LDC) | |

Timing:

| #clocks | specific memory operation |
|---|---|
| 2 | |
| 1 | tos = alu output |
| 0 | ir = *(++ip) |

F. THREE-OF-SIX CIRCUITRY

As previously mentioned, the ALU 102b contains means for encoding four bit nibbles into six bit words for transmission (encoder of Figure 14) and for decoding six bit words into the four bit nibbles (decoder of Figure 15). Both the encoder and decoder use hardwired logic permitting the conversion to be performed very quickly in both directions. Moreover, there is a circuit shown in Figure 16 to verify that each six bit word received by the cell is in fact a three-of-six code, that is, three zeroes and three ones (Figure 9).

F. THREE-OF-SIX CIRCUITRY

As previously mentioned, the ALU 102b contains means for encoding four bit nibbles into six bit words for transmission (encoder of FIG. 14) and for decoding six bit words into the four bit nibbles (decoder of FIG. 15). Both the encoder and decoder use hardwired logic permitting the conversion to be performed very quickly in both directions. Moreover, there is a circuit shown in FIG. 16 to verify that each six bit word received by the cell is in fact a three-of-six code, that is, three zeroes and three ones (FIG. 9).

Referring to FIG. 14 the register 142 is illustrated with four bits of the register containing data D0 through D3. If the ALU is commanded to encode this data, the resultant six bits will be coupled into the latch register 145b. To obtain the conversion shown in FIG. 9, the $D_0$ bit is directly coupled into first stage of register 145b and becomes $E_0$, the encoded bit. Also, the bit $D_3$ is directly coupled into the register and becomes $E_5$. Each of the remaining bits $E_1$ through $E_4$ are provided by the logic circuits 153 through 150, respectively. Each of these logic circuits are coupled to receive $D_0$, $D_1$, $D_2$ and $D_3$. Each logic circuit contains ordinary gates which implement the equation shown within its respective block. These equations are shown in standard "C" language ("&"=logical AND, "!"=logical NOT, and "|"=logical OR.) These equations can be implemented with ordinary gates.

The decoder of FIG. 15 is shown in a similar format. This time the six bits of the encoded data are shown in register 142. The decoded four bits of data are shown in the register 145. To implement the pattern assignment shown in FIG. 9, the $E_0$ bit is coupled directly to the register 145 and becomes $D_0$. The $E_5$ bit is coupled directly to the register 145 and becomes the $D_3$ bit. Logic circuits 154 and 155 provide the bits $D_2$ and $D_1$, respectively. Circuit 154 is coupled to receive the bits $E_0$, $E_3$, $E_4$ and $E_5$ while the circuit 155 receives $E_0$, $E_1$, $E_3$, and $E_5$ ($E_2$ is not used to provide the $D_0$ through $D_3$ bits.) (Some of the six bit patterns are not used and others are used for synchronization and thus do not require conversion into a data nibble.) The circuits 154 and 155 are constructed from ordinary logic gates and implement the equations shown. The symbol "^" represents the exclusive OR function in the equations.

The circuit of FIG. 16, as mentioned, verifies that the received six bit words do contain three zeroes and three ones. The encoded words are shown coupled from the top of stack register 122 into the two full adders, 157 and 158. These adder stages are contained within the ALU 102b. Each adder receives an X, Y and carry input and provides a sum and carry output. These ordinary adder stages are each coupled to receive one bit of the encoded word as shown. (Any coupling of each bit to any input of address 157 and 158 may be used.) The carry outputs of the adders 157 and 158 are coupled to the exclusive OR gate 159; the sum outputs of the adders 157 and 158 are coupled to the exclusive OR gate 160. The output of the gates 159 and 160 are coupled to the input terminals of an AND gate 161. If the output of this AND gate is in its high state the word in the register 102 contains three ones and three zeroes. Otherwise, the output of the gate 161 is in its low state (abort condition). The incoming packets are checked to determine that each six bit word is valid, while it is decoded into the four bit nibbles.

IV. INPUT/OUTPUT SECTION

A. General

The I/O section includes a plurality of circuit elements such as a ramp generator, counter, comparator, etc., which are interconnected in different configurations under software control. Examples of this are shown below for the analog-to-digital (A to D) and digital-to-analog (D to A) operations. These elements with their software configurable interconnections provide great flexibility for the cell, allowing it to perform many tasks. The entire I/O section is preferably fabricated on the same "chip" which includes the processor.

B. Buffer Section

As shown in FIG. 10 and previously discussed, each of the cells includes four input/output I/O subsections; three of the subsections 107, 108, and 109 each have a pair of leads, identified as Pin A and Pin B. The fourth subsection 110 has a single "read only" pin 106. Any of the four subsections can communicate with any of the four subprocessors. As shown in FIG. 12, this is easily implemented by connecting the address bus (ADBUS) and the memory bus (MBUS) to each of the four I/O subsections. Use of the MBUS through the register 146 to the DBUS allows the I/O subsections to communicate with the processor registers.

Each Pin A and Pin B can receive and provide TTL level signals and is tristated. In the currently preferred embodiment, each pin can sink and source approximately 40 milliamps (except for pin 106). All the Pin A's can be programmed to provide an analog output signal and a digital-to-analog converter is included in three of the I/O subsections 107, 108 and 109 to provide an analog output on Pin B. An analog input signal on any of the Pin B's can be converted to a digital count since three of the I/O subsections include A to D converters coupled to these pins. Each pin pair (Pin A and Pin B) can operate as a differential amplifier for input signals, a differential receiver, and a differential transmitter and a differential voltage comparator. The I/O subsections can be used to perform many different functions, from simple switching to, by way of example, having two pin pairs coupled to drive the windings of a stepping motor.

The circuits shown in FIGS. 17–23 are repeated in subsections 107, 108 and 109. Those circuits associated with Pin A and Pin B (such as the buffer sections of FIG. 17) are not fully contained in the I/O subsection 110. Only sufficient buffering to allow data to be read on Pin 106 is needed.

Referring to the I/O buffer section of FIG. 17, outgoing data is coupled to Pin A through the buffer 163. Similarly, outgoing data is coupled to Pin B through the buffer 164 after the data passes through the I/O control switch 165. This outgoing data, by way of example, is coupled to Pin A from the register 206 of FIG. 23 through gate 208 of FIG. 19. The control switch 165 is used to enable outputs to Pin A through the buffer 163, when enable A (EN.A) is high (line 166). Moreover, the switch enables the output to Pin B when enable B (EN.B) is high (line 167) and enables outputs to both pins (with the output to Pin B being inverted) when enable RS-485 is high (line 168). The outging analog signal to Pin A is provided through the switch 175 when the enable analog output signal is high.

Incoming signals to Pin A are coupled to one input terminal of the differential amplifier 169. The other terminal of this signal receives a reference potential (e.g., 2.5 volts). This amplifier also includes the commonly used hysteresis mode to prevent detection of noise. This mode is activated when the enable hysteresis (Pin A) signal coupled to amplifier 169 is high. The output of amplifier 169 is coupled to a transition detection circuit 171 which simply detects each transition, that is, a zero to one, or one to zero.

The inputs to Pin B are coupled to one terminal of a differential amplifier 170 which may be identical to amplifier 169. The amplifier 170 receives the enable hysteresis (Pin B) signal. The other input to amplifier 170 (line 176) can be coupled to receive one of several signals. It can receive a DC signal used for voltage comparisons, a ramp which shall be discussed later, the signal on Pin A for differential sensing, or a reference potential (e.g., 2.5 volts). The output of the amplifier 170 can be inverted through the exclusive OR gate 177 for some modes of operation. A transition detector 172 is associated with the Pin B inputs, again to detect transitions of zero to one or one to zero.

C. I/O Counting/Timing

Each of the cells includes a timing generator (RC oscillator) for providing a 16 mHz signal. This signal is connected to a rate multiplier 178 contained in the I/O section (FIG. 18). The multiplier 178 provides output frequencies to each I/O subsection. This multiplier provides a frequency $f_0$ equal to:

$$f_0 = \frac{16MhZ}{2^{16}} \times (\text{LOADED VALUE})$$

The loaded value is a 16 bit word loaded into a register of a rate multiplier 178. The rate multiplier comprises four 16-bit registers and a 16-bit counter chain. Four logic circuits allow selection of four different output signals, one for each subsection. Two bus cycles (8 bits each) are used to load the 16 bit words into the register of the rate multiplier 178. As can be seen from the above equation, a relatively wide range of output frequencies can be generated. These frequencies are used for many different functions as will be described including bit synchronization.

The output of the multiplier 178 in each of the subsection is coupled to an 8 bit counter 179. The counter can be initially loaded from a counter load register 180 from the data bus of the processors. This register can, for example, receive data from a program. The count in the counter is coupled to a register 181 and to a comparator 182. The comparator 182 also senses the 8 bits in a register 183. The contents of this register are also loaded from the data bus of the processors. When a match between the contents in the counter and the contents of register 183 is detected by comparator 182; the comparator provides an event signal to the state machine of FIG. 19 (input to multiplexers 190 and 191). The contents of the counter 179 can be latched into register 181 upon receipt of a signal from the state machine (output of the execution register 198 of FIG. 19). The same execution register 198 can cause the counter 179 to be loaded from register 180. When the counter reaches a full count (terminal count) a signal is coupled to the state machine of FIG. 19 (input to multiplexers 190 and 191).

D. I/O CONTROL AND STATE MACHINE

Referring to FIG. 19, the processor MBUS communicates with registers 185 and 186 both of which perform masking functions. Three bits of the register 185 control the selection of one of the five lines coupled to the multiplexer 190; similarly, 3 bits of the register 186 control the selection of one of the five lines coupled to the input of the multiplexer 191. The output of the masking registers 185 and 186 are coupled to a multiplexer 187. The five bits from the multiplexer 187 are coupled to a register 198. Each of these bits define a different function which is, in effect, executed by the state machine. Specifically, the bits control load counter, latch count, enable ramp switch, pulse Pin A, and pulse Pin B.

The multiplexers 190 and 191 both receive the terminal count signal from counter 179 of FIG. 18, the compare signal from comparator 182, the ramp start signal from the ramp generator 200 of FIG. 20, and the transition A and B signals from the transition detectors 171 and 172, respectively of FIG. 17. The one bit output from each of the multiplexers 190 and 191 is coupled to an OR gate 188. This OR gate is biased in that if an output occurs simultaneously from both multiplexers 190 and 191, priority is given to multiplexer 190. The output of the multiplexer 190 controls the multiplexer 187 with the signal identified as "which event". This signal is also stored in the 3×3 first-in, first-out (FIFO) buffer 199. This signal indicates which MUX 190 or 191 has received an event and this data is stored along with the inputs to Pin A and Pin B (FIG. 17) in the FIFO 199.

The state machine for each of the I/O subsections comprises 4 D-type flip-flops connected in series as shown in FIG. 19 within the dotted line 189. The flip-flops 194 and 196 receive the 8 mHz signal whereas the flip-flops 193 and 195 receive the complement of this timing signal. The clocking signal (CLK) is obtained from the Q output of the flip-flop 194 and is coupled to register 198 and FIFO 199. The clear signal received from the Q terminal of flip-flop 196 is coupled to the register 198.

In operation, the masking registers 185 and 186 are loaded under software control. The bits from register 185, for instance, cause the selection of one of the input lines to multiplexer 190, for example, terminal count. Then the circuit of FIG. 19 waits for the signal terminal count. When the signal terminal count occurs the state machine begins operating and the five bits of data from register 185 are connected through multiplexer 187 into register 198. The state machine causes an output to occur on one of the lines from register 198 causing, for example, a pulse to be generated on pin A. Similarly, a word in register 186 can be used to cause, again by way of example, the counter to be loaded.

The flip-flops 203 and 204 are clocked by the output of register 198. These flip-flops allow the output signal to be controlled. The OR gate 208 permits data from a shift register 206 of FIG. 23 to be coupled to Pin A. This register is discussed later.

The low order 6 bits of the ADBUS are input to decoders in the I/O subsections 107, 108, 109 and 110 of FIG. 12. Two of the bits are used to select a specific I/O element and the rest are decoded to control an operation. The PLA 136 of FIG. 11 has generalized outputs 215 connected in parallel to all I/O subsections 107, 108, 109 and 110 to select the ABUS clock cycle for data to be used for controlling operation of the I/O subsections.

E. ANALOG TO DIGITAL AND DIGITAL TO ANALOG CONVERSION

Referring first to FIG. 20, the I/O subsystem includes a ramp generator 200 which continually generates ramps of a known period. The output of the ramp generator is buffered through buffer 201 and selected by switch 202. The switch, as will be described, is selected at some count (time) following the start of each ramp, thereby coupling the same potential to the capacitor 203. This capacitor becomes charged and potential is coupled through buffer 204 to Pin A when the switch 175 is closed. (Switch 175 is shown in FIG. 17). The switch 202, capacitor 203, and buffer 204 act as a simple and hold means.

In FIG. 21 several of the circuit elements previously described have been redrawn to described how a digital to analog conversion occurs and to show how the circuit elements of the I/O subsection can be reconfigured through software by the I/O control and state machine of FIG. 19 to perform different functions.

For a digital to analog conversion an appropriate frequency ($f_0$) is selected from the rate multiplier 178 or counter 179 of FIG. 18, which corresponds to the period of the ramps being generated by ramp generator 200 (FIG. 21). A digital value which corresponds to the desired output analog signal is loaded into the register 183. When a ramp begins the ramp start signal is coupled through the state machine 189 of FIG. 19 (for example, through the multiplexer 190) and the flip-flops). This causes the counter 179 to be cleared (e.g., all zeroes). The $f_0$ signal then counts into counter 179. The comparator 182 then compares the contents of the counter 179 with the contents of register 183. When the two words are the same, the compare signal is applied through multiplexer 191 again causing the state machine to be activated as indicated by "SM₁", 189 and the switch 202 of the sample and hold means to close. For each ramp generated by the ramp generator, the ramp switch 202 is closed (e.g., for 500 nanoseconds) causing the capacitor 203 to be charged to a DC voltage which corresponds to the digital number placed in register 183.

One manner in which the A-D conversion can be performed is shown in FIG. 22. The input analog signal is applied to one input terminal of the differential amplifier 170. The ramp is applied to the other terminal of the amplifier 170. Initially, when the ramp is started, the state machine 189 causes the counter 179 to be loaded from register 180 (e.g., all zeroes). The counter is clocked at a frequency ($f_0$) suitable to the period of the ramps. When the transition detection 172 detects that the potential on Pin B and the ramp have the same potential, the state machine 189 causes the count in the counter 179 to be latched into latch 181. The digital word in latch 181 corresponds to the DC potential on Pin B, thereby providing the analog to digital conversion.

F I/O COMMUNICATIONS

As previously discussed, for instance, in conjunction with FIG. 1, each cell can transmit data over communications lines or other links. The cells in a subchannel transmit data at the same rate typically determined by the communications link being employed, for example, 10K BPS in a noisy environment such as for power lines. In the currently preferred embodiment, the cells do not have crystal oscillators but rather rely upon RC oscillators. The latter are not particularly stable and frequency variations occur both with temperature as a result of processing variations. Moreover, there is no synchronization provided between cells, thus, each cell must provide synchronization to the incoming data in order to properly read the data. One feature of all cells is that they detect and store the frequency of the incoming data and when acknowledging a packet they can transmit at the frequency that the original packet was transmitted. This reduced the burden on cells to synchronize when they are receiving an acknowledgement packet.

Referring to FIG. 23 during the hunt mode, an I/O subsection is hunting for data. During this mode, the rate multiplier provides a frequency ($f_0$) to the counter 179 and a number is loaded into register 183 from the MBUS. Matches occur and are detected by comparator 182 at a frequency corresponding to the expected incoming data rate. Specifically, the terminal count of counter 179 is synchronized to the transitions. As indicated by the dotted line 201, the processor continually searches for transitions from the transition detectors 171 and 172 of FIG. 17. When transitions occur, the processor determined whether the transitions occurred before or after the terminal count and then adjusts the frequency ($f_0$) until the terminal count occurs at the same time that the transitions are detected. This frequency is the shifting rate for the shift register 206. (The steps performed by the processor are shown in FIG. 23 as blocks 210 and 211.) The number loaded into register 183 provides a phase shift between the time at which transitions occur and the ideal time to shift data in the register 206. This prevents the shifting of data during transitions. Note counter 179 is reloaded (e.g., all zeroes) each time it reaches a terminal count.

When bit synchronization occurs, rate needed for the synchronization (16 bit word) is stored within the processor memory and used to set the transmit frequency when acknowledging the packet for which the rate was developed. This stored bit rate as discussed later is used in the connection back-off algorithm allowing slot periods (M) to be matched to the last received bit rate.

The comparator output is used as a shift rate for a six bit shift register 206. During the hunt mode, the data from Pin B is continually shifted through register 206. The preamble to a packet as shown in FIG. 9 (010101-bit synch) is shifted along the shift register 206 and the shifting rate adjusted so that synchronization/lock occurs. When the packet beginning flag appears (nibble synch-101010) the last two stages of the register 206 will contain ones and this will be detected by the AND gate 207. A binary one at the output of gate 207 ends the hunt mode and provides the nibble synchronization. When this occurs, the data is locked out of the shift register (6 bits) into a data latch 235 and from there the data can be clocked into the processor and converted into 4 bit nibbles. Another circuit means is present to detect all zeroes in the shift register 206. When this occurs, the processor and shift register return to the hunt mode. The number loaded into register 183 provides a phase shift between the time at which transitions occur and the ideal time to shift data in and out of the register 206. This prevents the shifting of data during transitions.

Data which is to be transmitted is transferred into the data register 205. (Note only 6 bits representing a four bit nibble are tranferred into the data register 205.) These 6 bits are then transferred into the shift register 206 and shifted out at the shift rate. As mentioned, if the packet being shifted out represents an acknowledgement, the shift rate corresponds to the rate of the incoming data. If the outgoing packet on the other hand is being sent to several cells, the shift rate is the nominal shift rate for the transmitting cell.

(Note that in FIG. 23, data is shown leaving the register to only Pin A. For differential modes, the complement of Pin A is driven onto Pin B—and other variations are possible.)

G. I/O REGISTERS AND RESOURCE SHARING

Each I/O subsection has a number of registers which have bidirectional connections to the MBUS. These registers are in the I/O subsections 107, 108, 109 and 110 of FIG. 12. The reading and writing of these registers under processor program control configures the I/O subsystems for proper operation. FIG. 12 illustrates the four I/O subsections 107, 108, 109 and 110 and shows the connections to the low eight bits of the MBUS and the low six bits of ADBUS. Two ADBUS bits select one of the four I/O units and the remaining four bits are decoded to select one of the I/O control and status registers (described below) of that subsection. There are two lines from the PLA 136 of FIG. 11 to control the action of the I/O subsections. One line is "Read" and the other line is "Write". When appropriate these lines are active on phase 3 of the clock cycles.

The I/O registers, functions and bit definitions are described below:

G. I/O REGISTERS AND RESOURCE SHARING

Each I/O subsection has a number of registers which have bidirectional connections to the MBUS. These registers are in the I/O subsections 107, 108, 109 and 110 of Figure 12. The reading and writing of these registers under processor program control configures the I/O subsystems for proper operation. Figure 12 illustrates the four I/O subsections 107, 108, 109 and 110 and shows the connections to the low eight bits of the MBUS and the low six bits of ADBUS. Two ADBUS bits select one of the four I/O units and the remaining four bits are decoded to select one of the I/O control and status registers (described below) of that subsection. There are two lines from the PLA 136 of Figure 11 to control the action of the I/O subsections. One line is "Read" and the other line is "Write". When appropriate these lines are active on phase 3 of the clock cycles.

The I/O registers, functions and bit definitions are described below:

WRITE REGISTERS: (Controlled by the "Write" line).

Event 0 Configuration Register:register, masking, 185 Figure 19:
    Bit 0:    Upon event Toggle pin A
    Bit 1:    Upon event Toggle pin B
    Bit 2:    Upon event Latch 8 bit count
    Bit 3:    Upon event close Ramp switch (momentary on)

Bit 4:  Upon event Load 8 bit counter
Bits 5-7: Input Multiplexer:  MUX 190, Figure 19.
    000  Transition on pin A
    001  Transition on pin B
    010  Terminal Count event
    011  Count Compare event
    100  Ramp start event
    101  Pin B compare event Event 1 Configuration Register: masking register 186, Figure 19;
Bit 0:  Upon event Toggle pin A
Bit 1:  Upon event Toggle pin B
Bit 2:  Upon event Latch 8 bit count
Bit 3:  Upon event close Ramp switch (momentary on)
Bit 4:  Upon event Load 8 bit counter
Bits 5-7: Input Multiplexer: MUX 191, Figure 19
    000  Transition on pin A
    001  Transition on pin B
    010  Terminal Count event
    011  Count Compare event
    100  Ramp start event
    101  Pin B compare event

I/O REGISTERS AND RESOURCE SHARING

8 Bit Counter Load Register: Counter load register 180; Figure 18
    Bits 0-7 = count Write Communications Data Out REgister: data register 205, Figure 23;
    Bits 0-7 - data Write Communications Configuration Register: (not shown) (loaded from MBUS)
    Used to configure the communications subsystem for transmit and receive functions.
    Bit 0:  0 = Receive, 1 = Transmit
    Bit 1:  NOP
    Bit 2:  NOP
    Bit 3:  Shift Register enable
    Bit 4:  Enter Hunt Mode
    Bit 5:  NOP
    Bit 6:  NOP
    Bit 7:  NOP Output Configuration Register 0: (not shown) (loaded from MBUS)
Used for setting analog and digital pin configurations.
- Bit 0: Enable pin A analog out
- Bit 1: Enable pin A digital out
- Bit 2: Enable pin A pullup
- Bit 3: Enable pin A pulldown
- Bit 4: Enable pin B inversion
- Bit 5: Enable pin B digital out
- Bit 6: Enable pin B pullup
- Bit 7: Enable pin B pulldown Output Configuration Register 1: (now shown) (loaded from MBUS)
Used for enable and compare functions.
- Bit 0: Enable 8 bit counter
- Bit 1: Compare pin B to TTL reference
- Bit 2: Compare pin B to adjustable D.C reference
- Bit 3: Compare pin B to Ramp voltage
- Bit 4: Compare pin B to pin A
- Bit 5: Enable RS-485 driver
- Bit 6: Enable input hysteresis on pin A
- Bit 7: Enable input hysteresis on pin B Output Configuration Register 2: (not shown) (loaded from MBUS)
Used for setting pin logic levels.
- Bit 0: Execute, load 8 bit counter with value in 8 bit Counter Load Register
- Bit 1: Set pin A to logic level 1
- Bit 2: Set pin A to logic level 0
- Bit 3: Set pin B to logic level 1
- Bit 4: Set pin B to logic level 0

Lower Half of Rate Multiplier Register: rate multiplier 178, Figure 18
Lower byte of rate multiplier Upper Half of Rate Multiplier Register: rate multiplier 178, Figure 18

8 Bit Compare Load Register: compare load register 183, Figure 18
Byte for comparison READ REGISTERS: (controlled by "Read" line);

Read Event FIFO: FIFO 199, Figure 19
- Bit 0: 0=Event 1 occurred
  1=Event 0 occurred
- Bit 1: Pin A level during occurrence of event
- Bit 2: Pin B level during occurrence of event Read I/O Condition Register:
  I/O Status:
    Bit 0:   Input pin A
    Bit 1:   Input pin B
    Bit 2:   1=ramp compare
    Bit 3:   NOP
    Bit 4:   NOP
    Bit 5:   1=FIFO has data
             0-FIFO empty 8 Bit Counter Latch: register 181, Figure 18
    Count Byte Communications Data Register:   data latch 235, Figure 23
    Data Byte Communications Status Register: (not shown) (reads onto MBUS)
    Bit 0:   Receive mode: 1=data available in shift register
             Transmit mode: 0=transmit latch ready
    Bit 1:   1=in Hunt Mode from Figure 23

RESOURCE SHARING

In the presently preferred embodiment there are five resources shared among the processors. They are the EEPROM and the four I/O subsections. A hardware "Semaphore Register" (SR) and five words in RAM are used in controlling resource sharing. FIG. 30 illustrates how the multiprocessors share common resources. The SR 95 of FIG. 12 reads and writes to bit 0 of the MBUS.

Each RAM word will contain one state: Idle, Proc. #1, Proc. #2, Proc. #3 or Proc. #4. A processor may interrogate a RAM location before assignment of resource to see if a resource is busy. If the resource is not assigned it will then access the Semaphore Register as described below. (Alternately, a processor may, skip the initial RAM interrogation step and check the RAM location after it has accessed the Semaphore Register). If the resource already busy the processor must clear the Semaphore Register to "0" and wait to try again. If the resource is "Idle" the processor assigns a resource by changing the state of the RAM Register from "Idle" to "Proc. #x" and then clearing the Semaphore Register to "0". When the processor is finished with the resource, clears the RAM location to "Idle".

The SR is a one bit hardware register. During phase 3 of its respective cycle, if required, each processor may access the SR. In time sequence, this means that the processors may access the SR 295 once on one of four successive clock cycles (e.g., phases). The SR 295 is normally set to "0". In FIG. 30, processors #1 and #3 are not requesting use of the SR 295. Processor #2 is shown accessing the SR. If it receives a "0" at the beginning of the cycle it knows nothing is being currently assigned or cleared and it sets the appropriate RAM location and if it contains "Idle" the processor inserts its "Proc. # thus assigning the resource and then "clears" the SR to "0". If the processor found that another processor was using the shared resource it does not assign its Proc. # and it then "clears" the SR to "0". In this event it must wait and try again.

Some operations such as those on the EEPROM may take many clock cycles so the processor should "assign" the RAM register but release the SR 295 while it is using the shared resource. When the processor is through with its operation using the assigned RAM location it accesses the SR again until it finds a "0". It then "clears" the RAM location to "idle" and "clears" the SR 295 to "0". Whenever a processor accesses the SR 295 and finds a "1" it leaves the SR 295 in the "1" state and must wait to try again.

In the example in FIG. 30 Processor #4 is shown as needing a shared resource. It interrogates the SR to find out if it is free. The processor uses a "test&set" operation and since the SR 295 was already "1" the test & set operation leaves the register with a "1". It must now wait and try again. It will keep trying until it gets access to the SR 295 and it finds the resource in the RAM word is "idle".

V. PROTOCOL

A. CONTENTION IN GENERAL

In a typical application the communications network among the cells is lightly loaded and the cells will experience little or no contention delay. In the case of heavy traffic, the network can saturate. A heavy load will generate collisions and hence require retransmissions. If retransmissions continue to collide, the network can possibly saturate. The contention backoff algorithm used in the network quickly spreads the traffic over a longer time period so that the system can recover from saturation. If the traffic is not spread over a long time period, the system will be unstable; it will not recover from saturation.

Access to a subchannel under contention conditions is regulated by two mechanisms, deferring and backing off. Deferring is a collision avoidance technique used in group acknowledgements. Backing off is a traffic or load leveling technique.

Deferring consists of counting free slots. When the number of free slots that the cell has seen equals the defer count, the cell transmits its packet in the next available slot.

When backing off, the cell increases its waiting time before attempting to retransmit a packet that has suffered a collision. The amount of this increase is a function of the number of collisions or retransmissions. The algorithm implementing this function is called the backoff or contention algorithm.

The network uses a carrier sense multiple access method of resolving contention for the communications channel. When a cell is ready to transmit it first listens to the communications channel. If it hears another cell transmitting, it waits for a clear channel. Once it detects a clear channel, a cell may delay before transmitting. The method of determining that delay is determined by the contention algorithm.

Time on the channel is measured in slots, each slot being M bits at the most recently detected receive baud rate (i.e., shift rate). When a cell delays before transmitting, it waits an integral number of slots. When a cell detects a clear channel, it may delay and then when it is ready to transmit, it attempts to transmit on a slot boundary. If a cell is transmitting a packet that has suffered a collision, it delays a time period determined by the backoff algorithm. Backoff delay is randomized uniformly over N slots, N is adjusted by the backoff algorithm. Its smallest value is 2 and it is adjusted upward by the backoff algorithm before each retransmission of a packet. Its maximum value is $2^{10}$.

B. GROUP ACKNOWLEGEMENT PACKET CONTENTION

A packet from a group announcer to a set of group listeners will cause each of those listeners to send an acknowledgement to the announcer. Without a method of arbitrating contention among those acknowledgements, they will always collide. To avoid this problem, a built in reservation system for group acknowledgements is used. A listener cell uses its group member number to determine which slot to use for its acknowledgement. Group member 5 will transmit its acknowledgement in the 5th free slot following reception of the original packet. The result is that group member 1 will transmit its acknowledgement in the first slot following the original packet. Group member two will transmit its acknowledgement in the first slot following first group member's acknowledgement. This process continues until the last group member has replied to the original packet. If a group member does not reply and thus leaves its reply slot empty, the next group member replies in the next slot.

The contention and I/O state diagram is shown in FIG. 24. The following table sets forth the states and their descriptions.

| State | Name | Contention States Description |
|---|---|---|
| 0. | Idle | Time the slot boundaries while looking for receive data transitions. |
| 1. | Bit Sync | Establish baud rate synchronization with received signal. |
| 2. | Byte Sync | Wait for the start of packet flag. |
| 3. | Rcv | Receive the packet. |
| 4. | IPG Delay | Inter Packet Gap Delay. Delay for n bit times after the end of the last packet on the subchannel (whether this neuron transmitted it or received it). |
| 5. | Backoff Delay | Wait M slots where M was set by the last execution of the backoff algorithm or by the ARQ protocol software. |
| 6. | Xmt | Transmit a packet in the next slot. |
| 7. | Jam | Transmit a jam pattern (all ones) for the jam period (specified in bit times). Execute the backoff algorithm to set the backoff slot count. |

| State | | Event | | Action | Next State | |
|---|---|---|---|---|---|---|
| | | | | Contention State Transitions | | |
| 0. | Idle | A. | Transitions Detected | none | 1. | Bit Sync |
| 0. | Idle | L. | Packet to Xmt | none | 5. | Backoff Delay |
| 1. | Bit Sync | B. | Sync Achieved | none | 2. | Byte Sync |
| 1. | Bit Sync | G. | No Transitions Byte Sync | none | 4. | IPG Delay |
| 2. | Byte Sync | F. | Hunt Timeout | none | 1. | Bit Sync |
| 2. | Byte Sync | C. | Starting Flag Detected | none | 3. | Rcv |
| 3. | Rcv | E. | Abort Detected | none | 1. | Bit Sync |
| 3. | Rcv | D. | Ending Flag | Set Pckt Rcvd Flag | 4. | IPG Delay |
| 3. | Rcv | N. | Packet Too Long | none | 1. | Bit Sycn |
| 4. | IPG Delay | M. | Delay Done | none | 0. | Idle |
| 5. | Backoff Delay | J. | Delay Done | none | 6. | Xmt |
| 5. | Backoff Delay | A. | Transitions Detected | none | 1. | Bit Sync |
| 6. | Xmt | I. | Collision Detected | Calculate Backoff Delay | 7. | Jam |
| 6. | Xmt | H. | Xmt Done | none | 0. | Idle |
| 7. | Jam | K. | Jam Done | none | 5. | Backoff Delay |

C. COLLISION DETECTION

In the currently implemented embodiment collision detection is not used. Ordinary circuits can be used to provide this feature with the cells providing responses as set forth in IEEE802.3. Upon detecting a collision, the cell can transmit a jamming signal for one slot time to make sure that all cells on the channel detect the collision. It then ceases transmitting and executes the backoff algorithm. The backoff algorithm adjusts the contention randomization interval. IEEE802.3 uses the number of collisions experienced by the packet to calculate the backoff interval. The cell network may not always have collision detection so the cell's backoff algorithm may used the protocol's inferred collision to calculate the backoff interval. If the cell has collision detection, it detects a collision in the same slot in which it occurs and retries the transmission (after the backoff interval).

For cells without collision detection where a collision occurs, the cell discovers it when the protocol timeout period expires. If a cell is sending a packet to multiple destinations (the normal case), it infers a collision if at the end of the protocol timeout period, no replies have been received from any of the destinations. If even one reply is received, there was no collision at the transmit point and the retransmission takes place without an increased delay due to backoff. The cell then executes the backoff algorithm just as it does with collision detection, using the inferred collision count. After the backoff interval, the cell transmits the packet.

Therefore, the difference between collision detection and collision inference is in the length of time it takes the cell to discover that a collision has occurred.

D. BACKOFF ALGORITHM

The backoff algorithm used in the currently preferred embodiment is set forth in IEEE802.3 standard, a truncated binary exponential backoff. The backoff interval is an exponential function of the number of collisions (detailed or inferred) since the last successful transmission. An exponential backoff algorithm gives the system the stability it needs to recover from saturation conditions. By exponentially spreading out the load in a saturated system, the algorithm allows the system to recover. Backoff interval in slots=R such that R=random number linearly distributed over the interval:

$$0 < R < 2 \; EXP \; [min(10,n)]$$

where n = number of collisions.

When a cell has two transceivers attached, it transmits every packet via both transceivers. Since the transceivers access different subchannels, they will experience different load conditions. Each transceiver is treated as a separate subchannel and has its own backoff parameters (collision count and backoff interval). The backoff parameters are "kept" by the cells, one set for each transmission.

The random number for the backoff algorithm is generated by one of two methods: 1. by a pseudorandom number generation algorithm seeded with the 48 bit cell ID (guaranteed to be unique as discussed), 2. by running a counter and saving the low order bits when an external event is detected.

The slots are equal in durations to bit rate of the last received data. Note: if each cell used its internal bit rate, slot durations would vary from cell-to-cell.

E. CONTENTION TIMER

Packets that have multiple routes to a destination may experience a long contention delay via one route and a shorter delay while traveling simultaneously via another route. If that contention delay is allowed to be too long, the later packet could arrive after the destination's receive sequence number has cycled back to the same sequence number in the packet. A packet could thus arrive out of sequence without the ARQ protocol detecting it. To prevent this type of error, each packet uses the contention timer field (FIG. 6) that is decremented by the number of slots that the packet has waited for contention at each hop in a multihop route. When the count reaches zero, the packet is discarded.

F. ARQ PROTOCOL

The cell uses a sliding window protocol with a window size of 1 and modulo 2 sequence numbering (equivalent to a stop and wait protocol). The link control mechanism is very similar to the HDLC asynchronous balanced mode. The principal difference being that with 1 bit sequence numbering instead of acknowledging packets with the poll/final bit set, every information packet must have an acknowledgement.

Before the ARQ mechanism can work, a connection must be established between the two communicating devices (cell or network control devices). The connection process is described in the "connection" section later in this application. The ARQ mechanism only operates when the cell is in the connect state. The ARQ states may be considered as substates of the connect state.

When a cell transmits a message, it waits for a reply from the destination. If the cell does not receive an acknowledgement within a predefined time out period, it assumes that the message was lost and it transmits the message again.

Two types of packet may be used to carry an acknowledgement, an acknowledgement-only packet or an information packet. The acknowledgement is carried in the receive sequence number of the packet. The acknowledgement-only packet has no message field and is identified by the ACK command in the link command field. An information packet does contain a message field and is identified by the INFO command in the link command field.

FIG. 25 is the link level ARQ state diagram and along with the following table, defines the various ARQ states.

| State | Event | Action | Next State |
| --- | --- | --- | --- |
| 0. Idle | Message to Send | Build Packet | 1. Idle |
| 0. Idle | Packet to Transmit | Send Packet | 1. Contention |
| 0. Idle | Packet Received | Process Packet | 1. Idle |
| 1. Contention | Packet Transmitted | Start Timer | 2. Wait ACK |
| 2. Wait ACK | Timeout | Stop Timer Build Packet | 2. Wait ACK |
| 2. Wait ACK | Packet to Retransmit | Retransmit Packet | 1. Contention |
| 2. Wait ACK | ACK pckt Received or N retries | Stop Timer | 0. Idle |
| 2. Wait ACK | Non ACK pckt Received | Process Packet | 2. Wait ACK |

A cell must store a transmit sequence number for each addressee with whom it communicates. An addressee can be a cell, a group, or a control device. For receiving, a cell must save the receive sequence number of each source from which it receives. A source can be a cell, a group, or a control device. When a cell receives a message, it checks the CRC on the message. If the CRC is not valid, the cell does not reply to the message. The cell receiving a message also checks the message's sequence number. If the sequence number indicates that this is a duplicate packet, the cell acknowledges the receipt of the packet to the sender but does not pass the packet to the application software.

The ARQ protocol uses a bit that means "this is a retransmission by the sender". A receiver will not acknowledge a duplicate message unless the message has its retransmit bit on. The cell saves the sequence number for the last received message for each group for which it is a listener. It has a separate 1 bit transmit sequence number and 1 bit receive sequence number for messages addressed with the cell address (used when communicating with control devices).

. Cell to cell communications is via group addresses. Direct addressing with cell addresses is used for network control functions. The cell will be communicating with a grouping device or network controller in those cases. A cell can have only one conversation at a given time that uses cell addresses because it has provisions to store only one set of those sequence numbers.

When a control device wishes to communicate with a cell, it opens communications by sending a packet with a connect command in the link control field. That command initializes the sequence numbers. After receipt of that command, the cell will not accept messages addressed to it (via cell address) by another control device until the conversation ends. The conversation ends when the control device sends the cell a disconnect command.

The period of time that the cell waits for an acknowledgement of a message depends on the type of routing used. In general, the cell allows enough time for the packet to arrive at its destination, plus protocol processing time in the destination cell and the transit time for the return packet carrying the acknowledgement.

The protocol timeout period for multihop packets is also influenced by the collision count. Even in very noisy environments, it is more likely that the reason a packet failed to reach its destination in time is due to a contention rather than a transmission error. When a packet is retried, it is assumed that the collision count is an indication of system load and the expected contention delay for a multihop packet. The delay period for multihop packets is adjusted upward as a function of collision count. The timeout period is therefore a function of the transmission baud rate, the number of hops and the collision count.

G. LINK CONTROL COMMANDS

Link control commands control the operation of the ARQ protocol and the link connection process (see next section). The link command field of a packet always contains a link command.

ARQ Protocol Commands

INFO: Information Packet (requires acknowledgement)
ACK: Acknowledgement Only Packet (does not require acknowledgement)

Connection Control Commands

CONN: Connect
DISC: Disconnect
SI: Set Initialization
XND: Exchange Network Data

Replies to Connection Control Commands

CMDR: Command reject
RD: Request Disconnect
RI: Request Initialization
UA: Unnumbered Acknowledge Only packets with the ACK and INFO commands use sequence numbering. The INFO packets have two sequence numbers, a transmit sequence number and the sequence number of the last packet received. ACK packets have both sequence number fields but the transmit sequence number is ignored by the destination.

Packets with commands other than ACK or INFO are called unnumbered packets. Unnumbered packets are acknowledged in a stop and wait fashion via a UA command. Unnumbered packets do not contain a message field.

H. CONNECTED CONTROL

Before a control device can communicate with a cell, it must establish a connection with the cell. Establishing a connection consists of initializing the sequence numbers and putting the control device and cell into a known state. The connection establishment and maintenance procedures are governed by state machines implemented in software.

An announcer cell must establish a connection with each listener cell in its group. Only when the connections have been established may the announcer communicate with the listeners. Connections are controlled by a subset of the link control commands. Commands are issued by a primary station. A secondary station receives a command and sends a reply to the primary. In a group, the primary station is the announcer. The listeners are secondaries. When a network control device communicates with a cell, the control device is the primary, the cell is the secondary. The link control commands and their responses are shown below. The INFO and ACK commands are ARQ protocol commands; the rest are connection control commands.

| Primary Command | Secondary Response | Description |
|---|---|---|
| INFO | | Information: valid only in connect state. |
| | INFO | Information: valid only in connect state. |
| | ACK | Acknowledgement: use sequence numbers in packet but do not update receive sequence number. |
| | CMDR | Command reject: sent only by Secondary in Connect State. Rebuild pckt and send it again. |
| | RI | Request initialization: init secondary. disconnect secondary. |
| | RD | Request Disconnect: disconnect the secondary. |
| | DM | Secondary is in the Disconnect state Acknowledgement |
| ACK | | |
| | CMDR | Command reject: sent only by secondary in connect state. Rebuild pckt and send it again. |
| | RI | Request initialization: init secondary. disconnect secondary. Connect secondary. |
| | DM | Disconnect Mode: Secondary is in the disconnect state. |
| CONN | | Connect |
| | UA | Unnumbered ACK: |
| | CMDR | Command reject: sent only by Secondary in connect state retry CONN: |
| | RI | Request initialization: itit secondary. disconnect secondary, connect secondary. |
| | RD | Request disconnect: send DISC. Disconnect |
| DISC | | |
| | UA | Unnumbered ACK |
| | CMDR | Command reject: sent only by secondary in connect state. Retry DISC. |
| SI | | Set Initialization |
| | CMDR | Command reject: Sent only by secondary in Connect State. Retry SI. |
| | UA | Unnumbered ACK. |
| XND | | Exchange ID & Network data: This command is sent only in when the primary is in the disconnect state. |
| | XND | Exchange ID & Network data: The secondary sends an XND response only if it is in the disconnect state. If it receives an XND while in any other state, the secondary responds with CMDR. |
| | CMDR | Command reject: sent only by secondary in connect state. Disconnect secondary; then try XND again. |

The connection state diagrams of FIGS. 26 and 27 refer to primary and secondary stations. The primary station controls the connection. The secondary can request that the state of the connection change but the secondary cannot change the connection unless commanded to do so by the primary station.

| State | Event | Action | Next State |
|---|---|---|---|
| PRIMARY STATION CONNECTION STATES | | | |
| 0. Start | Power Up | Initialize | 4. Wait Init |
| 1. Disconnect | Connect Request | Send CONN | 2. Wait Connect |
| 1. Disconnect | Fatal Error or RI | Send SI | 4. Wait Init |
| 1. Disconnect | XND | Process XND | 1. Disconnect |
| 1. Disconnect | INFO, ACK | Retry DISC | 1. Disconnect |

-continued

| State | Event | Action | Next State |
|---|---|---|---|
| 1. Disconnect | UA, DM | Ignore | 1. Disconnect |
| 1. Disconnect | RD, CMDR | Retry DISC | 1. Disconnect |
| 2. Wait Connect | UA | Reset Seq Nums | 3. Connect |
| 2. Wait Connect | Fatal Error or RI | Send SI | 4. Wait Init |
| 2. Wait Connect | Nonfatal error, RD, or CMDR | Send DISC | 5. Wait Disc. |
| 2. Wait connect | INFO, ACK | Send DISC | 5. Wait Disc. |
| 2. Wait Connect | DM | Retry CONN | 3. Wait Connect |
| 2. Wait Connect | XND | Send DISC | 5. Wait Disc. |
| 2. Wait Connect | Time out | Retry CONN | 2. Wait Connect |
| 3. Connect | Fatal Error or RI | Send SI | 4. Wait Init. |
| 3. Connect | Nonfatal error, RD, or disc. request | Send DISC | 5. Wait Disc. |
| 3. Connect | DM | Send DISC | 1. Disconnect |
| 3. Connect | CMDR, INFO, ACK | ARQ Processing | 3. Connect |
| 3. Connect | XND | Send DISC | 5. Wait Disc. |
| 3. Connect | UA | Send DISC | 5. Wait Disc. |
| 4. Wait Init | UA received | Send DISC | 5. Wait Disc. |
| 4. Wait Init | CMDR received | Retry SI | 4. Wait Init |
| 4. Wait Init | INFO, ACK | Retry SI | 4. Wait Init |
| 4. Wait Init | RD, DM, RI XND | Retry SI | 4. Wait Init |
| 4. Wait Init | Time out | Retry SI | 4. Wait Init |
| 5. Wait disc | UA, DM | | 1. Disconnect |
| 5. Wait disc | RI | Send SI | 4. Wait Init |
| 5. Wait disc | Fatal error | Send SI | 4. Wait Init |
| 5. Wait disc | CMDR, RD, XND | Retry DISC | 5. Wait Disc. |
| 5. Wait Disc | INFO, ACK | Retry DISC | 5. Wait Disc. |
| 5. Wait Disc | Time out | Retry DISC | 5. Wait Disc. |
| SECONDARY STATION CONNECTION STATES | | | |
| 0. Start | Power Up | Initialization | 3. Initialize |
| 1. Disconnect | CONN received | Send UA | 2. Connect |
| 1. Disconnect | SI received | Initialization Send UA | 3. Initialize |
| 1. Disconnect | Fatal Error | Send RI | 4. Wait Init. |
| 1. Disconnect | XND | Send XND | 1. Disconnect |
| 1. Disconnect | INFO, ACK | Retry DM | 1. Disconnect |
| 1. Disconnect | DISC | Retry DM | 1. Disconnect |
| 2. Connect | SI received | Initialization Send UA | 3. Initialize |
| 2. Connect | DISC received | Send UA | 1. Disconnect |
| 2. Connect | Fatal Error | Send RI | 4. Wait Init. |
| 2. Connect | Nonfatal error | Send RD | 5. error |
| 2. Connect | INFO, ACK | ARQ Processing | 2. Connect |
| 2. Connect | CONN | Retry UA | 2. Connect |
| 2. Connect | XND | Send RD | 5. Error |
| 3. Initialize | DISC received | Send UA | 1. Disconnect |
| 3. Initialize | INFO, ACK CONN | Retry RI | 3. Initialize |
| 3. Initialize | SI | Retry UA | 3. Initialize |
| 3. Initialize | XND | Retry RD | 3. Initialize |
| 4. Wait Init. | SI received | Initialization Send UA | 3. Initialize |
| 4. Wait Init | INFO, ACK | Retry RI | 4. Wait Init |
| 4. Wait Init | DISC, XND CONN | Retry RI | 4. Wait Init |
| 5. Error | DISC received | Send UA | 1. Disconnect |
| 5. Error | SI received | Initialization Send UA | 3. Initialize |
| 5. Error | INFO, ACK CONN, XND | Retry RD | 5. Error |

NOTE: Retries: A reply may be retried N times. The event that causes retry N+1 is defined to be a fatal error and causes initialization. The cell maintains one retry count and it is incremented when any reply other than INFO or ACK is retried. The retry count is cleared whenever a non-retry reply is sent to the primary cell.

I. ABORT SEQUENCE

A cell transmitting a packet can abort the packet by transmitting an abort sequence instead of continuing to transmit the packet. The Abort sequence is a group of at least 12 ones transmitted in succession. A receiving cell identifies an abort from the code verifier of FIG. 16. A receiving packet treats any 3 of 6 code violation as an abort. One result of this is that a link idle condition results in an abort. If the link is idle (no transitions) for more than a bit time, the result is a code violation. When a cell receiving a packet detects an abort sequence, it discards the portion of the packet that it has clocked in and begins searching for a new packet preamble. The abort sequence is also used for jamming after a collision is detected.

J. SYSTEM ID

Referring to FIG. 29, the method by which the 48 bit system ID is used within the packets is illustrated. Thirty-two bits of the system ID shown as field 251 is placed directly into the packet as indicated by the field 255. The remaining 16 bits are used in the calculation of the packet CRC. Initially, the CRC register begins with all ones as indicated by the field 252 at the start of the CRC calculation. Then the 16 bit field 250 of the system ID is used in the CRC calculation to provide a 16 bit field 253. The field 253 is stored in the EEPROM and used as a preset CRC field each time a packet CRC is calculated.

When a packet is to be transmitted once the preset field is stored, the stored CRC field is coupled to the CRC register. The 16 bit packet CRC field is calculated using this present field and the other fields in the packet used to calculate the packet CRC. (All fields except the contention timer field are used.) The other 32 bits of the system ID are transmitted within the packet.

When a packet is received, the processor calculates a CRC for the received packet by first placing its stored CRC preset field in its CRC register and then computing the packet CRC (again, the contention timer field is not used). If the newly computed CRC field does not match the field in the packet, it is assumed that the packet has been improperly transmitted or that the transmitted packet, if correct received, has a different system ID and thus should be discarded.

VI. GROUPING DEVICE

The grouping device can take various forms and can be realized with commercially available hardware such as a personal computer. These computers can be readily programmed to perform the various functions described in the application performed by the grouping device. For example, they can be readily programmed to provide the packets needed to communicate with the cells for grouping. Other functions such as the generation of the random number used within the packets can be generated with well-known programs.

An Apple II computer, for instance, may be used as a grouping device. The 48 bit system ID may be stored on a disk; or, a printed circuit card may be provided which engages one of the slots of the Apple II computer, the card can contain the system ID which is taken from a cell such as cell 232 of FIG. 28. As groups are formed, the assigned group numbers, member numbers, etc., can be stored on the disk or stored in an EEPROM on a card.

In FIG. 28, the elements of a presently preferred grouping device are illustrated. They include a CPU 226 which may be an ordinary microprocessor. The CPU communicates with a memory which may comprise a RAM 227, ROM 228 and storage means 229 for storing the system ID. Where a floppy disk is used the system ID and program (otherwise stored in ROM 228) are stored on the disk, with the program being transferred to RAM for execution.

A display means 230 such as a ordinary monitor is coupled to the CPU to provide a display to the user, for instance, the display can be used to provide lists of the groups with their ASCII names. A keyboard 231 is used to allow commands to be entered into the CPU.

The CPU is shown coupled to a cell 232 with the cell being coupled to a network through transceiver 233. The cell 232 is part of the grouping devices and the cell's ID is used by the grouping devices as a system ID.

Typical messages transmitted by the computer to the cell are shown in Table B, for example, the message of assigning the destination cell to be an announcer in a designated group is a message generated by the grouping device. The grouping device can communicate directly with the cell over one of the three pairs of leads which are coupled to the I/O subsections or through the select pin which allows messages from the CPU 226 to be read to the fourth I/O subsection.

Thus, a network for sensing, communicating and controlling which has distributed intelligence has been described. While in this application a simple example of use of cells in a home environment has been described, it will be obvious to one skilled in the art that the disclosed invention may be used in numerous other applications. Table C to this application contains a list of some other applications in which the present invention may be used.

Table A, Packet Examples

Routing Types for Packet Examples
1    Fully Addressed
2    Open Flooding
3    Restricted Flooding
4    Group Flooding NOTE: The packet sizes are in cell memory bits (before 3-of-6 encoding). A packet on a communications subchannel, after conversion to 3 of 6 code, is 50% larger.

Single Hop
    Packet Format:
Preamble, 16 bits
Flag, 4 bits
Destination cell Address, 48 bits
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 1 (Fully Addressed)
Source Cell Address, 48 bits
Message, 16 to 512 bits
Message Type, 8 bits
Message Contents, 8 to 511 bits Encryption Check, 16 bits
CRC, 16 bits
Flag, 4 bits
Single Hop
    Reply Format:
Preamble, 16 bits
Flag, 4 bits
System ID, 32 bits
Destination Cell Address, 48 bits
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 1 (Fully Addressed)
Source Cell Address, 48 bits
Encryption Check, 16 bits
CRC, 16 bits
Flag, 4 bits
Multihop Full Address
    Packet Format:
Preamble, 16 bits
Flag, 4 bits
System ID, 32 bits
Next Cell Address, 48 bits
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 1 (Fully Addressed)
Cell Address List
    Address Count, 4 bits
    Addresses, 48 - 768 bits
Source Cell Address, 48 bits
Message, 16 to 512 bits Message Type, 8 bits
Message Contents, 8 to 511 bits
Encryption Check, 16 bits
CRC, 16 bits
Flag, 4 bits
Multihop Full Address
       Reply Format:
Preamble, 16 bits
Flag, 4 bits
System ID, 32 bits
Destination Cell Address, 48 bits
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 1 (Fully Addressed)
Cell Address List
    Address Count, 4 bits
    Addresses, 48 - 768 bits
Source Cell Address, 48 bits
Encryption Check, 16 bits
CRC, 16 bits
Flag, 4 bits
Open Flooding
       Packet Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 2 (Open Flooding)

Destination Cell Address, 48 bits
Source Cell Address, 48 bits
Message, 16 to 512 bits
Message Type, 8 bits
Message Contents, 8 to 511 bits
Encryption Check, 16 bits
CRC, 32 bits
Flag, 4 bits
Open Flooding
    Reply Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 2 (Open Flooding)
Destination Cell Address, 48 bits
Source Cell Address, 48 bits
Encryption Check, 16 bits
CRC, 16 bits
Flag, 4 bits
Restricted Flooding
    Packet Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control Routing Type, 4 bits = 3 (Restricted Flooding)
Destination Cell Address, 48 bits
Source Cell Address, 48 bits
Message, 16 to 512 bits
Message Type, 8 bits
Message Contents, 8 to 511 bits
Encryption Check, 16 bits
CRC, 16 bits
Flag, 4 bits
Restricted Flooding
    Reply Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 3 (Restricted Flooding)
Destination Cell Address, 48 bits
Source Cell Address, 48 bits
Encryption Check, 16 bits
CRC, 16 bits
Flag, 4 bits
Group Announcement
    Packet Format:
Preamble, 16 bits
Flag, 4 bits
System ID, 32 bits
Group Address, 48 bits
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits Network Control
Routing Type, 4 bits = 4 (Group Flooding)
Source Member Number, 8 bits
Destination Member Number, 8 bits, (0 = broadcast)
Message, 16 to 512 bits
Message Type, 8 bits
Message Contents, 8 to 511 bits
Encryption Check, 16 bits
CRC, 16 bits
Flag, 4 bits
Group Announcement
    Reply Format:
Preamble, 16 bits
Flag, 4 bits
System ID, 32 bits
Group Address, 48 bits
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 4 (Group Flooding)
Source Member Number, 8 bits
Destination Member Number, 8 bits
Encryption Check, 16 bits
CRC, 16 bits
Flag, 4 bits
Probe
    Packet Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit Command, 4 bits
Network Control
Routing Type, 4 bits = 3 (Restricted Flooding)
Destination Cell Address, 48 bits
Source Cell Address, 48 bits
Message, 49 to 769 bits
Message Type, 8 bits
Message Contents, 48 to 768 bits (Route List)
Encryption Check, 16 bits
CRC, 16 bits
Flag, 4 bits
Probe
    Reply Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control
Retransmit Flag, 1 bit
Rcv Seq, 1 bit
Xmt Seq, 1 bits
Unused, 1 bit
Command, 4 bits
Network Control
Routing Type, 4 bits = 3 (Restricted Flooding)
Destination Cell Address, 48 bits
Source Cell Address, 48 bits
Message Field,
    Message Type 8 bits
    Message contents, Route List
Encryption Check, 16 bits
CRC, 16 bits
Flag, 4 bits
Broadcast Command
    Packet Format:
Preamble, 16 bits
Flag, 4 bits
System ID, 32 bits
Broadcast Address, 48 bits = All Zeros
Contention Timer, 10 bits
Contention Timer Checksum, 6 bits
Hop Count, 4 bits
Randomizer, 8 bits
Link Control Retransmit Flag, 1 bit
Rcv Seq, 1 bit
Xmt Seq, 1 bits
Unused, 1 bit
Command, 4 bits
Network Control
Routing Type, 4 bits = 3 (Restricted Flooding)
or 2 (Open Flooding)
Source Address, 48 bits
Message, 16 to 512 bits
Message Type, 8 bits
Message Contents, 8 to 511 bits
Encryption Check, 16 bits
CRC, 16 bits
Flag, 4 bits Broadcast Command
    Reply Format:
        NO REPLY Table B - Message Types Probe
Function: Determine the best route from the announcer to the listener.
    Source: Group Announcer
    Address Type: Cell
    Routing Method: Restricted Flooding
    Message Type: 2 (Number for 8 bit field)
    Message Content: Address Count (1 byte), (number of cell IDs in probe packet - this is the number of cells rebroadcasted packet)
    Address List Probe Result
Function: report the address list in the first probe packet received by the destination Cell.
Source: Cell previously addressed by a Probe message.
    Address Type: Cell
    Routing Method: Restricted Flooding
    Message Type: 3
    Message Content: Address Count (1 byte), Address List Assign Group Announcer
Function: Assign the destination Cell to be an announcer in the designated group.

Source: Grouping Device
Destination: Cell
Address Type: Cell or Group Member
Routing Method: Restricted Flooding or Group Flooding
Message Type: 4
Message Content: Group Number, Member Number Deassign Group Announcer
Function: Deassign the destination Cell from serving as an announcer in the designated group.
Source: Grouping Device
Destination: Announcer Cell
Address Type: Cell or Group Member
Routing Method: Restricted Flooding or Group Flooding
Message Type: 5
Message Content: none Assign Group Listener
Function: Assign the destination Cell to be a listener in the destinated group.
Source: Grouping Device
Destination: Cell
Address Type: Cell or Group Member
Routing Method: Restricted Flooding or Group Flooding
Message Type: 6
Message Content: Group Number, Member Number Deassign Group Listener
Function: Deassign the destination Cell from serving as a listener in the designated group.
Source: Grouping Device
Destination: Listener Cell
Address Type: Cell or Group Member
Routing Method: Restricted Flooding or Group Flooding
Message Type: 7
Message Content: none Assign Group Repeater
Function: Assign the destination Cell to be a repeater in the designated group.
Source: Grouping Device
Destination: Cell
Address Type: Cell or Group Member
Routing Method: Restricted Flooding or Group Flooding
Message Type: 8
Message Content: Group Number, Member Number Deassign Group Repeater
Function: Deassign the destination Cell from serving as a repeater in the designated group.
> Source: Grouping Device
> Destination: Group Repeater Cell
> Address Type: Cell or Group Member
> Routing Method: Restricted Flooding or Group Flooding
> Message Type: 9
> Message Content: none Assign Repeater
Function: Assign a Cell to act as a repeater. Used to assign Cells that are not normally allowed to be a repeater, i.e. a Cell with one transceiver on a nonradiated medium.
> Source: Control device
> Destination: Cell
> Address Type: Cell Routing Method: Fully Addressed, Open Flooding, Restricted Flooding
> Message Type: 10
> Message Content: none Shutup
Function: Broadcast message telling all Cells to stop transmitting until commanded to resume.
> Source: Control Device
> Destination: Cells
> Address Type: Broadcast or Cell
> Routing Method: Restricted Flooding or Open Flooding
> Message Type: 11
> Message Content: none Report your Input
> Function: Command a Cell to report its input.
> Source: Cell or Control Device
> Destination: Cell
> Address Type: Any
> Routing Method: Any
> Message Type: 12
> Message Content: Input number (byte).

Report your Output
> Function: Command a Cell to report its output.
> Source: Control Device or Cell
> Destination: Cell
> Address Type: Any
> Routing Method: Any
> Message Type: 13
> Message Content: Output number (byte).

Download
>   Function: Download data or code
>   Source: Control Device
>   Destination: Cell
>   Address Type: Any
>   Routing Method: Any
>   Message Type: 14
>   Message Content: Address, length, code Set commuciation parameter
>   Function: Set a Communication Parameter in the Cell
>   Source: Control Device
>   Destination: Cell
>   Address Type: Any
>   Routing Method: Any
>   Message Type: 15
>   Message Content: Parameter number, value Announcement
>   Function: Announce Sensor Data
>   Source: Group Announcer
>   Destination: Group
>   Address Type: Group, Broadcast
>   Routing Method: Group Flooding
>   Message Type: 16
>   Message Content: 0 - 255 (one byte)

Table C
APPLICATIONS

| CATEGORY | SUBCATEGORY | APPLICATION |
|---|---|---|
| General Usage | Sensing Functions Communication Functions Control Functions | |
| Agriculture | Crop Management | Crop Sensor/Comm Irrigation Ctrl/Comm Land Leveler Sensor Comm Pest Sensor/Comm (with cell IDs identifying animals) |
| | Livestock | Detector/Tracker |
| | | Feed Sense/Ctrl/Comm |
| | | Milker Sense/Ctrl/Comm |
| | | Weight Sensor/Comm |
| | | Herder Signal Device |

| | | |
|---|---|---|
| Commercial | Banking | ATM Card |
| | | Electronic Money |
| | Commercial | Cash Register Sense/Ctrl/Comm |
| | | Elevator Sense/Ctrl/Comm |
| | | Slot Machine Sense/Ctrl/Comm |
| | | Vending Machine Sense/Ctrl/Comm |
| | Commercial, Misc | Diaper Sensor/Comm<br>Pager Ctrl/Comm<br>Protechnics, Sensor Ctrl<br>Stamp I.D.<br>Watch Ctrl/ |
| | Construction | Decay Sensor/Comm<br>Post Sensor/Comm |
| | Energy Management | Sensor Sense/Comm<br>Thermostat Ctrl/Comm<br>Utility Sensor/Comm<br>Vent Ctrl/Comm |
| | Security | Lock Sense/Ctrl/Comm |
| | | Smart Keys (Serial #) |
| Communication | Communications | Cable Elimination |
| | | Channel Ctrl/Comm<br>Network Configuration Ctrl/Comm<br>Cell to Anything Bridge<br>Phone I.D. (Cell I.D.)<br>Phone to Cell Bridge<br>Telemetry Ctrl/Comm<br>Wiring Elimination |
| Computer Network | Architecture | Slow Data Network<br>Artificial Intelligence<br>Configuration Ctrl<br>Copy Protection<br>Parallel Processing Nodes |
| | Peripheral | Cable Elimination |
| | | Keyboard Sense/Comm<br>Mouse Sense/Comm<br>Wiring Elimination |
| | Develop. System | Emulator Device |
| Consumer | Appliances | Sensor Sense/Comm<br>Switch Sense/Ctrl/Comm |
| | Consumer, Misc | Detector/Tracker (Electronic Serial #) |
| | | Low Battery Detector<br>Smart Lottery Ticket |
| | Entertainment | Amusement Park Ctrl'r |
| | | Arcade Game Ctrl'r<br>Cable TV Access Ctrl'r<br>Cable TV Sample Ctrl'r<br>CD Player Ctrl'r<br>Special Effects Ctrl'r |
| | | Stereo Ctrl'r<br>TV Ctrl'r<br>VCR Ctrl'r |

| | | |
|---|---|---|
| | Home Improvement | Central Clock Sys<br>Curtain Ctrl/Comm<br>Door Sense/Comm |
| | | Garage Door Ctrl'r<br>Intercom<br>Intercom Ctrl'r<br>Pool Ctrl'r Sense/Ctrl/Comm |
| | | Smoke/Fire Detector<br>Window Sense/Ctrl/Comm |
| | Pets | Detector/Tracker (Electronic Serial #) |
| | | Pet Ctrl/Trainer |
| Education | Education, Misc | Interactive Book Sense/Ctrl/Comm<br>Test Sense/Comm |
| Engineering | Data Acquisition | DAC/ADC |
| | Instrumentation | DAC/ADC<br>Switch Sense/Ctrl/Comm |
| Home | Electrical | Light Ctrl/Comm |
| | | Recepticle Sense/Comm/Ctrl<br>Switch Sense/Ctrl/Comm<br>All forms of sensing<br>All forms of control |
| | Energy Management | Sensor Sense/Comm<br>Thermostat Ctrl/Comm<br>Utility Sensor/Comm<br>Vent Ctrl/Comm |
| | Home Improvement | Central Clock Sys<br>Curtain Ctrl/Comm<br>Door Sense/Comm |
| | | Garage Door Ctrl'r<br>Intercom<br>Intercom Ctrl'r<br>Pool Ctrl'r Sense/Ctrl/Comm |
| | | Smoke/Fire Detector<br>Window Sense/Ctrl/Comm |
| | Security | Lock Sense/Ctrl/Comm |
| | | Smart Keys (Serial #) |
| | | Vibration/Motion Sense/Comm<br>window Sense/Ctrl/Comm |
| | Sprinkler Sys | Timer Ctrl/Comm<br>Valve Ctrl/Comm<br>Wetness Sense/Ctrl |
| Industrial | Energy Management | Sensor Sense/Comm<br>Thermostat Ctrl/Comm<br>Utility Sensor/Comm<br>Vent Ctrl/Comm |
| | Industrial Equipment | Oil Drill Sensor/Ctrl/Comm |
| | | Power Load Sense/Ctrl/Comm |
| | | Utility Sensor/Comm |

| | | |
|---|---|---|
| | Security | Lock Sense/Ctrl/Comm |
| | | Smart Keys (Serial #) |
| | | Vibration/Motion Sense/Comm |
| | | Window Sense/Ctrl/Comm |
| | Security, Industrial | Copy Protection |
| | | Detector/Tracker (Electronic Serial #) |
| | | Personnel Badge I.D. |
| Law | Security, Law | Copy Protection |
| | | I.D. Card (Serial #) |
| | | Gun I.D. |
| | | Passport (Serial #) |
| | | Shoplifter Detector |
| Manufacturing | CIM | Artificial Intelligence |
| | | Wiring Elimination |
| | Production Ctrl | Detector/Tracker (Electronic Serial #) |
| | Process Ctrl | Inventory Sense/Comm |
| | Production Automation | Line Balance |
| | | Production Flow/Sense |
| | Robotics | Detector/Tracker (Electronic Serial #) |
| | | Robot Sense/Ctrl/Comm |
| Medical | Medical, Misc | Bio-Feedback |
| | | Bionics |
| | | Handicapped Interfaces |
| | | Heart Pacer |
| | | Implants |
| | | Medical Alert Sense/Comm |
| | | Medicine Alert Sense/Comm |
| | | Patient Monitoring |
| | | Personal Dispenser Ctrl/Comm |
| | | Personal Monitors |
| | | Prosthetics |
| Military | Military, Misc | Copy Protection |
| | | Damage Ctrl Sense/Comm |
| | | Detector/Tracker (Electronic Serial #) |
| | | Personnel Badge I.D. |
| | | Redundant Comm |
| | | SDI Sense/Ctrl/Comm |
| | | Sonna Buoy Sense/Comm |
| | | Spying Sense/Ctrl/Comm |
| | | Position Sense/Ctrl/Comm |
| | | System Diagnostics Sense/Comm |
| | | War Game Monitor/Sim |
| | | Weapon Sense/Ctrl/Comm |
| | Security | Lock Sense/Ctrl/Comm |
| | | Smart Keys (Serial #) |
| | | Vibration/Motion Sense/Comm |
| | | Window Sense/Ctrl/Comm |
| Scientific | | Weather/Earthquake/etc. sensor |

| | | |
|---|---|---|
| Transportation | Automotive | General sensing
General communication
General control
Anti-lock Breaking Sys Complex Cable Elimination Gauge Ctrl In Dash Map/Locator
Instrument Panel Ctrl
License Plate I.D. & Comm Light Ctrl/Comm
Regulator Sense/Comm
Smart Keys (Serial #)

Switch Sense/Ctrl/Comm
System Diagnostics Sense/Comm
Wiring Elimination |
| | Avionics | Anti-lock Breaking Sys Complex Cable Elimination Gauge Ctrl Instrument Panel Ctrl
Light Ctrl/Comm Regulator Sense/Comm Sensor Sense/Comm
Switch Sense/Ctrl/Comm
System Diagnostics Sense/Comm
Wiring Elimination |
| | Transportation, Misc | Emergency Locator (ELT) Sense/Comm Traffic Monitor/Ctrl Traffic Signal Sense/Ctrl/Comm |
| Tpy/Hobby/Spo | Game | 3-D "Chip-Wits" Sense/Ctrl/Comm Bingo Card Sense/Comm
Game sense/Ctrl/Comm |
| | Hobby | Camera Sense/Ctrl/Comm Hobby Kit Sense/Ctrl/Comm Magic Equipment Sense/Ctrl/Comm Miniature Train Ctrl/Comm
Remote Ctrl Sense/Ctrl/Comm |
| | Sport | Emergency Locator (ELT) Sense/Comm
Trap Line Sensor Sport Accessory Sense/Ctrl/Comm |
| | Toy | Lego-Bot Sense/Ctrl/Comm Media Interactive Toy Sense/Ctrl/Comm Animated Toy Sense/Ctrl/Comm |

We claim:

1. In a network for sensing, communicating and controlling which includes a plaurilty of cells, a cell comprising:
    a processor;
    an input/output section for providing coupling between said processor and said network, said input/output section comprising:
    a plurality of circuit elements comprising, a state machine for providing control signals for said input/output section event sensing means for sensing predetermined electrical changes, timing means for measuring time intervals, and multiplexing means for directing said sensed electrical changes to said state machine;
    first register means coupled to receive signals from said processor, said first register means for automatically electrically configuring and reconfiguring said circuit elements based on said signals from said processor to provide a plurality of input/output functions;
    second register means coupled to said processor for storing input/output status information and for coupling this information to said processor, said second register means being coupled to said timing means;
    said state machining being coupled to said event sensing means and at least one of said and second register means;
    whereby said input/output section can be configured and reconfigured to perform a plurality of input/output functions.

2. The cell defined by claim 1 wherein said circuit elements include a counter and digital comparator.

3. The cell defined by claim 1 wherein said circuit elements include a rate multiplier and a ramp generator.

4. The cell defined by claim 1 wherein said circuit elements include a sample and hold means.

5. The cell defined by claim 1 wherein said circuit element includes a transition detector.

6. The cell defined by claim 1 wherein said circuit element includes a voltage comparator.

7. The cell defined by claim 1 wherein said circuit element includes a differential receiver.

8. The cell defined by claim 1 wherein said circuit element includes a differential transmitter.

9. The cell defined by claim 1 wherein said circuit element includes a differential voltage comparator.

10. The cell defined by claim 1 wherein said circuit element includes a communications subsystem.

11. The cell defined by claim 1 wherein said circuit element includes counter latches.

12. The cell defined by claim 1 wherein said circuit element includes a frequency generator.

13. The cell defined by claim 1 wherein said circuit element includes a waveform generator.

14. The cell defined by claim 1 wherein said circuit element includes digital sensors.

15. The cell defined by claim 1 wherein said circuit element includes means for generating digital output control signals.

16. The cell defined by claim 1 wherein said circuit element includes differential pair digital sensors.

17. The cell defined by claim 1 wherein said circuit element includes means for generating differential pair digital output control signals.

18. The cell defined by claim 1 wherein said circuit elements include a sample and hold means, ramp generator, digital counter and digital comparator, and where said elements are configured to provide a digital-to-analog converter, such that the output of said ramp generator is coupled to said sample and hold means, the start of said ramp generator being detected as one of said predetermined events and used to load initial value into in said counter, said comparator comparing the count in said counter with a digital number from said processor, and the output of said comparator being used to control said sample and hold means, thereby providing a DC potential at the output of said sample and hold means.

19. The cell defined by claim 1 wherein said circuit elements includes an analog comparator, transition detector, digital counter and ramp generator, and wherein said elements are configured to provide an analog-to-digital converter, an analog signal being coupled to one terminal of said comparator, the other terminal of said comparator being coupled to receive the output of said ramp generator, said digital counter being loaded to initial count in said counter to count at a predetermined rate when said event sensing means detects the start of a ramp by said ramp generator, said counter being used to load latches which are used as said digital output of said converter when said event detection means detects a predetermined event from said comparator means.

20. In a network for sensing, communicating and controlling, a cell comprising:
    a plurality of first register means for storing digital signals;
    at least one arithmetic logic unit coupled to said first register means for receiving the contents of said register means as inputs to said logic unit;
    a memory coupled to the output of said logic unit, the output of said memory being coupled to said first register means, said memory including a random-access memory section and an electrically programmable memory section;
    each of said plurality of frist register means being associated with a different process carried out by said logic unit in conjuction with said memory, such that a plurality of different processes are carried out by said first register means, logic unit and memory;
    a plurality of input/output sections, each of said input/output sections including at least one lead for coupling each of said input/output sections for performing one of the functions of sensing, communicating and controlling, said input/output sections being coupled to said logic unit and said first register means by a bus;
    said input/output sections each being selected by signals on said bus, each of said input/output sections including a plurality of input/output registers which receive signals from said bus and which couple signals to said bus, said input/output registers receiving signals for controlling said input/output sections and communicating to said bus signals received over said leads;
    a semaphore register coupled to said bus for controlling shared resources within said cell shared by said processes, said shared resources including said electrically programmable memory section.

21. The cell defined in claim 20 wherein each of said input/output sections are also part of said shared resources.

* * * * *